(12) United States Patent
Hirai et al.

(10) Patent No.: US 7,958,370 B2
(45) Date of Patent: Jun. 7, 2011

(54) SYSTEM AND DEVICE FOR MANAGING CONTROL DATA

(75) Inventors: Tatsuya Hirai, Kanagawa (JP); Haruko Takano, Kanagawa-ken (JP)

(73) Assignee: Hitachi Global Storage Technologies, Netherlands, B.V., Amsterdam (NL)

( * ) Notice: Subject to any disclaimer, the term of this patent is extended or adjusted under 35 U.S.C. 154(b) by 1189 days.

(21) Appl. No.: 11/540,483

(22) Filed: Sep. 29, 2006

(65) Prior Publication Data
US 2007/0165440 A1 Jul. 19, 2007

(30) Foreign Application Priority Data
Sep. 29, 2005 (JP) ................................. 2005-284424

(51) Int. Cl.
*G06F 12/14* (2006.01)
*G06F 21/00* (2006.01)
*G06F 21/02* (2006.01)

(52) U.S. Cl. ........ 713/189; 713/194; 713/193; 713/169; 713/168; 713/150; 726/26; 726/27; 726/29; 705/51; 705/57

(58) Field of Classification Search .................. None
See application file for complete search history.

(56) References Cited

U.S. PATENT DOCUMENTS

| | | | | |
|---|---|---|---|---|
| 6,026,246 | A * | 2/2000 | Yoshida et al. | 396/106 |
| 6,487,659 | B1 * | 11/2002 | Kigo et al. | 713/168 |
| 6,550,011 | B1 * | 4/2003 | Sims, III | 713/193 |
| 7,721,343 | B2 * | 5/2010 | Kato et al. | 726/27 |
| 2002/0114458 | A1 * | 8/2002 | Belenko et al. | 380/201 |
| 2004/0250092 | A1 * | 12/2004 | Hori et al. | 713/189 |
| 2005/0198529 | A1 * | 9/2005 | Kitani | 713/200 |
| 2005/0210253 | A1 * | 9/2005 | Shigeeda | 713/171 |
| 2009/0327718 | A1 * | 12/2009 | Hirai | 713/168 |
| 2010/0230489 | A1 * | 9/2010 | Sugiyama | 235/382 |

FOREIGN PATENT DOCUMENTS

| | | |
|---|---|---|
| WO | WO 00/13358 | 3/2000 |
| WO | WO 0043339 | 7/2000 |

* cited by examiner

*Primary Examiner* — Syed A. Zia

(57) ABSTRACT

In one embodiment, a content data management system that handles control information on management of content data decryption includes a first device (a recorder/player) for recording/reproducing the content data, a second device (a magnetic disk drive) for storing the content data, and a host processor for controlling data transfer between the first and second devices. The host processor exercises control for the system to inquire of both devices as to a transfer function for internal data of the devices, then depending on particular inquiry results, set up, prior to the data transfer between the two devices, either a first transfer mode for transferring the control information unidirectionally from the first device to the second device, or a second transfer mode for transferring the control information bidirectionally between both devices, authenticate mutual validity between the first and second devices, share key data (symmetric key data) between the first and second devices if authentication results indicate validity, encrypt the control information with the first or second device by using the key data, and transfer the control information that has been encrypted with either device to the other device in the first or second transfer mode that has been set up.

12 Claims, 23 Drawing Sheets

Fig. 3

| Symbol | Name | Key attribute | Features and characteristics |
|---|---|---|---|
| A ‖ B | Data concatenation | - | Concatenation of data A and data B |
| E(X,Y) | Encryption | - | Arithmetic operation for encrypting data Y with data X. The encryption is public key encryption if X is public key data, and symmetric key encryption if X is symmetric key data. |
| D(X,Y) | Decryption | - | Arithmetic operation for decrypting data Y with data X. If X is private key data, data that was encrypted with a public key is decrypted with a private key, and if X is symmetric key data, data that was encrypted with a symmetric key is decrypted with the symmetric key. |
| H(X) | Hash value calculation | - | Arithmetic operation for calculating a Hash value of data X |
| DCC | Device Class certificate | - | Certificate that indicates validity of $KP_{dc}$. Includes a $K_{CA}$-encrypted electronic signature. |
| RDCL | Revoked Device Class List | - | List of Device Class certificates which were revoked by certification authorities. Recorded in Protected Information Storage and Usage Pass Transfer Module. |
| RDCL.D | Issue date of Revoked Device Class List | - | Information contained in the list of revoked Device Class certificates. The information indicates issue date and time of the list of revoked Device Class certificates. |
| $KP_{CA}$ | Certification authorities public key | Public key | A public key issued by the certification authorities and embedded in Protected Information Storage. Used to decrypt electronic signature sections of Device Class certificates. |
| $K_{CA}$ | Certification authorities private key | Private key | A private key managed by the certification authorities. Used to encrypt the electronic signature sections of the Device Class certificates. |
| $KP_{dc}$ | Device Class public key | Public key | A public key embedded in Protected Information Storage. Validity of a device having this key embedded in the device's own region is indicated by the Device Class certificate including the key. The key can be embedded for multiple devices. |
| $K_{dc}$ | Device Class private key | Private key | A private key embedded in Protected Information Storage. Used to decrypt $KP_{dc}$-encrypted data. |
| $KP_d$ | Device public key | | A public key embedded in Protected Information Storage. A unique key is embedded for all Devices. |
| $K_d$ | Device private key | Private key | A private key embedded in Protected Information Storage. Used to decrypt $KP_d$-encrypted data. |
| $*KP_x$ | Symmetric Device public key | Symmetric key | "x" denotes "dc" or "d". This symmetric key is generated during the encryption with a public key. |
| $*K_x$ | Symmetric Device private key | Symmetric key | "x" denotes "dc" or "d". This symmetric key is generated during the encryption with a private key. Takes the same value as "$*KP_x$" does. |
| $K_{ch}$ | Challenge key | Symmetric key | Symmetric key for temporary symmetrical encryption, dynamically generated in Usage Pass Transfer Module. Used to encrypt a temporary symmetrical Session key for Usage Pass encryption. |
| $K_s$ | Session key | Symmetric key | Symmetric key for temporary symmetrical encryption, dynamically generated in Usage Pass Transfer Module. Used to encrypt data during Usage Pass transfer. Zeroth-order Session key is shared between Primal Device and Inceptive Device during Connection procedures. |
| $K_c$ | Content key | Symmetric key | Used to encrypt and decrypt content. |
| [P] | Data creation at primal device (Suffix) | - | Means the data created in Primal Device. Primal Device means the Device that initiates Connection establishment process by verifying the Device Class certificates sent from other Devices. |
| [I] | Data creation at inceptive device (Suffix) | - | Means the data created in Inceptive Device. Inceptive Device means the Device that initiates Connection establishment process by transmitting the Device's own certificate to other Devices. |

Qualified Access Mode recognition sequence

SYSTEM AND DEVICE FOR MANAGING CONTROL DATA

CROSS-REFERENCES TO RELATED APPLICATIONS

This application claims priority from Japanese Patent Application No. JP2005-284424, filed Sep. 29, 2005, the entire disclosure of which is incorporated herein by reference. This application is related to concurrently filed U.S. patent application Ser. No. 11/541,463, the entire disclosure of which is incorporated herein by reference.

BACKGROUND OF THE INVENTION

The present invention relates generally to systems and devices for managing content data, and more particularly to systems and devices for processing the protocols that relate to transfer of the control information defined to use encrypted content data.

Even more specifically, the invention relates to a management system for content data handling which includes protocol processing for transfer of control information inclusive of the key data defined to use the content data handled in a recorder/player and a storage device. The invention also relates to a recorder/player and storage device in the system.

When content data such as musical data or image data has a copyright, there is risk of the copyright holder's rights being infringed unless appropriate measures for copyright protection are taken. However, if top priority is assigned to copyright protection and the circulation of the content data is impeded, this will turn out to be disadvantageous to the copyright holder who can collect copyright royalties for copies of the copyrighted material.

Content data whose copyright is to be protected is delivered mainly via a digital communications network, broadcasting waves, or the like. When a user uses such data, the user usually records the data onto some kind of storage medium before starting reproduction with a reproducing device. Currently, magnetic disk drives are known as control-featured storage devices large in capacity and high in access performance. A large majority of magnetic disk drives are fixedly built into recorder/players, and such a magnetic disk drive is unknown that allows internal data to be used in other reproducing devices. In terms of operational convenience, however, the use of portable types of storage devices is likely to grow in the future. Under these circumstances, memory cards are known as the portable types of storage devices that, although lower than magnetic disk drives in capacity, have a copyright protecting function.

Such data is reproduced using the recorder/player that was used to receive the delivered data, or a portal type of dedicated device for reproduction.

To protect the copyright for the data which was recorded in a portable type of storage device connectible to a recorder/player, it is important to provide both the recorder/player and the storage device with some security measure in order to prevent the recorded data from being reproduced overstepping the range of the conditions on which the copyright holder insists. Providing devices with security protection requires that for data exchange in a region freely accessible from the inside and outside of the devices, free data access in plain text should be prevented by, for example, conducting authentication processes between the devices that are to exchange data, or encrypting the data itself. At the same time, however, as these authentication or encryption processes become more stringent, the processes required from the time the user issues a data usage request, until data has actually been made available to the user, will increase and a situation under which the data cannot be reproduced smoothly is likely to result.

Patent References 1 (WO01/013358) and 2 (WO01/043339), for example, propose techniques in which a copyright relating to the digital data to be used is protected by encrypting the data and, at the same time, preventing unauthorized acquisition, falsification, etc. of a key for decrypting the encrypted data, and of the usage terms and conditions of the encrypted data. Also, Patent Reference 3 (Japanese Patent Laid-open No. 2004-302701) discloses a technique relating to a storage device in which the plurality of encryption and input/output processes sent from a host device will be split into a plurality of procedures and then concurrently performed so that the tampering resistance of the data to be kept private between the storage device and a host device will improve when the data is input and output in encrypted form.

BRIEF SUMMARY OF THE INVENTION

When the key for decrypting digital data, and the usage terms and conditions of encrypted data are to be transferred between two devices, the methods disclosed in Patent References 1 and 2 require the encrypting and decrypting computations of a public key that are high in processing load, and certificate verification of the public key. It has been found, however, that the techniques disclosed in Patent References 1 and 2 have the several problems described below. In addition, these problems are not covered in the description of the technique disclosed in Patent Reference 3.

Firstly, whether the transfer destination device authenticates the correctness of the transfer source device is not considered and hence if the key and the usage terms and conditions are transmitted from an unauthorized device to the transfer destination, unauthorized access cannot be prevented since the key and the usage terms and conditions will be recorded.

Secondly, a situation under which a plurality of keys and usage terms and conditions are to be transmitted in succession is not properly considered and hence, each time the key and the usage terms and conditions are transmitted, the public-key encrypting computation that involves a high load must be conducted between both the transfer source device and the transfer destination device.

Thirdly, when the validity of devices is discriminated by the respective certificates, although lists of revoked certificates, along with those device certificates, are used in the entire system, the above methods allow only a certificate revoke list of transfer destinations to be updated.

Fourthly, when the key and the usage terms and conditions are transferred between two devices, the authentication process and the transfer direction of the key and the usage terms and conditions are fixed, and to conduct reverse transfer, the authentication process must also be in a reverse direction and restarted from the beginning. This applies a large load to both the recorder/player and the storage device.

A feature of the present invention is to provide a content data management system that solves such problems as described above, and a recorder/player and storage device in the system.

A content data management system according to the present invention, the content data management system being adapted to handle control information intended to manage decryption of content data, includes a first device (e.g., a recorder/player) for recording/reproducing the content data, a second device (e.g., a magnetic disk drive) for storing the content data, and a host processor for controlling data transfer between the first and second devices; wherein the host processor exercises control for the system to inquire of both devices as to a transfer function for internal data of the devices, then depending on particular inquiry results, set up, prior to the data transfer between the two devices, either a first transfer mode for transferring the control information unidirectionally from the first device to the second device, or a second transfer mode for transferring the control information bidirectionally between the first device and the second device, authenticate mutual validity between the first and second devices, share key data (symmetric key data) between the first and second devices if authentication results indicate validity, encrypt the control information with the first or second device by using the key data, and transfer the control information that has been encrypted with either device to the other device in the first or second transfer mode that has been set up, and wherein the first device, if it has received the control information, decrypts the control information by using the symmetric key data, and decrypts the content data by using the decrypted control information.

In a preferred example, the first device is a recorder/player having a function that allows digital content data to be viewed, the second device is a magnetic disk drive mountable in and dismountable from the first device, a section for storage of the content data is a magnetic disk medium, and first and second write-protected storage regions are tamper resistant memories.

In another preferred example, the foregoing control information includes: a format that indicates to what kinds of modules the information itself can be output; identifiers uniquely allocated to each of the modules; information that indicates limiting conditions on use of the content data; key data for decrypting encrypted content data; and an identifier for identifying related content data.

In addition, preferably, during the transfer of the control information in the first transfer mode, the first and second devices create respective transaction logs related to control information processing, and store the transaction logs into the first and second write-protected storage regions, respectively. If the authentication of validity is not conducted properly, either the first or second device creates symmetric key data by referring to the associated transaction log that has been stored into the first or second write-protected storage region, and sends the symmetric key data to the other device.

Furthermore, preferably, during the transfer of the control information in the second transfer mode, the first device creates a transaction log related to control information processing, and stores the transaction log into the first write-protected storage region. If the transfer of the control information is not conducted properly, the first device creates symmetric key data by referring to the transaction log that has been stored into the first write-protected storage region, and sends the symmetric key data to the second device.

In addition, preferably, when the second transfer mode is set, during the authentication of validity, the second device transmits to the first device a certificate including its own public key. After receiving the certificate, the first device verifies validity thereof and creates a first challenge key that is a key for temporary symmetric key encryption. Next, the first device encrypts the first challenge key by using the received public key, concatenates to the generated encryption data the certificate including the device's own public key, and transmits the data to the second device. The second device, after using a private key of its own to decrypt the received data and acquire the first challenge key, creates a second challenge key that is a key for temporary symmetric key encryption. Next, the second device concatenates the second challenge key and the public key embedded in the second device's own certificate, and encrypts the data by using the received public key. The second device further concatenates a certificate revoke list of its own to the encrypted data, encrypts the concatenated data by using the received first challenge key, and transmits the encrypted data to the first device. After decrypting the received data by using the first challenge key, the first device compares the list issue date information contained in the certificate revoke list, with the validation date information contained in the first device's own certificate revoke list. Consequently, if the issue date of the received certificate revoke list of the second device is newer, the first device updates the certificate revoke list of the second device as the first device's own certificate revoke list. In addition, the first device decrypts all the above-encrypted data, except for the certificate revoke list, by using the first device's own private key, and creates a zeroth-order first session key that is a key for temporary symmetric key encryption. Next, the first device encrypts the zeroth-order first challenge key by using the previously received public key and second challenge key of the second device, and transmits the encrypted data to the second device. After receiving the encrypted data, the second device decrypts the data by using the second challenge key, and if the certificate revoke list of the first device is included in the encrypted data, updates the second device's own certificate revoke list by using the received certificate revoke list. Additionally, the second device decrypts all the above-encrypted data, except for the certificate revoke list, by using the private key embedded in the second device's own certificate, and acquires the zeroth-order first session key.

A recorder/player according to the present invention, the recorder/player being adapted to record/reproduce acquired content data, includes: a connecting section which connects with a storage device which stores the content data, and transfers information, inclusive of the content data, to and from the storage device; a recording section which performs a process for recording the content data; a playback section which at least performs a process for reproducing the content data sent from the storage device via the connecting section; a first processing unit that sets either a first transfer mode in which control information transfer between the recording section or the playback section and the storage device is conducted unidirectionally with respect to the storage device, or a second transfer mode in which the control information transfer between the recording section or the playback section and the storage device is conducted bidirectionally with respect to the storage device; and a second processing unit that includes a module for creating not only key data intended to decrypt encrypted content data, but also control information inclusive of conditions for decrypting the content data, and a module for verifying information on characteristics of the storage device, then authenticating validity thereof, and if authentication results indicate that the storage device is valid, encrypting created control information by using symmetric key data which is key data shared with the storage device; wherein the encrypted control information is transferred to the storage device via the connecting section in accordance with the first or second transfer mode that has been set under control of the first processing unit, the control information that has been received from the storage device is decrypted by the second processing unit using the symmetric key data, and the decrypted control information is used to decrypt the content data and reproduce the content data in the playback section.

In a preferred example, a recorder/player for recording/reproducing acquired content data includes: an interface which removably connects with a storage device for storage of the content data and exchanges various information, inclusive of the content data, with the storage device; a recording module which performs a process for recording the content data; a playback module which performs a process for reproducing the content data sent from the storage device via the interface; a first write-protected storage region that holds key data used at least for encrypting the content data; a host security manager which creates not only the key data used to decrypt encrypted content data, but also control information inclusive of conditions for decrypting the content data; and a host processor which controls data transfer to and from the storage device; wherein the host processor is adapted to inquire of the recording module or the playback module and the storage device as to a transfer function for internal data of each of the devices, and then depending on particular inquiry results, set up, prior to the data transfer to/from the storage device, either a first transfer mode for transferring the control information unidirectionally with respect to the storage device, or a second transfer mode for transferring the control information bidirectionally with respect to the storage device, and the host security manager is adapted to verify information on characteristics of the storage device, then authenticate validity thereof, and if authentication results indicate that the storage device is valid, share the key data (symmetric key data), and wherein, if set to the first transfer mode, the host security manager encrypts created control information using the symmetric key data and transfers the encrypted control information to the storage device via the interface, or if set to the second transfer mode, the host security manager encrypts created control information using the symmetric key data, transfers the encrypted control information to the storage device via the interface, and receives the control information that was encrypted using the symmetric key data transferred from the storage device, and the playback module is adapted to decrypt the received control information by using the symmetric key data and decrypt the content data by using the decrypted control information.

A magnetic disk drive according to the present invention, the magnetic disk drive being connected to an external device which processes data, and adapted to have a capability to store the data, includes: a connecting section which is removably connected to the external device and exchanges information, inclusive of the data, with the external device; a disk medium for storage of encrypted data sent from the external device via the connecting section; a second write-protected storage region in which to hold not only key data used at least for encrypting the data, but also control information inclusive of conditions for decrypting the data; and a control unit which controls transfer of the information exchanged with the external device via the connecting section; wherein the control unit authenticates validity of each of the magnetic disk drive itself and the external device, with respect to the other, then if the particular device is valid, shares required key data (symmetric key data) with the external device, and encrypts internal control information of the second write-protected storage region by using the symmetric key data, and wherein the control unit transfers encrypted control information to the external device via the connecting section, depending on whether a first transfer mode for transferring the control information unidirectionally from the external device to the magnetic disk drive, or a second transfer mode for transferring the control information bidirectionally between the magnetic disk drive and the external device, is set under an instruction from the external device.

In a preferred example, a magnetic disk drive connected to a recorder/player which records/reproduces data, and adapted to store the data, includes: an interface which is removably connected to the recorder/player and exchanges information, inclusive of the data, with the recorder/player; a disk medium for storing the data acquired from the recorder/player via the interface; a controller which controls data read/write operations with respect to the disk medium; a second write-protected storage region for holding not only key data used at least for encrypting the data, but also control information inclusive of conditions for decrypting the data; and a transfer module which is connected to the interface and conducts transfer control of the information exchanged with the recorder/player; wherein the transfer module includes a mechanism which, in accordance with an request from the recorder/player, answers whether a first transfer mode for transferring the control information unidirectionally from the recorder/player to the magnetic disk drive, or a second transfer mode for transferring the control information bidirectionally with respect to the recorder/player can be used for the transfer of the control information between the interface and the recorder/player, and a mechanism which, in addition to sending information on characteristics (i.e., characteristics information) of the magnetic disk drive to the recorder/player in accordance with the request therefrom, verifies the characteristics information sent therefrom, then authenticates validity of the magnetic disk drive, and if the magnetic disk drive is valid, shares required key data (symmetric key data) with the recorder/player, and wherein, if set to the first or second transfer mode under an instruction from the recorder/player, the transfer module receives the control information encrypted with the symmetric key data transferred from the recorder/player via the interface, stores the control information into the second write-protected storage region, encrypts the internal control information thereof by using the symmetric key data, and transfers the encrypted control information to the recorder/player via the interface.

A storage device according to the present invention can be understood as follows. The storage device connected to an external device which processes data, and adapted to have a capability to store the data, includes: a connecting section which exchanges information, inclusive of the data, with the external device; a storage section for storage of encrypted data sent from the external device via the connecting section; a required storage region in which to hold not only key data used at least for encrypting the data, but also control information inclusive of conditions for decrypting the data; and a controller which controls transfer of the information exchanged with the external device via the connecting section; wherein the controller authenticates validity of each of the storage device itself and the external device, with respect to the other, then if the particular device is valid, shares required key data (symmetric key data) with the external device, and encrypts internal control information of the required storage region by using the symmetric key data, and wherein the controller transfers encrypted control information to the external device via the connecting section, depending on whether a first transfer mode for transferring the control information unidirectionally from the external device to the storage device, or a second transfer mode for transferring the control information bidirectionally between the storage device and the external device is selectively set.

According to the present invention, it is possible to provide an appropriate method of reducing loads on encrypting computation of multiple devices when transferring not only a key for decrypting multiple sets of data, but also control information inclusive of usage conditions on each set of data, from one device to another device.

Also, the control information can be safely transferred between valid devices. Transferring the control information to an invalid device is rejected by the transfer source device, and even if the control information is transferred from an invalid device, the transfer destination device can reject receiving the information.

Additionally, in a system which transfers the control information from one device to another device, if a revoked-certificates list that the transfer destination device has is newer than a list that the transfer source device has, the list of the transfer source device can be used to update the list of the transfer destination device while a mutual authentication process is conducted between the devices.

BRIEF DESCRIPTION OF THE DRAWINGS

FIG. 3 is a table that lists the data, information, encoding/decoding schemes, etc. used in the embodiment.

FIG. 10 is a diagram that shows a tamper resistant static storage region for recording Usage Passes in the magnetic disk drive according to the embodiment.

FIG. 11 is a diagram that shows a function module which implements BT mode in the magnetic disk drive.

FIG. 12 is a diagram that shows a recording-only function module which implements Usage Pass transmission in BT mode in the recorder/player.

FIG. 26 is a diagram that shows a processing sequence conducted in BT mode in the embodiment in order to recover a Usage Pass that has been lost after being transmitted from the recorder/player to the magnetic disk drive.

DETAILED DESCRIPTION OF THE INVENTION

Figure 1:
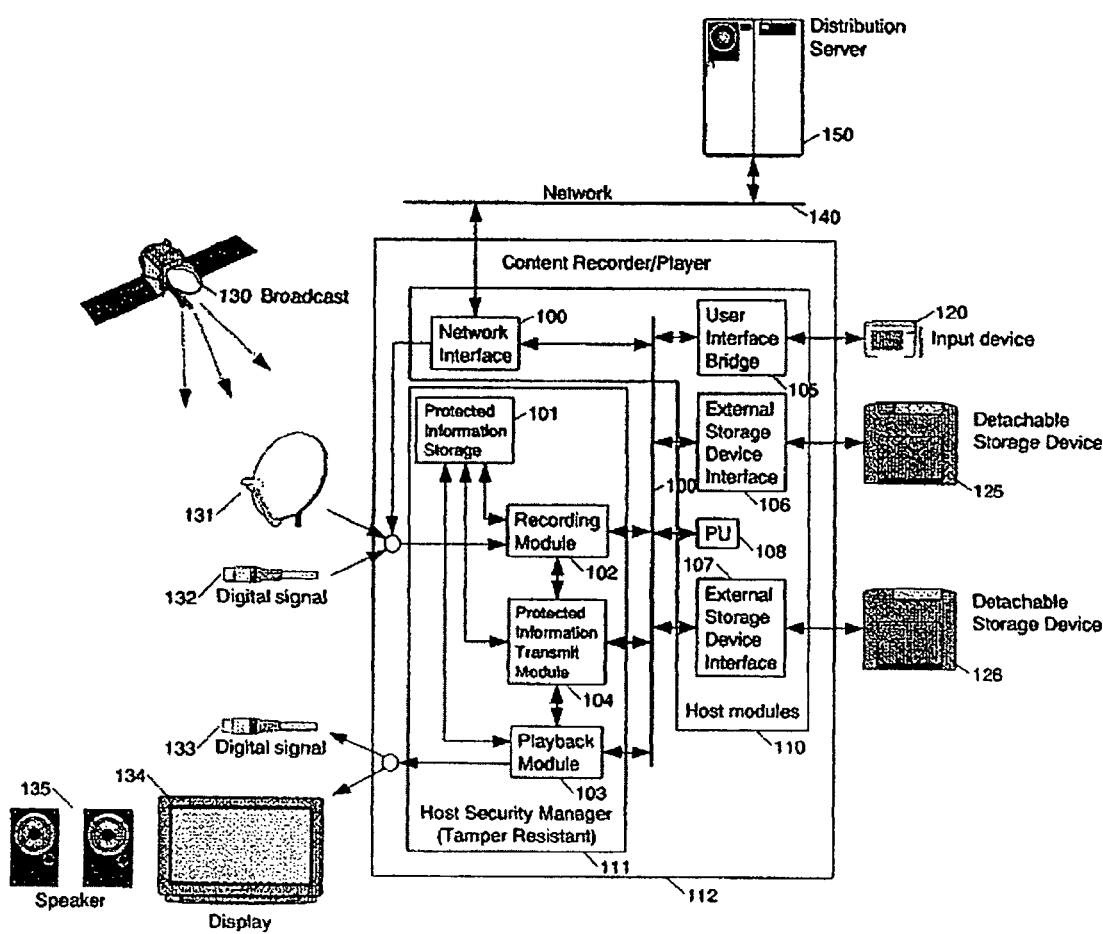
FIG. 1 is a schematic configuration diagram showing a data protection system which includes a recorder/player to which an embodiment of the present invention applies.

An exemplary embodiment of the present invention will be described hereunder.

The description below presupposes that data which requires protection is encrypted, that key data necessary to decrypt the data and conditions under which the decryption is allowed are integrated into one set of data, and that the set of data is recorded in a storage region not freely accessible from a user. A mutually associated set of data that consists of the key data and the conditions under which the decryption is allowed will be called the Usage Pass in the embodiment below.

The present invention discloses the various processes and processing series applied to transferring the Usage Pass from one module to another module. There are two kinds of processing series. One of them is UT (Unidirectional Transfer) mode in which a transfer direction of the Usage Pass is determined uniquely, and the other is BT (Bidirectional Transfer) mode in which the Usage Pass can be transferred bidirectionally. The following describes, as a preferred embodiment, application of these distinctive transfer methods of the Usage Pass to transfer between two devices, for example, a recorder/player and a storage device.

Prior to transfer of the Usage Pass between the recorder/player and a storage device, an appropriate internal processor (in the embodiment below, a host module) of the recorder/player is first selected, depending on which of the two modes is to be used to execute the Usage Pass transfer. The associated mode is then notified to the respective modules of both devices that are to send or receive the Usage Pass. Transfer in a case where UT mode is set for the Usage Pass sending or receiving module will be first described below.

When UT mode is set, the module to finally receive the Usage Pass transmits a Device Class certificate embedded in data of that module, to the module that is to send the Usage Pass. The Device Class certificate includes a Device Class public key. In UT mode, the device including the Usage Pass sending module will be called "Primal Device", and the device including the receiving module will be called "Inceptive Device." In this meaning, the Device Class certificate will be called "Inceptive Device Class certificate", and the Device Class public key will be called "Inceptive Device Class public key."

The Primal Device verifies validity of the received certificate and if verification results indicate the validity of the received certificate, creates a Primal Challenge key that is a key for temporary symmetric-key encryption. After this, the Primal Device encrypts the Primal Challenge key by using the received Device Class certificate, concatenates to the encrypted and created data the Primal Device Class certificate including the Primal Device Class public key, and sends the concatenated data and certificate to the Inceptive Device.

The Inceptive Device decrypts the received data by using its own Device Class private key, and acquires the Primal Challenge key. Next, the Inceptive Device creates a zeroth-order Inceptive session key that is a key for temporary symmetric-key encryption. After creating this key, the Inceptive Device concatenates the key to the Inceptive Device Class public key embedded in the Device's own data, and conducts encryption with the received Primal Device Class key. Additionally, the Inceptive Device concatenates to the thus-obtained data a revoked Device Class list (Inceptive RDCL) recorded in the Device itself, and conducts encryption with the received Primal Challenge key. After conducting the above process steps, the Inceptive Device sends the obtained data to the Primal Device.

The Primal Device then uses the Primal Challenge key to decrypt the received data, and takes out Inceptive RDCL from decryption results. Since RDCL includes issue date information of the data, the Primal Device compares the issue date information of Inceptive RDCL and issue date information of RDCL (Primal RDCL) recorded in the Device itself. If, as a result, the issue date of Inceptive RDCL is newer, Primal RDCL is overwritten with Inceptive RDCL. After comparing the RDCL issue dates, the Primal Device uses a Primal Device private key to decrypt the remaining data. Next, the Primal Device creates a zeroth-order Primal session key that is a key for temporary symmetric-key encryption. After creating this key, the Primal Device conducts encryption with the previously received zeroth-order Inceptive session key. At this time, if the previous comparisons on the RDCL issue date information indicate that the issue date of Primal RDCL is newer, the Primal Device concatenates Primal RDCL to the previously encrypted data. Next, the Primal Device encrypts obtained data with the previously received Inceptive Device public key. After the encryption, the Primal Device sends the obtained data to the Inceptive Device.

The Inceptive Device then uses the Inceptive Device private key to decrypt the received data. If decryption results include Primal RDCL, the Inceptive Device overwrites Inceptive RDCL with Primal RDCL. Next, the Inceptive Device decrypts the remaining data by using the zeroth-order Inceptive session key, and thus obtains the zeroth-order Primal session key.

The above is the authentication process in UT mode. This process is called "UT Connection stage." The zeroth-order Primal session key, the zeroth-order Inceptive session key, and a symmetric Inceptive Device key obtained during encryption with the Inceptive Device public key and decryption with the Inceptive Device private key, are shared following completion of the UT Connection stage.

After the authentication, Usage Pass transfer can be executed. Transfer of a Usage Pass in UT mode is conducted in the sequence described below. The Usage Pass transfer in UT mode is conducted only in a direction from the Primal Device to the Inceptive Device.

First, the Primal Device sets up a desired Usage Pass in the Usage Pass transfer module. Next, the host module sends a UPID, an identifier for identifying the desired Usage Pass, to the Inceptive Device.

The Inceptive Device creates an nth-order Inceptive session key for encrypting the Usage Pass, and records the Inceptive session key, together with the UPID, in a log called "Inceptive Transaction Log." A transfer process stage (RP) is also recorded in this log. The log is used for recovering an original state of the Usage Pass if the Usage Pass transfer process comes to an abnormal end. After creating the nth-order Inceptive session key, the Inceptive Device conducts encryptions with the Inceptive session key (n−1st-order Inceptive session key) that was created during the previous Usage Pass transfer, and with the zeroth-order Primal session key, and transmits encryption results to the Primal Device.

The Primal Device decrypts the received data by using the zeroth-order Primal session key and the n−1st-order Inceptive session key. After that, the Primal Device records the following data in a Primal Device Log: the UPID of the Usage Pass to be transferred, part of the parameter data contained in the Inceptive Device Class certificate, the Inceptive Device public key received during the Connection stage, the nth-order Inceptive session key obtained from the above decryption results, a transfer process stage (SP), decryption-enabling conditions of the data included in the Usage Pass to be transferred, and an address at which the Usage Pass has been recorded.

Next after creating from the Usage Pass set up in the Usage Pass send module a Usage Pass to be actually transmitted, the Primal Device concatenates a parameter indicating a purpose of use (either copying, movement, or reproduction/playback), and "Checksum", to the Usage Pass to be transmitted, and encrypts the data by using the nth-order Inceptive session key and the symmetric Inceptive Device key. After the encryption, the Primal Device updates a transfer process stage element within the Primal Transaction Log to SC, and transmits the data to the Inceptive Device.

The Inceptive Device decrypts received data with the symmetric Inceptive Device key and the zeroth-order Inceptive session key. Next, the Inceptive Device updates a transfer process stage element within the Inceptive Transaction Log to RC, records the recording destination address of the Usage Pass in the Inceptive Transaction Log, and records the data in a Usage Pass storage region.

The above is the Usage Pass transfer process in UT mode. This process is called "UT Transfer stage." As described above, the Usage Pass transfer in UT mode is fixed at the direction from the Primal Device to the Inceptive Device.

If, during execution of the Usage Pass transfer process, an abnormality such as a power supply stoppage occurs in the recorder/player and the Usage Pass is lost in both the Usage Pass transfer source and the Usage Pass transfer destination, an original state of the Usage Pass can be recovered by conducting the process steps below.

If the abnormality occurs, the zeroth-order Primal session key, zeroth-order Inceptive session key, and symmetric Device keys that were shared during the UT Connection stage are all lost in the recorder/player and the storage device. These keys must therefore be newly shared. However, the UT Connection stage does not need to be re-executed and all that is required is just to execute processing described below.

First, the Host transmits to the Primal Device the UPID of the Usage Pass to be recovered. The Primal Device then uses the UPID to search for the Primal Transaction Log. If the Primal Transaction Log including the UPID is consequently detected, the Primal Device creates a new zeroth-order Primal session key. Next, the Primal Device encrypts the created session key with the session key and Inceptive Device public key previously recorded in the detected Primal Transaction Log, and transmits the encrypted data to the Inceptive Device. The Inceptive Device then decrypts the received data and obtains a new zeroth-order Primal session key and symmetric Device keys.

The above is a re-authentication process in UT mode. This process is called "UT Reconnection stage." The new zeroth-order Primal session key and the new symmetric Inceptive Device key obtained during the encryption with the Inceptive Device public key and the decryption with the Inceptive Device private key, are shared following completion of the UT Reconnection stage.

Completion of the UT Reconnection stage is followed by the following Usage Pass recovery process in the Primal Device: the Host transmits to the Inceptive Device the UPID of the Usage Pass to be recovered. The Inceptive Device then uses the received UPID to search for the Inceptive Transaction Log. If the Inceptive Transaction Log including the UPID is consequently detected, the Inceptive Device concatenates the process stage information recorded in the Transaction Log, and existence state information of the Usage Pass, and then transmits the thus-concatenated data to the Primal Device. Prior to the transmission of the concatenated data, a Hash value that has been calculated from the data itself, the zeroth-order Primal session key, and the Inceptive Device session key recorded in the Inceptive Transaction Log, will also be further concatenated to the above data.

Next, the Primal Device checks the received Hash value and verifies that the received data is not falsified. After the verification, the Primal Device searches for the Primal Transaction Log including the received UPID. When the Log is found, the Primal Device overwrites the pre-transfer decryption-enabling conditions recorded in the Log, with a currently existent Usage Pass.

The above is the Usage Pass recovery process in UT mode. This process is called "UT Recovery stage." When this stage is completed, the Usage Pass existing before the above transmission process was conducted will exist in the Primal Device.

Next, transfer in a case where BT mode is set for the Usage Pass sending or receiving module will be described below.

In BT mode, the transfer direction of the Usage Pass is not fixed and both the Primal Device and the Inceptive Device can send/receive the Usage Pass. The internal module of the recorder/player that conducts a mutual authentication process and Usage Pass sending/receiving process in BT mode is called the Inceptive Device, and the internal module of the storage device that conducts a mutual authentication process and Usage Pass sending/receiving process is called the Primal Device. The Device Class certificate is called the Inceptive Device Class certificate, and the Device Class public key is called the Inceptive Device Class public key.

The Primal Device verifies validity of the received certificate and if verification results indicate the validity of the received certificate, creates a Primal Challenge key, which is a key for temporary symmetric-key encryption. After this, the Primal Device encrypts the Primal Challenge key by using the received Device Class public key, concatenates to the encrypted and created data the Primal Device Class certificate including the Primal Device Class public key, and sends the concatenated data and certificate to the Inceptive Device.

The Inceptive Device decrypts the received data by using its own Device Class private key, and thus acquires the Primal Challenge key.

Next, the Inceptive Device creates an Inceptive session key that is a key for temporary symmetric-key encryption. After creating this key, the Inceptive Device concatenates the key to the Inceptive Device Class public key embedded in the Device's own data, and conducts encryption with the received Primal Device Class key. Additionally, the Inceptive Device concatenates to the thus-obtained data (i.e., the data encrypted with the Primal Device Class key) a revoked Device Class list (Inceptive RDCL) recorded in the Device itself, and conducts encryption with the received Primal Challenge key. After conducting the above process steps, the Inceptive Device sends the obtained data to the Primal Device.

The Primal Device then uses the Primal Challenge key to decrypt the received data (encrypted data), and takes out Inceptive RDCL from decryption results. Since RDCL includes issue date information of the data, the Primal Device compares the issue date information of Inceptive RDCL and issue date information of RDCL (Primal RDCL) recorded in the Device itself. If, as a result, the issue date of Inceptive RDCL is newer, Primal RDCL is overwritten with Inceptive RDCL. After comparing the RDCL issue dates, the Primal Device uses a Primal Device private key to decrypt the remaining data. Next, the Primal Device creates a zeroth-order Primal session key, which is a key for temporary symmetric-key encryption. After creating this key, the Primal Device conducts encryption with the previously received zeroth-order Inceptive session key. At this time, if the previous comparisons on the RDCL issue date information indicate that the issue date of Primal RDCL is newer, the Primal Device concatenates Primal RDCL to the previously encrypted data. Next, the Primal Device encrypts obtained data with the previously received Inceptive Challenge key. After conducting the encryption, the Primal Device sends the obtained data to the Inceptive Device.

The Inceptive Device then uses the Inceptive Challenge key to decrypt the received data. If decryption results include Primal RDCL, the Inceptive Device overwrites Inceptive RDCL with Primal RDCL. After this, the Inceptive Device uses the Primal Device public key to decrypt the remaining data, thus obtaining the zeroth-order Primal session key.

The Primal Device then obtains the zeroth-order Inceptive session key by decrypting received data with the Primal Device private key and the zeroth-order Primal session key. After this, the Primal Device records the Inceptive Device public key, the zeroth-order Inceptive session key, the zeroth-order Primal session key, and part of the parameters included in the Inceptive Device Class certificate, in a Primal Connection Log.

The above is the authentication process in BT mode. This process is called "BT Connection stage." The zeroth-order Primal session key, the zeroth-order Inceptive session key, the symmetric Primal Device key obtained during the encryption with the Primal Device public key and the decryption with the Primal Device private key, and the symmetric Inceptive Device key obtained during the encryption with the Inceptive Device public key and the decryption with the Inceptive Device private key are shared following completion of the BT Connection stage.

After the authentication process, transfer of the Usage Pass can be executed. The transfer of the Usage Pass from the Primal Device to the Inceptive Device is first described below.

First, the Primal Device sets up the intended Usage Pass in the Usage Pass transfer module.

After this, the Inceptive Device creates an nth-order Inceptive session key for encrypting the Usage Pass. After the creation of this key, the Inceptive Device conducts data encryption with the Inceptive session key (n−1st-order Inceptive session key) that was created during the immediately previous Usage Pass transfer from the Primal Device to the Inceptive Device, and with the latest Primal session key at that point of time, and then transmits the encrypted data to the Primal Device.

The Primal Device that has received the encrypted data decrypts the data by using the latest Primal session key at that point of time and the n−1st-order Inceptive session key. Also, the Primal Device records the UPID of the Usage Pass to be transferred, a role (transfer function of the Primal Device itself as the transfer source), and the Usage Pass planned to be transmitted, in the proper Transaction Log. In BT mode, only the Primal Device executes recording in the Transaction Log.

After this, a Usage Pass to be actually transmitted is created from the Usage Pass that has been set up in the Usage Pass sending module. Next after recording in the Transaction Log the recording destination address of the Usage Pass in the Inceptive Device, the Primal Device concatenates the parameter indicating the purpose of use (copying, movement, or reproduction/playback), and "Checksum", to the Usage Pass, and encrypts the data by using the nth-order Inceptive session key and the symmetric Inceptive Device key. After conducting the encryption, the Primal Device transmits the data to the Inceptive Device.

The Inceptive Device, after receiving the encrypted data, decrypts the data by using the symmetric Inceptive Device key and the nth-order Inceptive session key, and records the data in the Usage Pass storage region provided inside the Inceptive Device.

The above is the Usage Pass transfer from the Primal Device to the Inceptive Device in BT mode. This process is called "BT PI Transfer stage."

Transfer of the Usage Pass from the Inceptive Device to the Primal Device is first described below. First, the Inceptive Device sets up the intended Usage Pass in the Usage Pass transfer module.

After this, the Inceptive Device substitutes the encrypted data key section of the Usage Pass for 0. Next after concatenating state information of the Usage Pass (the data is called "Masked Usage Pass"), the Inceptive Device further concatenates the latest Primal session key and Inceptive session key to the data and calculates the Hash value. The Inceptive Device concatenates the thus-obtained Hash value to the Masked Usage Pass and transmits the Hash value to the Primal Device.

The Primal Device checks the received Hash value and verifies that the received data is not falsified. After the verification, the Primal Device records the received Usage Pass UPID, the decryption-enabling conditions of the data, and the recording address of the Usage Pass in the Inceptive Device, in the proper Transaction Log. After this, the Primal Device creates an mth-order Primal session key, then conducts data encryption with the Primal session key (m−1st-order Primal session key) that was created during the immediately previous Usage Pass transfer from the Inceptive Device to the Primal Device, and with the latest Inceptive session key at that point of time, and transmits the encrypted data to the Inceptive Device.

The Inceptive Device that has received the encrypted data decrypts the data by using the latest Inceptive session key at that point of time and the m−1st-order Primal session key. Also, the Inceptive Device creates a Usage Pass to be actually transmitted, from the Usage Pass set in the Usage Pass transmitting module. Next, the Inceptive Device concatenates the parameter indicating the purpose of use (copying, movement, or reproduction/playback), and "Checksum", to the Usage Pass to be transmitted, and encrypts the data by using the mth-order Inceptive session key and the symmetric Primal Device key. After the encryption, the Inceptive Device transmits the data to the Primal Device.

The Primal Device, after receiving the encrypted data, decrypts the data by using the symmetric Primal Device key and the mth-order Primal session key.

The above is the Usage Pass transfer from the Inceptive Device to the Primal Device in BT mode. This process is called "BT IP Transfer stage."

As in UT mode, if an abnormality occurs in the recorder/player and the Usage Pass is lost in both the Usage Pass transfer source and the Usage Pass transfer destination, an original state of the Usage Pass can be recovered by conducting the process steps described below. Re-authentication in BT mode slightly differs from that of UT mode; it is unnecessary for the BT PI Transfer stage or the BT IP Transfer stage to have been executed in the past, and only the BT Connection stage needs to have been completed.

If the abnormality occurs, the zeroth-order Primal session key, zeroth-order Inceptive session key, symmetric Primal Device keys, and symmetric Inceptive Device key that were shared during the BT Connection stage are all lost in the recorder/player and the storage device. These keys must therefore be newly shared. However, the BT Connection stage does not need to be re-executed and all that is required is just to execute processing described below.

First, the Primal Device newly creates a zeroth-order Primal session key and after encrypting this key with the Inceptive session key and Inceptive Device public key recorded in the Primal Connection Log, transmits obtained data to the Inceptive Device.

The Inceptive Device, after receiving the encrypted data, decrypts the data by using an Inceptive Device private key and an Inceptive session key recorded in an Inceptive Connection Log. Next after generating a new zeroth-order Inceptive session key and encrypting this key with the Primal session key and Primal Device public key recorded in the Inceptive Connection Log, the Inceptive Device records the received zeroth-order Primal session key and the created zeroth-order Inceptive session key by overwriting in the Inceptive Connection Log and transmits the above-encrypted data to the Primal Device.

The Primal Device, after receiving the encrypted data, decrypts the data by using the Primal Device private key and the zeroth-order Primal session key recorded in the Inceptive Connection Log, and records the newly created zeroth-order Inceptive session key and the above-created zeroth-order Primal session key by overwriting in the Primal Connection Log.

The above is a re-authentication process in BT mode. This process is called "BT Reconnection stage." The new zeroth-order Primal session key, the new zeroth-order Inceptive session key, a new symmetric Primal Device key obtained during the encryption with the Primal Device public key and the decryption with the Primal Device private key, and a new symmetric Inceptive Device key obtained during the encryption with the Primal Device public key and the decryption with the Primal Device private key, are shared following completion of the BT Reconnection stage.

After the BT Reconnection stage or the BT Reconnection stage, if there is a past Usage Pass whose transfer did not come to completion, the state of the Usage Pass that existed before the transfer process was started can be recovered using the method described below. The recovery during the BT PI Transfer stage is described first and then the recovery during the BT IP Transfer stage is described.

Before the Usage Pass that was transferred during the BT PI Transfer stage is recovered to the state existing before the transfer process was executed, the Host transmits to the Primal Device the UPID of the Usage Pass to be recovered.

The Primal Device then uses the received UPID to search for the Primal Transaction Log. If the Primal Transaction Log including the UPID is consequently detected, the Primal Device transmits to the Inceptive Device the Log-recorded recording destination address of the Usage Pass in the Inceptive Device (i.e., the address where the received Usage Pass was planned to be recorded).

The Inceptive Device accesses the Usage Pass storage region accessed with the received address, and after examining the recording state of the Usage Pass, sets up results in Usage Pass Status. Next, the Inceptive Device concatenates the UPID, decryption-enabling conditions relating to the Usage Pass which was searched for, the created Usage Pass Status, and the recording destination address of the Usage Pass, and transmits the concatenated data to the Primal Device. Prior to the transmission of the concatenated data, the Hash value that has been calculated from the data itself, the mth-order Primal session key, and the nth-order Inceptive Device session key recorded in the Inceptive Transaction Log, will also be further concatenated to the above data.

The Primal Device checks the received Hash value and verifies that the received data is not falsified and that the Usage Pass previously transferred to the Inceptive Device does not exist. After the verification, the Primal Device searches for the Primal Transaction Log including the received UPID. When the Log is found, the Primal Device overwrites the pre-transfer decryption-enabling conditions recorded in the Log, with the Usage Pass currently existent in the Usage Pass sending module.

The above is the Usage Pass recovery process during the BT PI Transfer stage. This process itself is called the BT PI Recovery stage. When this stage is completed, the Usage Pass existing before the above transmission process was conducted will exist in the Primal Device.

First, recovery of the Usage Pass during the BT IP Transfer stage is described below. Before the Usage Pass that was transferred during the BT PI Transfer stage is recovered to the state existing before the transfer process was executed, the Host module transmits to the Primal Device the UPID of the Usage Pass to be recovered.

The Primal Device then uses the received UPID to search for the Primal Transaction Log. If the Primal Transaction Log including the UPID is consequently detected, the Primal Device transmits to the Inceptive Device the Log-recorded recording destination address of the Usage Pass in the Inceptive Device (i.e., the address indicating the region in which the Usage Pass scheduled to be transferred was originally recorded).

The Inceptive Device accesses the Usage Pass storage region accessed with the received address, and after examining the recording state of the Usage Pass, sets up results in Usage Pass Status. Next, the Inceptive Device concatenates the UPID, decryption-enabling conditions relating to the Usage Pass which was searched for, the created Usage Pass Status, and the recording destination address of the Usage Pass, and transmits the concatenated data to the Primal Device. Prior to the transmission of the concatenated data, the Hash value that has been calculated from the data itself, the mth-order Primal session key, and the n−1st-order Inceptive Device session key, will also be further concatenated to the above data. The latest Inceptive session key shared at this point of time will be of the n−1st order.

The Primal Device checks the received Hash value and verifies that the received data is not falsified and whether the Usage Pass previously transferred to the Inceptive Device has changed in state during a past transfer (transmission) process. Concurrently with the verification, the Inceptive Device creates an nth-order Inceptive session key. After creating this key, the Inceptive Device encrypts the key by using the n−1st-order Inceptive session key and the mth-order Primal session key, and transmits the encrypted data to the Primal Device.

After receipt of the data, if the Primal Device confirms during the above-described verification that the state of the Usage Pass has been changed by execution of the past transmission, the Primal Device executes the Usage Pass recovery process described below. First, the Primal Device encrypts received data with the mth-order Primal session key and the n−1st-order Inceptive session key. Next, the Primal Device concatenates to the UPID of the Usage Pass the decryption-enabling conditions recorded in the Transaction Log that has been detected during the previous search, and encrypts the concatenated data by using the nth-order Inceptive session key and the symmetric Inceptive Device key. After the encryption, the Primal Device transmits the data to the Inceptive Device.

The Inceptive Device then decrypts the received data by using the symmetric Inceptive Device key and the nth-order Inceptive session key. After that, the Inceptive Device confirms whether the UPID included in the decryption results agrees with the UPID of the Usage Pass to be recovered. If the agreement between the UPIDs is confirmed, the decryption-enabling conditions included in the decryption results are recorded by overwriting on the Usage Pass existing in the Inceptive Device.

The above is the Usage Pass recovery process during the BT IP Transfer stage of the BT mode. This process itself is called the BT IP Recovery stage. When this stage is completed, the Usage Pass existing before the above transmission process was conducted will exist in the Primal Device.

The verification is followed by a search for the Primal Transaction Log including the received UPID. When the Log is found, the pre-transfer decryption-enabling conditions recorded in the Log are overwritten on the Usage Pass currently existent in the Usage Pass sending module.

The above is the Usage Pass recovery process during the BT PI Transfer stage of the BT mode. This process itself is called the BT PI Recovery stage. When this stage is completed, the Usage Pass existing before the above transmission process was conducted will exist in the Primal Device.

An embodiment of the present invention will be described hereunder with reference being made to the accompanying drawings.

System Configuration

First, a total configuration of a system in an embodiment, inclusive of a data recording/reproducing device (recorder/player) and a storage device connectible thereto, is described below using FIGS. 1 and 2.

The embodiment described below is an example of application to a recording/playback system by which broadcast digital video data, digital data delivered from a distribution server, or digital data transmitted via a digital signal line connected to an external device is recorded in a removable storage device and stored digital data within the storage device is reproduced using a display device, speakers, or other constituent elements of the recorder/player. Hereinafter, this digital data recorder/player will be referred to simply as the recorder/player, and the video, musical material, text, and other digital data that the recorder/player receives will be referred to as content data. In the present embodiment, the removable storage device for recording content data is, for example, a magnetic disk drive, a semiconductor memory device, or the like, and any one of these elements has a characteristic control function of the present invention. The description given below takes a magnetic disk drive as an example of the storage device, but does not limit the present invention. Any such device with a characteristic function of the present invention that will be described below can also be applied as a well-known storage device other than a magnetic disk drive.

Content data whose copyright is required to be protected is acquired into recorder/player 112 after being received by an antenna 131 via broadcasting waves or after being received from a distribution server 150 via a network interface 100). The content data delivered will have been encrypted in a broadcasting wave transmitter 130 or the distribution server 150 by means of a required encryption scheme. The encryption scheme may be predefined on its own according to particular content protection specifications. During the above acquisition, key data (hereinafter, called "content key") for decrypting the content data, and usage conditions concerning the content data are also transmitted to the recorder/player 112 separately from the content data. These pieces of information for decrypting the content data will be hereinafter called "decryption control information for the content data." The decryption control information may be transmitted from the same transmission source as that of the content data, or may be transmitted from other transmission sources.

The recorder/player 112 is constructed so that it allows connection of removable storage devices, for example, magnetic disk drives 125, 126. Encrypted content data transmitted with broadcasting waves or transmitted from the distribution server 150, and the decryption control information for the content data are recorded in the magnetic disk drives 125 and 126 via a recording module 102 and a protected information transmit module 104. Also, encrypted content data and the decryption control information for the content data are transmitted from the removable magnetic disk drives 125 and 126 to a playback module 103 via the protected information transmit module 104. The content data is decrypted and reproduced via the playback module 103 within the recorder/player 112.

To prevent unauthorized use of the content data, the content key included in the decryption control information must be such that the key will not be taken out in unauthorized form or by unauthorized means or such that the usage conditions will not be copied in unauthorized form or by unauthorized means or falsified. For these reasons, it is important that a section for sending/receiving the decryption control information and recording and reading out information should be mounted in the recorder/player 112 and the removable magnetic disk drives 125 and 126 so as to have tampering resistance. Such a section corresponds to a host security manager 111 in the recorder/player 112 or to a storage security manager 225 in each magnetic disk drive. A function of a protected information storage 101 within the host security manager 111, and detailed functions of a Usage Pass transfer module 221, a qualified storage controller 222, and a qualified storage 223, each located inside the storage security manager 225, will be described later. The embodiment according to the present invention relates to transfer protocols for exchanging the decryption control information between modules present inside the host security manager 112 and the storage security manager 225. Incidentally, either hardware or software may be used to construct functions of each module inside the recorder/player 112 and the magnetic disk drives 125, 126, and functions of the security managers and the like.

Meanwhile, in the recorder/player 112, the network interface 100 for interfacing to a network, an interface bridge 105 between the network interface 100 and an input device, interfaces 106 and 107 for interfacing to the magnetic disk drives, a processor or processing unit (PU) for controlling these system components, and other sections function together to control data stream processing and delivery within the system. In this sense, hereinafter, these constituent elements will be collectively called a host module 110.

Overview of Intermodule Mutual Authentication and Usage Pass Transfer Schemes

Content data that is transmitted along with broadcasting waves, and content data recorded within other media are typically encrypted using respectively defined schemes. Such kinds of data usually contain respective decryption control information as well. When the recorder/player 112 acquires these kinds of data via an antenna 113 or a digital signal line 132, the recording module 102 decrypts the content data in accordance with the defined schemes and retrieves the decryption control information. Retrieved decryption control information is arranged into one set of data having a specific format defined in the present embodiment. This set of data will be hereinafter called a Usage Pass. A detailed structure of a Usage Pass will be described later using FIG. 4.

The recording module 102, after creating a Usage Pass, transmits the Pass to the magnetic disk drive 125 or 126. Before the transmission can be completed, however, mutual authentication must be completed between the recording module 102 or the protected information transmit module 104 and the Usage Pass transfer module 221. When the authentication process is completed, several sets of key data are shared. After being encrypted using the shared keys, a Usage Pass to be transferred is transmitted from the recording module 102 to the Usage Pass transfer module 221.

The present invention relates to methods of the authentication process to key sharing, and to processing methods of encrypting the Usage Pass with the keys shared during the authentication process, and transferring the encrypted Usage Pass. There are two kinds of processing methods. One kind is a method in which, once the mutual authentication between any two modules has been completed, a transfer direction of the Usage Pass is uniquely defined. The other kind of method makes it possible to transfer the Usage Pass bidirectionally. Hereinafter, the mutual authentication and Usage Pass transfer scheme using the former method will be called a Unidirectional Transfer mode (UT mode for short), and the mutual authentication and Usage Pass transfer scheme using the latter method will be called a Bidirectional Transfer mode (BT mode for short). These modes will be collectively called a Qualified Access mode. During startup of the recorder/player, the host module 110 determines which of the two modes is to be used to conduct the mutual authentication and the transfer of the Usage Pass when the Usage Pass is transferred between the modules.

In the magnetic disk drive, the Usage Pass transfer module 221, after receiving the Usage Pass, transmits the Pass to the qualified storage controller 222. The qualified storage controller is a module that controls the qualified storage 223. The Usage Pass has its main body finally recorded in the qualified storage 223. When the distribution server 150 transmits the Usage Pass to the magnetic disk drive or when the Usage Pass is transferred from one magnetic disk drive to another magnetic disk drive, the module to transfer the Usage Pass may be able to transmit the Usage Pass directly to the Usage Pass transfer module within the transfer destination magnetic disk drive, pursuant to either scheme defined in the present invention. In that case, the network interface 100 and recording module 102 inside the recorder/player 112 only controls the transfer of data from one module to another module and does not directly concern the mutual authentication or the encryption of the Usage Pass.

Next, a configuration of the magnetic disk drive is described below with reference to FIG. 2.

Data is input to/output from the magnetic disk drive via an interface 220. When data other than data to be protected, such as the Usage Pass, is input from outside, the input data is recorded on a magnetic disc 200 from a head 202 via a controller 230. Encrypted content data is also recorded on the magnetic disc 200 in accordance with the flow of the data. When read out, the data flows reversely to that of the above description. The controller 200 itself is controlled by a processor or processing unit (PU) 231. A Usage Pass transfer module 221, a qualified storage controller 222, and the like are also controlled by the processor 231. Although a qualified storage 223 is provided independently of the magnetic disc 200 in FIG. 2, the qualified storage may be provided on the magnetic disc 200, provided that access using only a special access method different from that of reading and writing encrypted content data is permitted and that the magnetic disk drive is constructed so as to prevent operations such as its disassembly for direct readout of internal data.

Structures of System Keys and Data

FIG. 3 shows a list of key data used to encrypt the Usage Pass when this Pass is transferred between the recording module 102 or the playback module 103 and the Usage Pass transfer module 221. This list also contains other data such as the data delivered. Usually, when key data X is key data for symmetrical encryption, data to be encrypted is encrypted using key data X, and decryption of the intended data also uses key data X. When key data X is a private key or public key for asymmetrical encryption, however, the data to be encrypted is encrypted using an associated public key or private key Y different from key data X. Data that was encrypted using the private key Y is decrypted using the key data X. Hereinafter, public key data for asymmetrical encryption will be referred to simply as a public key, private key data for asymmetrical encryption, as a private key, and the key data for symmetrical encryption, as a symmetric key. If an electronic signature accompanies data, this means that a Hash value of a data set in part of which the data is included is encrypted with private key Y appropriate for public key X.

Where $K\_x$ is represented in this Specification, "x" in $K\_x$ is represented as a suffix in all figures.

The following are usable as keys relating to the encryption, decryption, and reproduction of the content data, to the encryption and decryption of the Usage Pass, and to authentication of the recording module 102, the playback module 103, the magnetic disk drives 125 and 126, and the distribution server 150.

A key for encrypting and decrypting the content data is content key $K\_c$. A specific, electronically signed public key $KP\_dc$ for independent authentication is allocated to the distribution server 150, the recording module 102, the playback module 103, and the Usage Pass transfer module 221 each. However, when the entire host security manager 111 is to be mounted as one functional unit resistant to tampering, one $KP\_dc$ may be allocatable to the host security manager 111.

Data that was encrypted with public key $KP\_dc$ can be decrypted with associated private key $K\_dc$. One set of private key data is assigned to each of a definite number of distribution servers 150, recording modules 102, playback modules 103, and Usage Pass transfer modules 221. The definite number here means that the number of servers or modules can be one or more. A unit of sharing between $KP\_dc$ and $K\_dc$ will be called a Class. A safety level that the section for transferring or recording the Usage Pass must satisfy when mounted, and one Usage Pass transfer scheme are defined for one Class. That is to say, the plurality of modules belonging to a Class are all mounted in such a form that they satisfy the safety level defined for the Class, and each of these modules has a function for realizing one common Usage Pass transfer method. Such devices and modules will be collectively called "devices" hereunder.

After being concatenated to other general information, $KP\_dc$ is assigned an electronic signature by required certification authorities and performs a function of a certificate for each device. A public key of the certification authorities for assigning electronic signatures will be referred to as $KP\_CA$, and a private key associated with this public key, as $K\_CA$. Hereinafter, the former key and the latter key will be called the certification authorities public key and the certification authorities private key, respectively. The general information contained in the certificate means an issuance source, serial number, and other information of the certificate. The certificate that indicates validity of $KP\_dc$ will be called the Device Class certificate, the public key $KP\_dc$ will be called the Device Class public key, and the private key used for decrypting key-encrypted data will be called the Device Class private key. The Device Class certificate and the Device Class private key are embedded in each device's own data during shipping.

An independent public key $KP\_d$ and the private key $K\_d$ for decrypting key-encrypted data are also embedded in each device's own data. Hereinafter, the former key and the latter key will be called the Device public key and the Device private key, respectively. The Device public key and Device private key embedded will vary from device to device.

During encryption with a public key, one symmetric key is generated from the public key used for the encryption. This symmetric key is represented as $*KP\_d$. Similarly, during decryption with a private key, one symmetric key is generated from the private key used for the decryption. This symmetric key is represented as $*K\_d$. As a matter of fact, $*KP\_d$ and $*K\_d$ are the same value, and the data encrypted with $*KP\_d$ can be decrypted with $*K\_d$. The two symmetric keys will be called a symmetric Device public key and a symmetric Device private key, respectively. Methods of generating these keys will be further detailed during later description of public key encryption methods.

Figure 2:
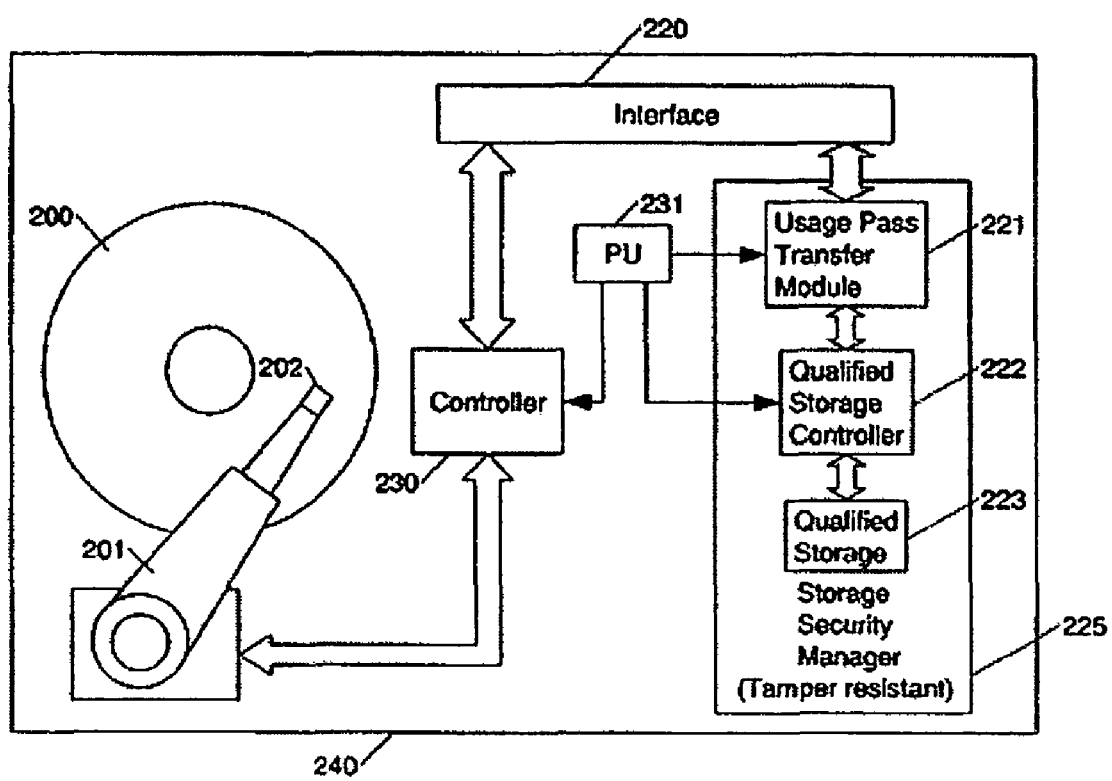
FIG. 2 is a configuration diagram of a removable magnetic disk drive according to the above embodiment.

In addition to the above, a symmetric key $K\_sn$ (n>/=0) and a symmetric key $K\_ch$ are used in the system of FIG. 1. Each time a Usage Pass is transferred between two different devices, K_sn (n>/=0) is generated mainly at the Usage Pass transfer destination in order to encrypt the Usage Pass, and K_ch is generated to encrypt $K_{13}$ s0 which is shared between both devices during a final stage of the mutual authentication between the devices. The keys K_ch and K_s0 are shared during the mutual authentication between the devices, and are not used to encrypt the Usage Pass during the transfer thereof. However, $K_{13}$ sn (n>/=1) is always used after being updated from K_sn to K_sn+1 each time a Usage Pass is transferred. Hereinafter, K_ch will be called a challenge key, and $K_{13}$ sn (n>/=0) a session key. In particular, a session key with "n" equal to 0 will be called a zeroth-order session key.

A suffix of [P] or [I] is assigned to each key. The suffix indicates whether the key has been generated (or embedded) by the Primal Device or the Inceptive Device. The Primal Device here refers to the device of any two devices that executes, in the first process step taken when mutual authentication is conducted between both devices, verification of the Device Class certificate transmitted from the other device. Similarly, the Inceptive Device refers to the device that executes transmission of its own Device Class certificate to the other device.

The encryption using the keys described above is represented as E(X, Y), which indicates that data X is encrypted using key data Y. Likewise, the decryption using the keys is represented as D(X, Y), which indicates that data Y is decrypted using key data X. Also, H(X) indicates a Hash value of data X, and X||Y indicates that data X and data Y are concatenated together. These representations are all common to both UT mode and BT mode.

In UT mode, as described earlier, the transfer direction of a Usage Pass is uniquely defined and this direction is always from the Primal Device to the Inceptive Device. In UT mode, therefore, the recording module 102 always operates as the Primal Device, and the playback module 103 always operates as the Inceptive Device. Meanwhile, the magnetic disk drive operates as the Inceptive Device when the disk drive records the Usage Pass transmitted from the recording module, and operates as the Primal Device when the disk device itself transmits the Usage Pass to the playback module with a view to, for example, decrypting/reproducing the content data.

In BT mode, the device having the host security manager always operates as the Primal Device, and the magnetic disk drive always operates as the Inceptive Device, and in this mode, the Usage Pass can be transferred either from the Primal Device to the Inceptive Device or from the Inceptive Device to the Primal Device.

Usage Pass Structure

Figure 4:
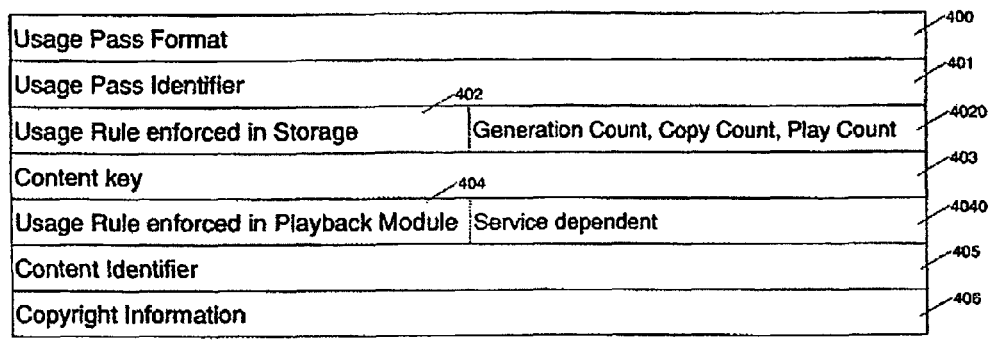
FIG. 4 is a data (Usage Pass) structural diagram that lists decryption conditions and decryption keys on the data used in the embodiment.

A structure of the Usage Pass is described below using FIG. 4.

The Usage Pass includes a Usage Pass Format 400 indicating to what kind of module the Usage Pass itself can be output, an identifier UPID 401 uniquely assigned to the particular Usage Pass, conditions 402 and 404 for qualifying the use of the content data to be transferred, key data K_c 403 for decoding encrypted content data, an identifier CID 405 for identifying the particular content data, and copyright information 406 on the content. There are two kinds of conditions used to qualify the use of the intended content data. One kind is control information UR_s 4020 that is used for the transfer source of the Usage Pass to interpret its details and control its output (the recording module or the magnetic disk drive can usually be the Usage Pass transfer source). The other kind is control information UR_p 4040 that is used for the playback module 103 to receive the Usage Pass and the content data and then control the content data decryption process in the module. Control information UR_p 4040 includes information such as: a General Count indicative of generation information on copies of the Usage Pass; a Copy Count indicating how often the module itself can copy the Usage Pass; and a Play Count indicating how often the module can use its own Usage Pass to decrypt the content data.

Figure 5:
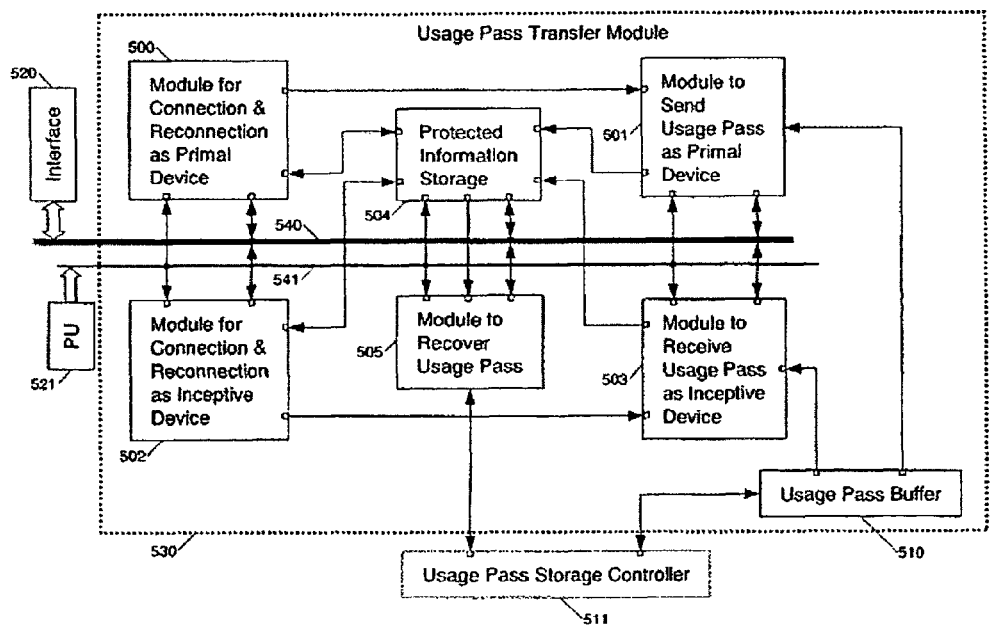
FIG. 5 is a diagram that shows a Usage Pass transfer module 530 which implements UT mode in the magnetic disk drive of FIG. 2 in the embodiment.

Structure of a Usage Pass Transfer Module Capable of Executing Usage Pass Transfer in UT Mode A structure of a Usage Pass transfer module 221 capable of executing Usage Pass transfer in UT mode is described below using FIG. 5.

Usage Pass transfer module 530 contains: a module 500 having a function for the module itself to conduct necessary processing as the Primal Device prior to mutual authentication with respect to any other device; a module 501 having a function for the module itself to transfer the Usage Pass as the Primal Device; a module 502 having a function for the module itself to conduct necessary processing as the Inceptive Device; a module 503 having a function for the module itself to transfer the Usage Pass as the Primal Device; a static storage region 504 in which a user cannot update data on her/his own discretion; a module 505 having a Usage Pass recovery function to avoid loss of the Usage Pass in both the transfer source device and the transfer destination device if execution of the transfer process for the Usage Pass comes to an abnormal end; and a Usage Pass buffer 510 for temporarily storing the Usage Pass before the Pass is transmitted to the qualified storage controller 222, and for temporarily storing the Usage Pass that has been read out from the qualified storage.

The modules 500 and 502 for authentication, the module 501 for encrypting and transmitting the Usage Pass, the module 503 for receiving and decrypting the Usage Pass, the module 505 for recovering the Usage Pass, and the like each access the storage region 504 as necessary. The storage region 504 is called a protected information storage region.

Data exchange between the outside of the magnetic disk drive and any one of these modules is conducted via an interface 520 and a bus 540. PU 521 is the same as the processor 231 of FIG. 2.

The functions that each module actually has will be detailed per FIGS. 17 to 20 in further detailed description of the mutual authentication process and the Usage Pass transfer process. The kinds of data recorded in the protected information storage region 504 will be later described using FIG. 9.

Figure 6:
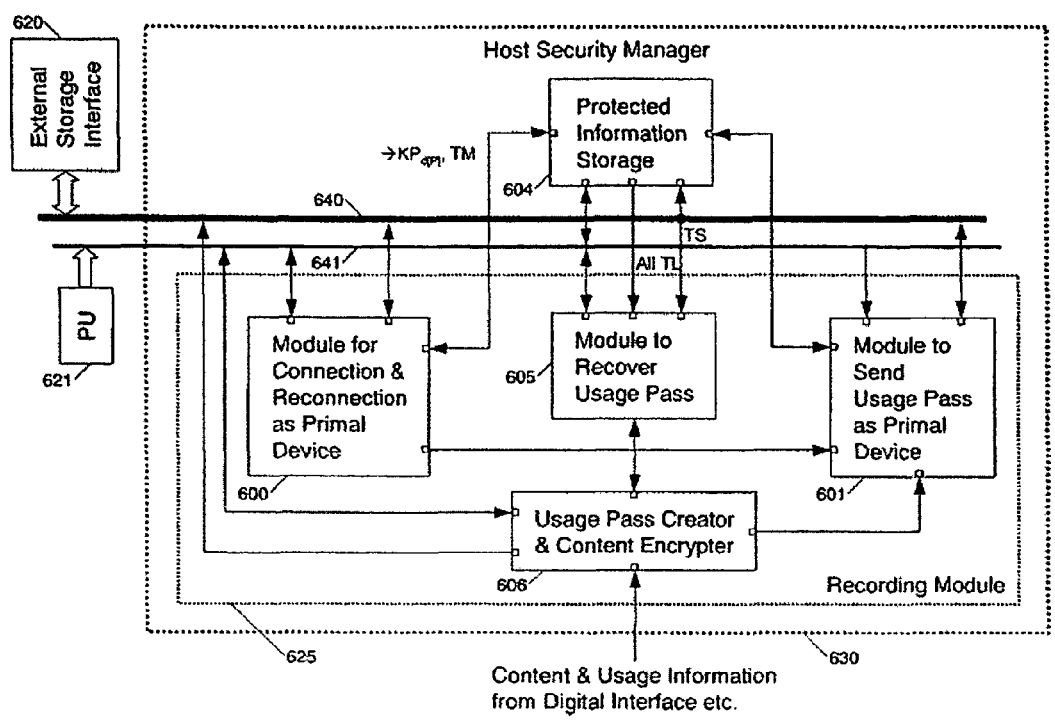
FIG. 6 is a diagram that shows a recording-only function module which implements UT mode in the recorder/player according to the embodiment.

Structure of the Recorder/Player's Recording Module Capable of Executing Usage Pass Transmission in UT Mode A structure of the recording module 102 capable of executing Usage Pass transmission in UT mode is described below using FIG. 6. When the function for transferring the Usage Pass in UT mode is realized using the recorder/player, the protected information transmit module 104 in FIG. 1 is not shown since this module is not always necessary.

In UT mode, the recording module always operates as the Primal Device. Therefore, a recording module 625 contains: a module 600 having a function for the module itself to conduct necessary processing as the Primal Device prior to mutual authentication with respect to any other device; a module 601 having a function for the module itself to transmit the Usage Pass as the Primal Device; a module 605 having a Usage Pass recovery function to avoid loss of the Usage Pass in both the transfer source device and the transfer destination device if execution of the transmission process for the Usage Pass comes to an abnormal end; and a module 606 that has a function to obtain content data and usage right information from outside, and then after generating a content key and encrypting content with the key, generate the Usage Pass including the key. Encrypted content is sent from the module 606 to a data bus 640 and recorded in the magnetic disk drive via an external storage interface 620.

A host security manager 630 including the recording module has a static storage region 604 in which the user cannot update data on her/his own discretion. The module 600 for authentication, the module 601 for encrypting and transmitting the Usage Pass, the module 605 for recovering the Usage Pass, and the like each access the storage region as necessary. The storage region 604 is called a protected information storage region.

The functions that each module actually has will be detailed per FIGS. 17 to 20 in further detailed description of the mutual authentication process and the Usage Pass transfer process. The kinds of data recorded in the protected information storage region 504 will be later described using FIG. 8.

Figure 7:
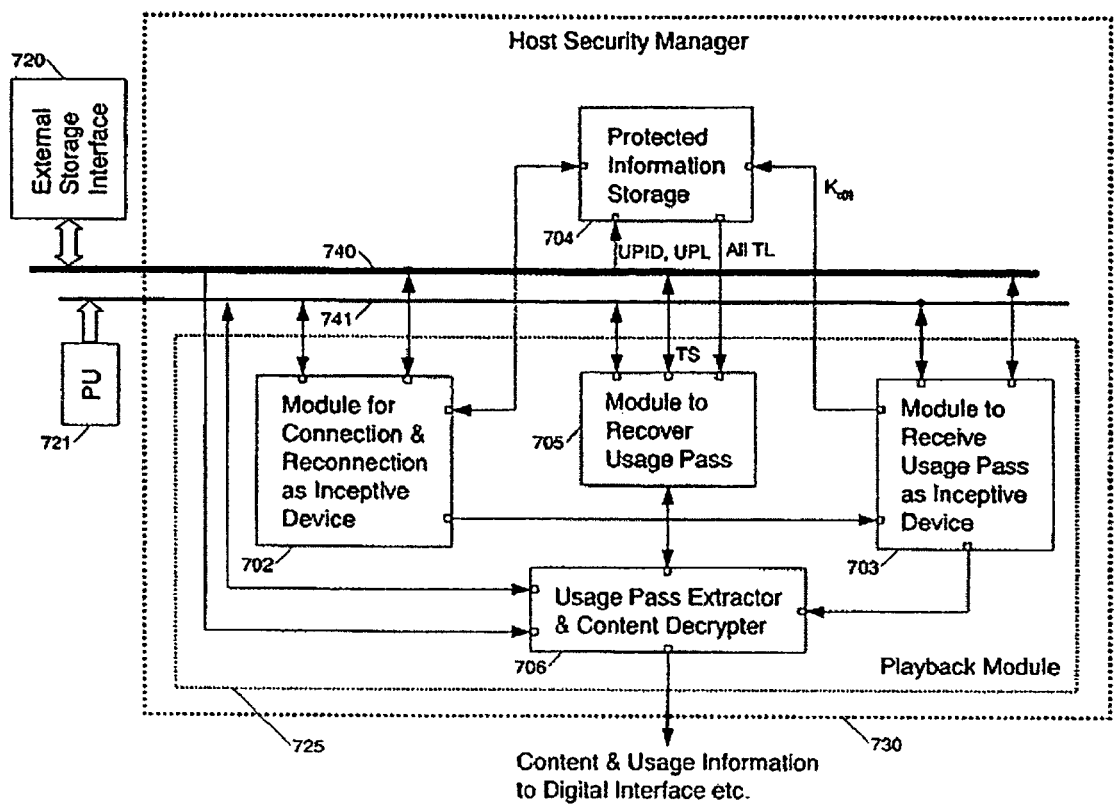
FIG. 7 is a diagram that shows a decryption-only function module which implements UT mode in the recorder/player according to the embodiment.

Structure of the Recorder/Player's Playback Module Capable of Executing Usage Pass Receiving in UT Mode A structure of the playback module 103 capable of executing Usage Pass receiving in UT mode is described below using FIG. 7. When the function for transferring the Usage Pass in UT mode is realized using the recorder/player, the protected information transmit module 104 in FIG. 1 is not shown since this module is not always necessary.

In UT mode, the playback module always operates as the Inceptive Device. Therefore, a playback module 725 contains: a module 700 having a function for the module itself to conduct necessary processing as the Inceptive Device prior to mutual authentication with respect to any other device; a module 703 having a function for the module itself to receive the Usage Pass as the Inceptive Device; a module 605 having a Usage Pass recovery function to avoid loss of the Usage Pass in both the transfer source device and the transfer destination device if execution of the receiving process for the Usage Pass comes to an abnormal end; and a module 706 having a function to interpret from the received Usage Pass the data contained in UR_p which is included in the Usage Pass, and decrypt encrypted content data in accordance with UR_p.

At this time, the encrypted content data is transmitted to the module 706 via an external storage interface 720 and a data bus 740. Decrypted content data is output from the module 706 directly to the outside of the playback module, in the form of passage through a protected data communications path.

A host security manager 730 including the playback module has a static storage region 704 in which the user cannot update data on her/his own discretion. A module 702 for authentication, the module 703 for receiving and decrypting the Usage Pass, the module 705 for recovering the Usage Pass, and the like each access the storage region as necessary. The storage region 704 is called a protected information storage region.

The functions that each module actually has will be detailed per FIGS. 17 to 20 in further detailed description of the mutual authentication process and the Usage Pass transfer process. The kinds of data recorded in the protected information storage region 504 will be later described using FIG. 8.

Structure of Protected Information Storage Regions for UT Mode, in the Host Security Manager A structure of protected information storage regions for UT mode, in the recorder/player, is described below using FIG. 8. Storage region 819 is a region that the recording module 102 accesses, whereas storage region 839 is a region that the playback module 103 accesses. The same kind of data is retained or recorded in storage regions 819 and 839. The data is described below.

Reference numbers 801 and 821 denote Device Class List. The Device Class certificate 801 includes a Device Class public key 800. Similarly, the Device Class certificate 821 includes a Device Class public key 820. The Device Class List are for certifying validity of the Device Class public key included in the certificate, and these certificates each include an electronic signature. An electronic signature section is encrypted with a certification authorities private key K_CA.

Reference numbers 803 and 823 denote certification authority public keys, 804 and 824, Device Class private keys, 805 and 825, Device public keys, and 806 and 826, Device private keys.

The above certificates and key information are embedded during initial mounting, and they are not updated later.

In contrast to the above, the information denoted as 802, 822, 810, 811, 830, and 831, is updated during the mutual authentication process and/or the Usage Pass transfer process. The information denoted as 802 and 822 is a list of revoked Device Classes. This list is called RDCL. If safety of a Device Class public key KP_dc is lost, a characteristic number of the certificate which includes KP_dc is registered on the list. When the validity of the Device Class certificate that has been sent from any other device is verified, whether the certificate is falsified is confirmed using the electronic signature section. It is also confirmed whether the characteristic number of the certificate is registered on the list. Also, reference numbers 810, 811, 830, 831 denote storage regions called "Transaction Logs." Each of the Transaction Logs contains the UPID of the Usage Pass to be transferred, and "information on receivable Usage Pass Formats" that is included in the Device Class certificate transmitted from the other party in mutual authentication. Only the Primal Device records the information relating to receivable Usage Pass Formats, and the information will be called "Type Map" hereunder. The Device public key of the other device which is executing mutual authentication (only the Inceptive Device records the public key), a session key created during the transfer, the progress of the Usage Pass transfer process that is called "Session Status", the UR_s information existing before the transfer is executed (only the Primal Device records the UR_s information), and the current recording address or recording destination address of the Usage Pass are recorded when the Usage Pass transfer is executed. Recording these kinds of data at each stage of the Usage Pass transfer process makes it possible to recover the Usage Pass, even if the Usage Pass is lost in both the transfer source and the transfer destination by an accidental event or the like. Timing in which these kinds of data are recorded will be detailed per FIGS. 17 to 20 in further detailed description of the mutual authentication process and the Usage Pass transfer process.

The Type Map is described below. As mentioned above, the Type Map indicates "the information on receivable Usage Pass Formats". The information is contained in the Device Class certificate, and in this meaning, during the authentication process, the information is sent to the device that becomes the other party in the authentication. The device that becomes the other party in the authentication uses the Type Map to judge what sort of Usage Pass the other device can receive when that device is the Usage Pass transfer source. For example, if the Usage Pass Format of a Usage Pass indicates "Type 0", when the Type Map within the Device Class certificate transmitted from the other party in the authentication is "Unable to receive Type 0", the device to transfer the Usage Pass does not conduct the Usage Pass transfer process.

Figure 8:
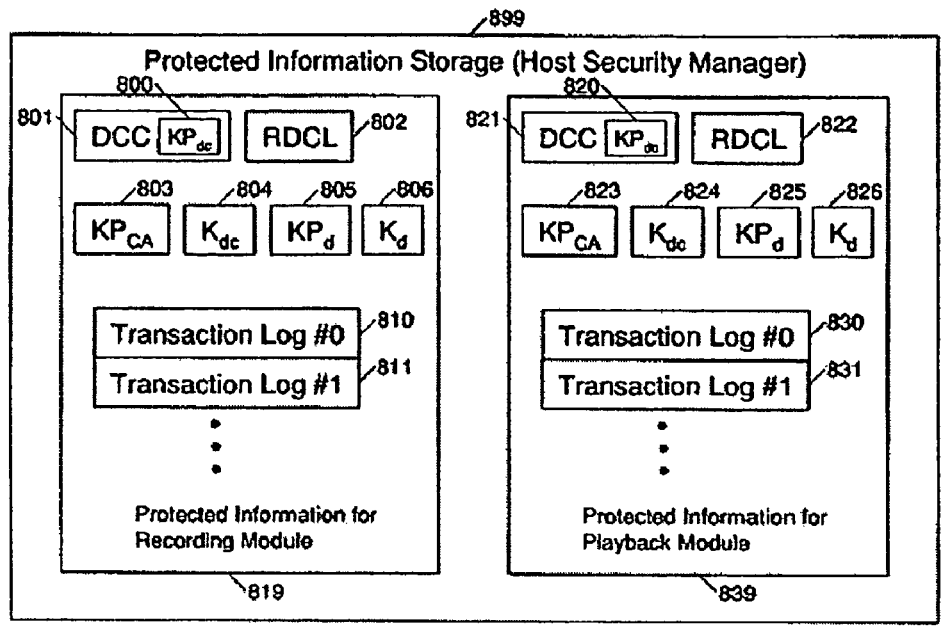
FIG. 8 is a diagram that shows tamper resistant static storage regions for recording the certificates, public keys, private keys, Usage Pass transfer processing log information, and other private information used in UT mode in the recorder/player according to the embodiment.

In FIG. 8, the protected information storage regions are separated into the storage region for the recording module and the storage region for playback, and these regions are constructed so that the Device Class certificate, the certification authorities public key, the Device Class private key, the Device public key, the Device private key, the Transaction Log recording region, the revoked Device Classes list, and the like are recorded in the particular region. These storage regions, however, do not necessarily need to be arranged in that form. That is to say, the storage regions may be arranged so that both the recording module and the playback module use one Device Class certificate, one certification authorities public key, one Device Class private key, one Device public key, and one Device private key, and the Transaction Log recording region and the RDCL recording region may be arranged as sharable regions.

Figure 9:
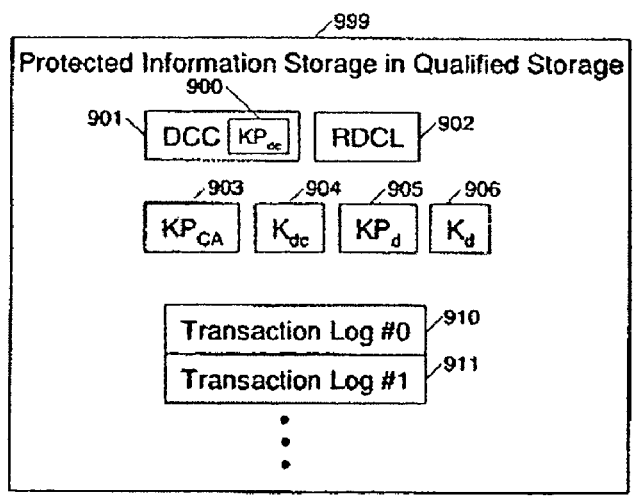
FIG. 9 is a diagram that shows a tamper resistant static storage region for recording the certificates, public keys, private keys, Usage Pass transfer processing log information, and other private information used in UT mode in the magnetic disk drive according to the embodiment.
Figure 1:
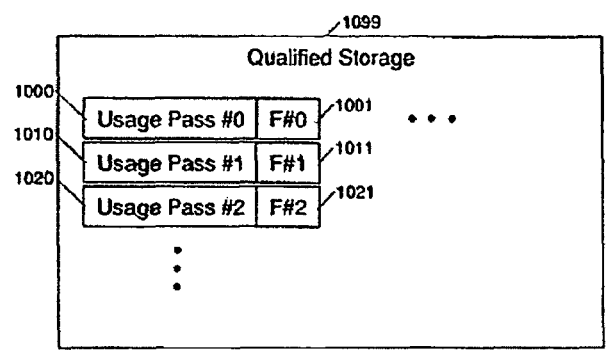
Figure 1:
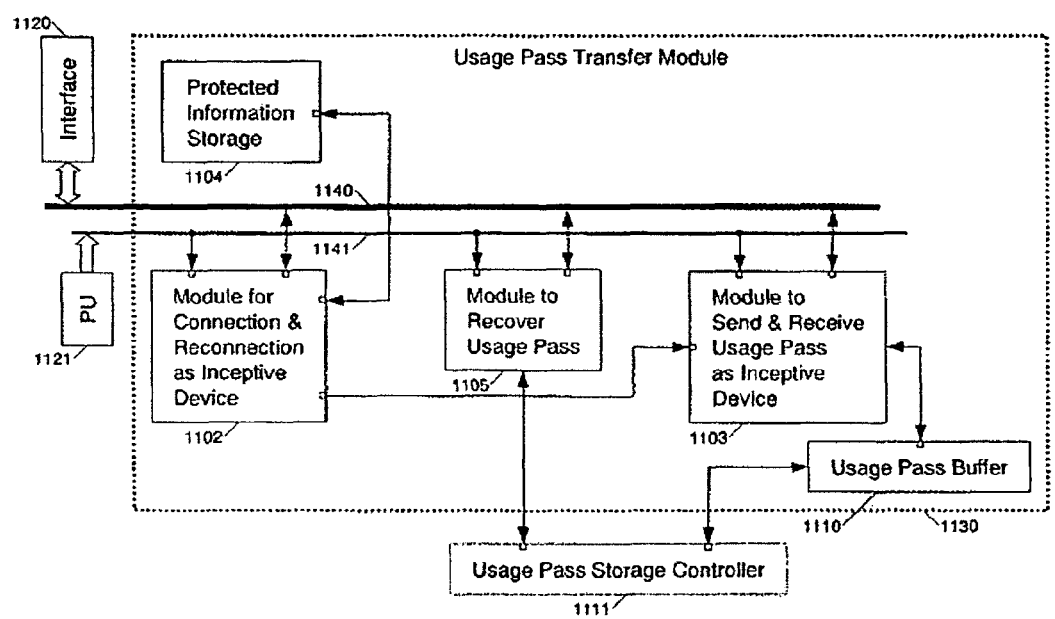
Figure 1:
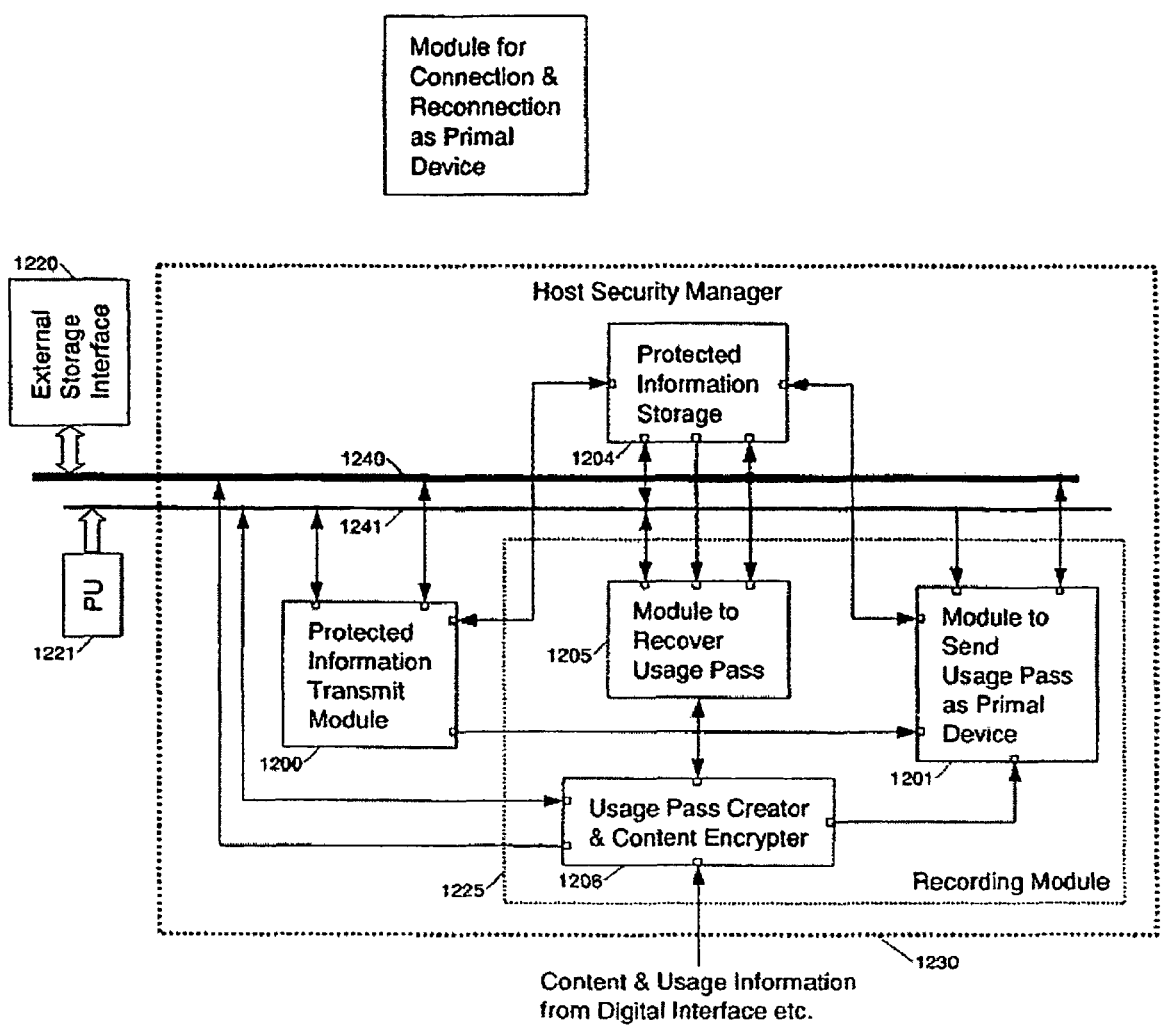

Structure of the Protected Information Storage Regions Existing in the Usage Pass Transfer Module A structure of the protected information storage regions for UT mode, in the magnetic disk drive, is described below using FIG. 9. As shown, data that is recorded in the protected information storage region 504 provided inside the Usage Pass transfer module is the same as either the Protected Information 819 retained and recorded for the recording module in FIG. 8, or the Protected Information 839 retained and recorded for the playback module. That is to say, two regions are provided. One is a region 902 for embedding one Device Class certificate 901, one certification authorities public key 903, one Device Class private key 904, one Device public key 905, and one Device private key 906, and recording one RDCL. The other is a region for recording an appropriate number of Transaction Log. The Device Class certificate 901 and the keys 903, 904, 905, 906 are used, irrespective of whether the magnetic disk drive becomes the Primal Device or becomes the Inceptive Device. The same also applies to the Transaction Log recording regions. RDCL updating can occur, irrespective of whether the magnetic disk drive becomes the Primal Device or becomes the Inceptive Device. RDCL updating criteria will be later described using FIG. 17.

Structure of the Qualified Storage 223

A structure of the qualified storage 223 is described below using FIG. 10. The qualified storage 223 present in the magnetic disk drive is a section for recording and retaining the Usage Passes sent from the recording module and other magnetic disk drives. Usage Pass recording is controlled by the qualified storage controller 222. The qualified storage 223 includes, for example, regions 1000, 1010, 1020, each for recording a main body of a Usage Pass, and, for example, regions 1001, 1011, 1021, each for recording a flag which indicates validity of the Usage Pass. Hereinafter, these flags will be called validity indicator flags. The validity indicator flag written in the region 1001 indicates the validity of the Usage Pass written in the region 1000, the validity indicator flag written in the region 1011 indicates the validity of the Usage Pass written in the region 1010, and the validity indicator flag written in the region 1021 indicates the validity of the Usage Pass written in the region 1020. One region for recording a Usage Pass and one region for recording a validity indicator flag are paired as described above, and are provided in large numbers inside the qualified storage 223 similarly to the above. A value that indicates "Valid" is recorded in each validity indicator flag region by the qualified storage controller 222 when a valid Usage Pass is written into the region paired with the flag. After a written Usage Pass has been output to the playback module or any other magnetic disk drive, a value that indicates "Invalid" is recorded in the associated region. In a completely initial state, a value that indicates "Not recorded" is recorded. The Usage Passes recorded in the qualified storage are read out by the qualified storage controller 222.

Structure of a Usage Pass Transfer Module Capable of Executing Usage Pass Transfer in BT Mode A structure of a Usage Pass transfer module capable of executing Usage Pass transfer in BT mode is described below using FIG. 11.

In BT mode, the magnetic disk drive always operates as the Inceptive Device. Therefore, a Usage Pass transfer module 1130 contains: a module 1102 having a function for the module itself to conduct necessary processing as the Inceptive Device prior to mutual authentication with respect to any other device; a module 1103 having a function for the module itself to transfer the Usage Pass as the Inceptive Device; a static storage region 1104 in which the user cannot update data on her/his own discretion; a module 1105 having a Usage Pass recovery function to avoid loss of the intended Usage Pass in both the transfer source device and the transfer destination device if execution of the transfer process for the Usage Pass comes to an abnormal end; and a Usage Pass buffer 1110 for temporarily storing the Usage Pass before the Pass is transmitted to the qualified storage controller 222, and for temporarily storing the Usage Pass that has been read out from the qualified storage.

The static storage region 1104 is called a protected information storage region, as in UT mode. The data recorded in this region, however, slightly differs from the data recorded in the region 504. A module 1100 for authentication accesses the storage region as necessary.

Data exchange between the outside of the magnetic disk drive and any one of these modules is conducted via an interface 1120 and a bus 1140. PU 1121 is the same as the processor 231 of FIG. 2. The functions that each module actually has, the kinds of data recorded in the protected information storage region 1104, and other factors will be later described using FIG. 15 and FIGS. 21 to 26.

Structure of the Recorder/Player's Recording Module Capable of Executing Usage Pass Transmission in BT Mode A structure of the recording module 102 capable of executing Usage Pass transmission in BT mode is described below using FIG. 12.

In BT mode, an entire host security manager 111 always operates as the Primal Device, and the Usage Pass flows bidirectionally with respect to the host security manager 111. It is therefore appropriate to construct a recording module 1225 so that this module includes only a function necessary to output the Usage Pass and so that the protected information transmit module 104 includes other functions such as conducting mutual authentication with respect to the Inceptive Device. Accordingly, the recording module contains: a module 1201 having a function for the module itself to transmit the Usage Pass as the Primal Device; a module 1205 having a Usage Pass recovery function to avoid loss of the Usage Pass in both the transfer source device and the transfer destination device if execution of the transmission process for the Usage Pass comes to an abnormal end; and a module 1206 that has a function to obtain content data and usage right information from outside, and then after generating a content key and encrypting content with the key, generate the Usage Pass including the key. Encrypted content is sent from the module 1206 to a data bus 1240 and recorded in the magnetic disk drive via an external storage interface 1220.

A host security manager 1230 including the recording module has a static storage region 1204 in which the user cannot update data on her/his own discretion. A module 1200 for authentication, the module 1201 for encrypting and transmitting the Usage Pass, the module 1205 for recovering the Usage Pass, and the like each access the storage region as necessary. The storage region 1204 is called a protected information storage region.

The functions that each module actually has will be detailed in the further detailed description of the mutual authentication process and the Usage Pass transmission process with reference to FIGS. 22 to 27. The kinds of data and the like recorded in the protected information storage region 1204 will be described later using FIG. 15.

Structure of the Recorder/Player's Playback Module Capable of Executing Usage Pass Receiving in BT Mode A structure of the playback module 103 capable of executing Usage Pass receiving in BT mode is described below using FIG. 13.

In BT mode, the playback module, as with the recording module, always operates as the Primal Device. As set forth in the description of the recording module, the protected information transmit module 104 undertakes the function of the host security manager which operates as the Primal Device to conduct mutual authentication with respect to the Inceptive Device. Accordingly, playback module 1325 contains: a module 1303 having a function for the module itself to receive the Usage Pass as the Primal Device; modules 1305 and 1301 both having a Usage Pass recovery function to avoid loss of the Usage Pass in both the transfer source device and the transfer destination device if execution of the receiving process for the Usage Pass comes to an abnormal end; and a module 1306 having a function to interpret from the received Usage Pass the data contained in UR_p which is included in the Usage Pass, and decrypt encrypted content data in accordance with UR_p. At this time, the encrypted content data is transmitted to the module 1306 via an external storage interface 1320 and a data bus 1340. Decrypted content data is output from the module 1306 directly to the outside of the playback module, in the form of passage through a protected data communications path.

A host security manager 1330 including the playback module has a static storage region 1304 in which the user cannot update data on her/his own discretion. A module 1302 for authentication, the module 1303 for receiving and decrypting the Usage Pass, the modules 1305 and 1301 for recovering the Usage Pass, and the like each access the storage region as necessary. The storage region 1304 is called a protected information storage region.

The functions that each module actually has will be detailed per FIGS. 22 to 27 in further detailed description of the mutual authentication process and the Usage Pass transfer process. The kinds of data recorded in the protected information storage region 1304 will be later described using FIG. 15.

Structure of the Protected Information Transmit Module for BT Mode

Figure 14:
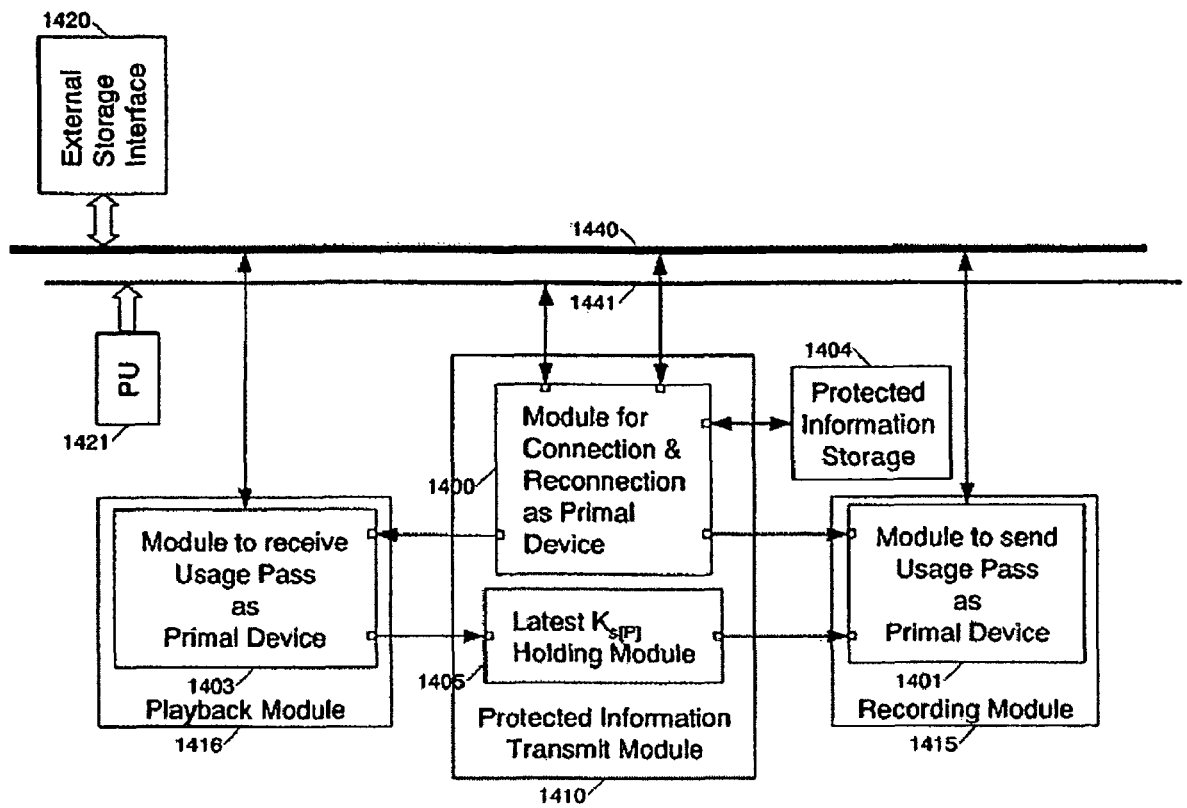
FIG. 14 is a diagram that shows a decryption-only function module which implements mutual authentication with respect to the magnetic disk drive in BT mode in the recorder/player.

A structure of the protected information transmit module for BT mode is described below using FIG. 14.

As set forth in the description of the recording module and the playback module, it is appropriate to construct the protected information transmit module so that this module executes mutual authentication with respect to the Inceptive Device. Accordingly, protected information transmit module 1410 contains: a module 1400 that operates as the Primal Device to execute the mutual authentication with respect to the Inceptive Device; and a module 1405 that temporarily holds the latest session key created by a Usage Pass receiving module 1403 present inside a playback module 1416, and conducts transmission to a Usage Pass transmitting module 1401 within a recording module. Creation timing of the latest session key in the Usage Pass receiving module 1403, a method of using this session key in the Usage Pass transmitting module 1401, and other factors will be detailed in the description of processing sequences that uses FIGS. 23 and 24.

Structure of Protected Information Storage Regions for BT Mode, in the Host Security Manager A structure of protected information storage regions for BT mode, in the recorder/player, is described below using FIG. 15. BT mode is a scheme designed so that regardless of the Usage Pass transfer direction, the entire host security manager 111 and the magnetic disk drive always operate as the Primal Device and the Inceptive Device, respectively. The Usage Pass can therefore be transferred in both directions in BT mode. For this reason, the static storage region in the recorder/player can usually be downsized by mounting the recording module 102 and the playback module 103 so that both of the modules share one protected information storage region.

Figure 15:
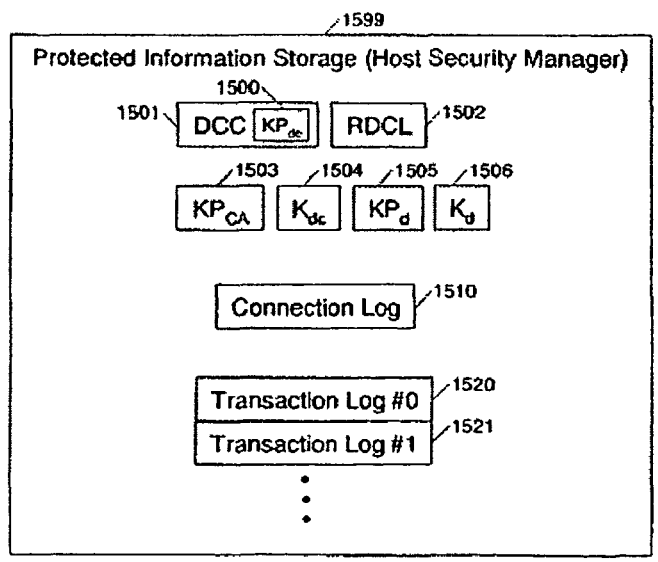
FIG. 15 is a diagram that shows a tamper resistant static storage region for recording the certificates, public keys, private keys, mutual authentication processing log information, Usage Pass transfer processing log information, and other private information used in BT mode in the magnetic disk drive.

FIG. 15 assuming such a situation shows an internal structure having protected information storage regions. As described for UT mode, an independent storage region may be provided for the recording module 102 and the playback module 103 each, and a Device Class certificate and the keys required for mutual authentication may be stored into each such region. In this case, both the recording module 102 and the playback module 103 will have to include an execution module for the mutual authentication. Such a case, therefore, is not described in the present embodiment.

Reference number 1501 denotes a Device Class certificate. The device Class certificate 1501 includes a Device Class public key 1500. The Device Class certificate for certifying validity of the Device Class public key also includes an electronic signature. An electronic signature section is encrypted with a certification authorities private key K_CA.

Reference numbers 1503 denotes a certification authorities public key. 1504 a Device Class private key, 1505 a Device public key, and 1506 a Device private key.

The above certificate and key information are embedded during initial mounting, and they are not updated later.

In contrast to the above, the two kinds of information recorded in regions 1502 and 1510 are RDCL and a Connection Log, respectively, which are information that is updated during mutual authentication. A meaning and function of the data contained in RDCL are the same as in UT mode. The Connection Log is characteristic log information of the BT mode. In the log are recorded the Device public key of the device which operates as the other party in the authentication, the zeroth-order session keys generated by the device itself and by the other device, and the Type Map. As shown, the Connection Log does not have multiple entries. After the mutual authentication has been executed between any two devices, if one of the devices is reconnected to a different device, the Connection Log will be overwritten.

Transaction Logs are recorded in regions 1520 and 1521. Although the Transaction Logs are information updated during Usage Pass transfer, the data recorded differs from that recorded in UT mode. The data recorded as a Transaction Log in BT mode includes the UPID of the Usage Pass to be transferred, the kind of transfer (whether the device itself is the transfer source or transfer destination of the Usage Pass), UR_s existing before the transfer is executed (the UR_s information in this case, however, applies only when the Primal Device is the transfer source of the Usage Pass), and the current recording address of the Usage Pass (however, only when the Primal Device is the transfer source) or the recording destination address thereof (however, only when the Primal Device is the transfer destination of the Usage Pass.) All the above data is recorded when the Usage Pass transfer is executed. Recording all the above data during the Usage Pass transfer process makes it possible to recover the Usage Pass, even if the Usage Pass is lost in both the transfer source and the transfer destination by an accidental event or the like. Timing in which the data is recorded will be detailed per FIGS. 23, 24, 26 and 27, in further detailed description of the Usage Pass transfer process.

Figure 16:
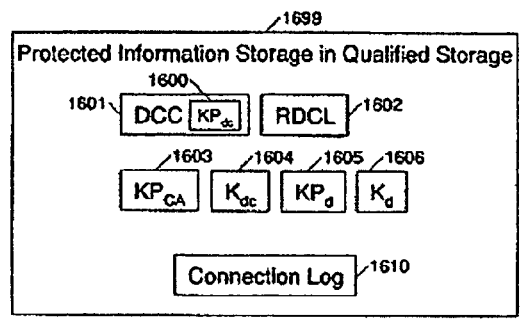
FIG. 16 is a diagram that shows a tamper resistant static storage region for recording the certificates, public keys, private keys, mutual authentication processing log information, Usage Pass transfer processing log information, and other private information used in UT mode in the magnetic disk drive.

Structure of the Protected Information Storage Regions Existing in the Usage Pass Transfer Module The structure of the protected information storage regions for BT mode, in the magnetic disk drive, is described below using FIG. 16. As previously described, BT mode is a scheme designed so that regardless of the Usage Pass transfer direction, the entire host security manager 111 and the magnetic disk drive always operate as the Primal Device and the Inceptive Device, respectively. The Usage Pass can therefore be transferred in both directions in BT mode.

As shown, the data recorded in the protected information storage regions of the Usage Pass transfer module is the same as the data recorded in the host security manager 111, except for Transaction Logs. More specifically, reference number 1601 denotes the Device Class certificate including a Device Class public key 1600. Reference number 1603 denotes a certification authorities public key, 1604 a Device Class private key, 1605 a Device public key, 1606 a Device private key, and 1610 a Connection Log recording region.

In addition, as shown, the protected information storage regions in the qualified storage 223 include no Transaction Log recording region. This means that when the Usage Pass is transferred, the magnetic disk drive does not record Transaction Logs. There is a feature in that since logs are not recorded, a processing load of the magnetic disk drive during the Usage Pass transfer in BT mode is correspondingly reduced in comparison with a transfer processing load of the magnetic disk drive in UT mode.

The above certificate and key information are embedded during initial mounting, and they are not updated later. In addition, Connection Logs are updated during the mutual authentication conducted with respect to the device which is to execute the Usage Pass. These respects are the same as those set forth in the description of the protected information storage 101 within the host security manager 111.

Next, the mutual authentication process and Usage Pass transfer process conducted between the host module 110, the Primal Device, and the Inceptive Device, will be described in detail with reference to FIGS. 17 to 27. These figures show instructions that the host module issues, data that flows along a data bus in association with the instructions, and the processes and functions required for each device or module to receive or transmit the instructions and the data and execute the mutual authentication or the Usage Pass transfer.

Usage Pass Transfer Mode Setup

In order for a device to transfer a Usage Pass, whether the device is to use UT mode or BT mode to execute the Usage Pass transfer first needs to be set up, with the host module 110 as an intervener, for the removable storage devices 125, 126 connected to the device and for the host security manager 111 inherent in the device. In order to implement the above, the processes and functions required for each device or module are shown from viewpoints of the instructions issued from the host module, and a stream of the data flowing in association with the instructions, are shown in FIG. 17.

Figure 17:
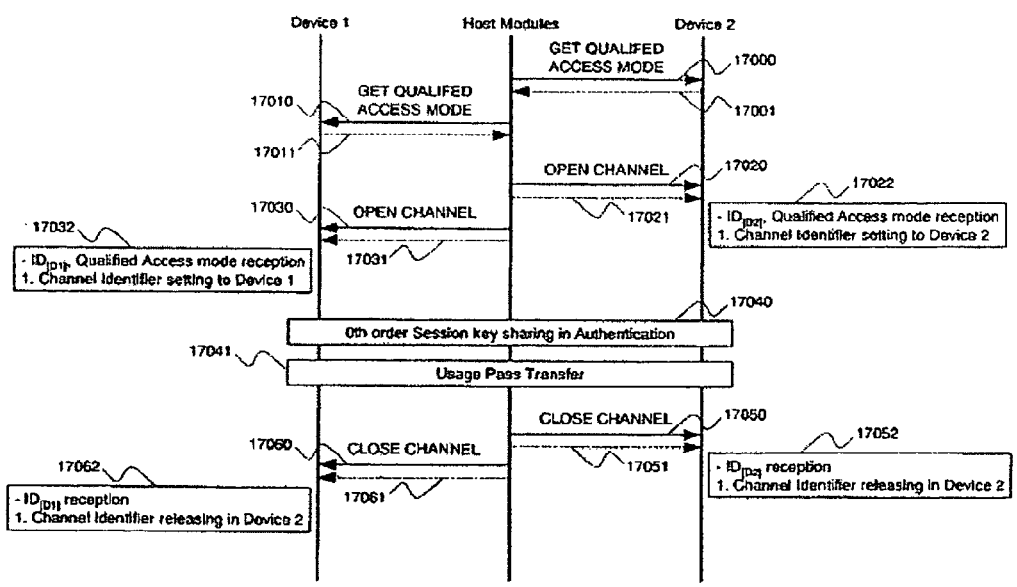
FIG. 17 is a diagram showing a processing sequence for access mode recognition and setup during Usage Pass transfer processing in the embodiment.

Although the two Devices connected via the host module are called Device 1 and Device 2 for convenience's sake in FIG. 17. Both of the two Devices are either a host security manager (more specifically in terms of function, a recording module or a playback module may be used instead) or a Usage Pass transfer module present inside any one of the two removable storage devices. In other words, the Devices 1 and 2 can each be any one of these modules.

First, the host module issues a GET QUALIFIED ACCESS MODE instruction 17000 to the Device 2. The Device 2 then sends a response 17001 to notify to the host module 110 whether the Device itself has either the function of executing the Usage Pass transfer in UT mode, or the function of executing the Usage Pass transfer in BT mode, or both of the two functions.

Next, the host module 110 also issues to the Device 1 the same instruction 17010 as the instruction mentioned above. As with the Device 2, the Device 1 then sends a response 17011 to notify to the host module 110 whether the Device 1 itself has either the function for executing the Usage Pass transfer in UT mode, or the function for executing the Usage Pass transfer in BT mode, or both of the two functions.

In this way, the host module 110 can know the kinds of Usage Pass transfer modes provided in the Devices 2 and 1, and the host module 110 selects the modes of both Devices and sets up the modes for both Devices. An OPEN CHANNEL instruction 17020 for the Device 2, and an OPEN CHANNEL instruction 17030 for the Device 1 are used to set up the modes. In association with these instructions, an identifier for identifying the kind of qualified access mode to be used to execute the Usage Pass transfer, and an identifier for making multiple transfer processes separable when the multiple transfer processes are to be executed in a simultaneous/parallel fashion are transmitted as data 17021 and data 1073, respectively, to both Devices. These identifiers are called Channel identifiers hereunder. In FIG. 17, the Channel identifier set up for the Device 1 is shown as ID_[D1], and the Channel identifier set up for the Device 2, as ID_[D2].

The above transmission in a simultaneous/parallel fashion refers to, for example, transmission under the situation described below. After establishment of authentication, when the Usage Pass is to be transferred, a Channel ID is identified and the transfer is conducted only under that Channel ID. Particularly in UT mode, when data is read from the Device 2 (magnetic disk drive) while being written thereinto, the instructions that the host module issues may take such a form as interleaved. This status is shown in FIG. 28.

Figure 28:
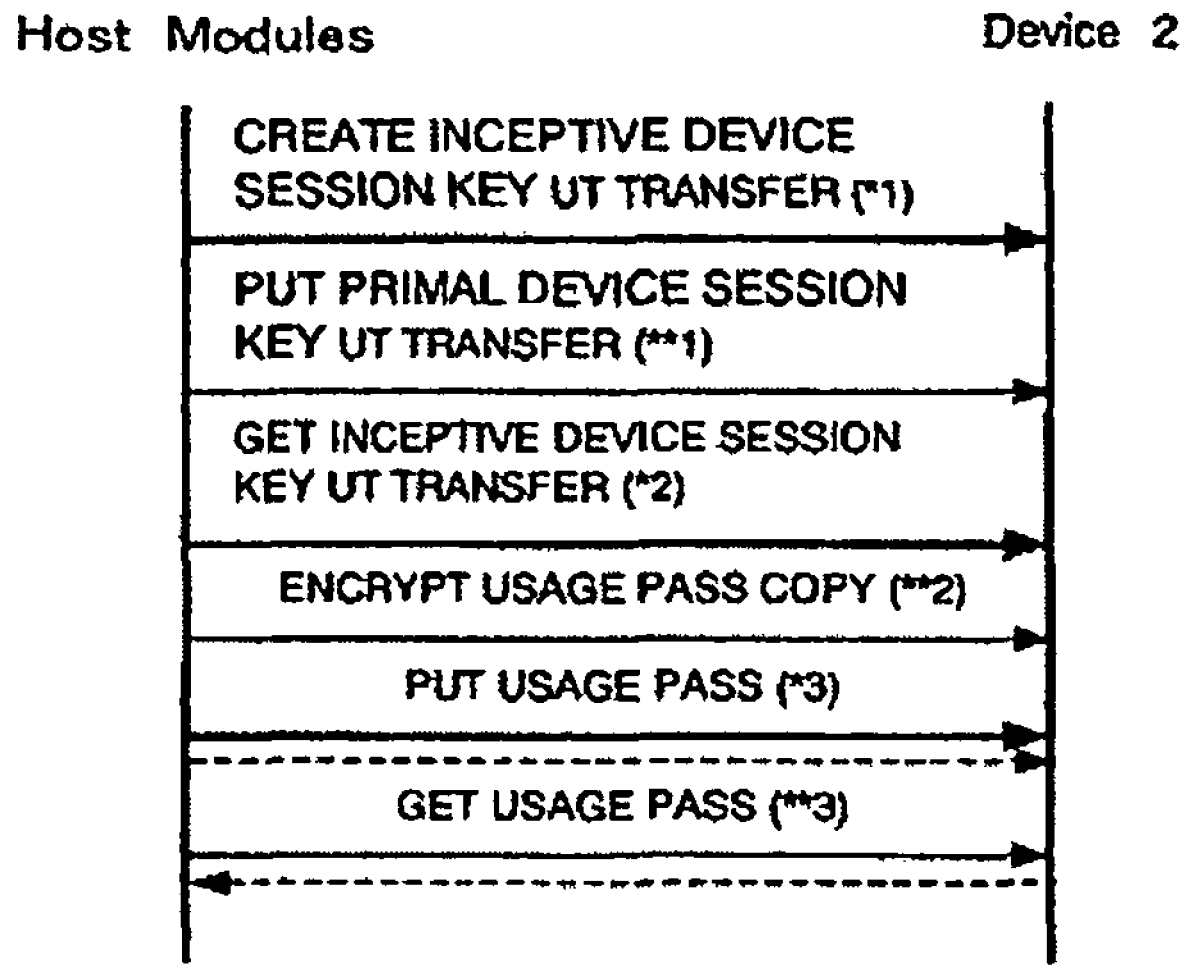
FIG. 28 is a diagram that shows an instruction transfer sequence between a host module and a device 2 in the embodiment.

In FIG. 28, PUT USAGE PASS is followed by Usage Pass transfer from the host module to the Device 2, and GET USAGE PASS is followed by Usage Pass transfer from the Device 2 to the host module. The instructions shown with a thick line (i.e., the instructions marked as *1, *2, *3) have their processing sequence defined in themselves, and even after receiving these instructions in an irregular sequence, the Device 2 aborts the instructions. However, even after receiving the instructions shown with a thin line (i.e., the instructions marked as 1, 2, 3), the Device 2 does not abort these instructions. This is because, only if the instructions shown with a thick line are sent to the Device 2** in conformity with the sequence defined in those instructions, no problems will occur.

Under such a situation, the Device 2 uses the Channel ID to discriminate between the processing series shown with a thick line, and the processing series shown with a thin line. That is to say, processing in a simultaneous/parallel fashion assumes such situation as described above. More specifically, the instructions are not processed in such a manner that only the instructions shown with a thick line are executed from beginning to end first and then after the Usage Pass has been transferred, the instructions shown with a thin line are processed. Instead, as described above, the instructions belonging to the devices are processed as a whole while one instruction group is being inserted between the other instruction group. The above is not limited to a case in which, as described above, two processing series exist, and the above also applies when three or more processing series are executed in a mutually inserted condition.

The description is returned to FIG. 17. More specifically, the Channel identifiers are used as follows.

Suppose that for example, one removable storage device only is connected to the recorder/player. Under this situation, to write a Usage Pass from the recording module into the storage device (e.g., 125; hereunder, the storage device refers to the device 125) in UT mode while at the same time reading out a recorded Usage Pass from the storage device 125 into the playback module 103, also in UT mode, there is a need for the storage device 125 to be constructed so that it can separate and manage the transfer processes for the two Usage Passes. Allocating different Channel identifiers to such two processing series makes it possible for the removable storage device to judge with which of the two processing series the instruction transmitted from the host module 110 is associated.

The Devices 1 and 2, after receiving the data 17021 and the data 17031, respectively, executes in steps 17022 and 17032 the process step of setting up the Channel identifier and the qualified access mode associated with this identifier.

After the Channel identifier and the qualified access mode have been set up, mutual authentication 17040 between the Devices 1 and 2 is conducted, which is then followed by execution of an actual Usage Pass transfer process step 17041. Details of these process steps will be described using FIGS. 18 to 27.

After finishing necessary Usage Pass transfer processing, the host module 110 issues CLOSE CHANNEL instructions 17050 and 17060 to the Devices 2 and 1, respectively. Channel identifiers 17051 and 17061 are further transmitted to the respective associated Devices in association with these instructions. After receiving the instructions, the Devices each reset all status information relating to the processing series identified by the Channel identifier which has been received following the receipt of the instructions, and release the Channel identifier as well.

Once the Channel identifier has been released, unless the Channel identifier and the qualified access mode have been re-set using the OPEN INSTRUCTION, the Device will abort instruction processing, even when the Channel identifier is specified in the instructions that the host module issues to execute the authentication and the Usage Pass transfer.

Methods of Sharing a Symmetric Device Public Key with Public Key Encryption

Before a description is given of detailed processing sequences relating to the mutual authentication and the Usage Pass transfer, the public key encryption method used in the embodiment of the present invention is described below.

In the present embodiment, elliptic coding is used as the public key encryption method. Elliptic coding is a method in which the arithmetic operation of adding to a fixed point [base point $G=(Gx, Gy)$] on the curve expressed by the equation of a two-dimensional elliptic curve, points as many as an "n" number of times, that is, repeating the addition of G an "n" number of times, is used during encryption. Unlike the normal decimal adding method, the adding method used here is such that a point different from G on the elliptic curve is generated as the results obtained by adding G an integral number of times.

Two devices, the Device 1 and the Device 2, are assumed in description. It is also assumed that a message M to be encrypted is recorded in the Device 1 and that a private key KPr to form a pair with a public key KPu is recorded in the Device 2. In this assumption, KPr is a natural number, KPu is a coordinate point (KPux, KPuy) on the elliptic curve, and both and the base point are connected under the relationship of $KPu=KPr \times G$. In other words, KPu is a point obtained by repeating the addition of the base point as often as KPr.

Encryption process steps in the Device 1 are described first.
(E1) The Device 2 transmits KPu to the Device 1.
(E2) The Device 1 generates a random natural number "r."
(E3) "$r \times G=R=(Rx, Ry)$" is calculated.
(E4) "$r \times KPu=P=(Px, Py)$" is calculated.
(E5) A natural number *KPu is generated using Px, Py to calculate $*KPu=f(Px, Py)$, where function "f" can be any predetermined value.
(E6) The message M to be encrypted is symmetrically encoded using *KPu as a symmetric key, whereby E(*KPu, M) can then be obtained.
(E7) Data that was obtained in (E3) is concatenated to data that was obtained in (E6), and the concatenated data is transmitted to the Device 2. More specifically, the data transmitted is Rx∥Ry∥E(*KPu, M). *KPu is called "symmetric Device public key."

Decryption process steps in the Device 2 are described next.
(D1) P is calculated using Rx, Ry, KPr, whereby "$KPr \times R = KPr \times r \times G = r \times (KPr \times G) = r \times KPu = P = (Px, Py)$" can then be obtained.
(D2) *KPr is calculated using Px, Py, where *KPr is exactly the same value as *KPu. The former is represented as *KPr to indicate that it has been obtained using KPr. Hence, $*KPr=f(Px, PY)$.
(D3) "$r \times KPu=P=(Px, Py)$" is calculated.
(D4) Received data is symmetrically encoded using *KPr as a symmetric key. Hence, D(*KPr, E(*KPu, M), which, in the present invention, is referred to as D(KPr, E(KPu, M), where *KPr is called "symmetric Device private key."

The above-described algorithms for sharing symmetric keys *KPu, *KPr, are generally called the ECDH algorithms.

In this Specification, the encryption that involves all process steps from E2 to E7 is referred to as E(KPU, M). If *KPu has already been calculated and only process step E6 is executed, this process is referred to as E(*KPu, M). Similarly, the decryption that involves all process steps from D1 to D4 is referred to as D(KPr, E(KPu, M). If *KPr has already been calculated and only process step D4 is executed, this process is referred to as D(*KPr, E(*KPu, M).

Description of the Code Name Abbreviations Appearing in FIGS. 18 to 27

FIGS. 18 to 27 show the mutual authentication processing sequences and Usage Pass transfer processing sequences in UT mode and BT mode. In these figures, the following code representations are used as abbreviations:

ID: Usage Pass Identifier
DCC: Device Class Certificate
PD.C.key: Challenge key created by the Primal Device
ID.C.key: Challenge key created by the Inceptive Device
PD.S.key: Session key created by the Primal Device
ID.S.key: Session key created by the Inceptive Device
RDCL: List of revoked Device Classes
UP: Usage Pass
UPL: Short for Usage Pass Location. This code signifies the address of the Usage Pass that is already recorded in the Primal Device or is planned to be recorded in the Inceptive Device. An addressing method is not specified here since it varies from device to device.
MUP: Masked Usage Pass. This code denotes a Usage Pass state obtained by concatenating Usage Pass Status to the Usage Pass whose content key section was replaced with 0.

AI: Action Indicator. Indicates which of ENCRYPT USAGE PASS COPY, MOVE, and PLAY instructions was received. Details are set forth in the description of FIGS. 19, 23 and 24.

CKS: Checksum. Calculated from and then concatenated to data that was obtained by connecting the Usage Pass and the Action Indicator together at the transfer source during the transfer of the Usage Pass in encrypted form. Details are set forth in the description of FIGS. 19, 23 and 24.

TL: Transaction Log

CL: Connection Log

TS_UT: Transaction Status used in UT mode. Details are set forth in the description of FIG. 21.

TS_BT: Transaction Status used in BT mode. Details are set forth in the description of FIG. 21.

Status:

SS: Session Status. Progress of the Usage Pass transfer. Details are set forth in the description of FIG. 21.

UPS: Usage Pass Status. Denotes the state of the recorded Usage Pass that was detected as a result of the Usage Pass search or readout operations. This code takes the same value as that of either validity indicator flag shown in FIG. 10. Either "Valid", "Invalid", or "Not recorded" is detected as the UPS.

Interdevice Mutual Authentication Processing Sequence in UT Mode

Figure 18:
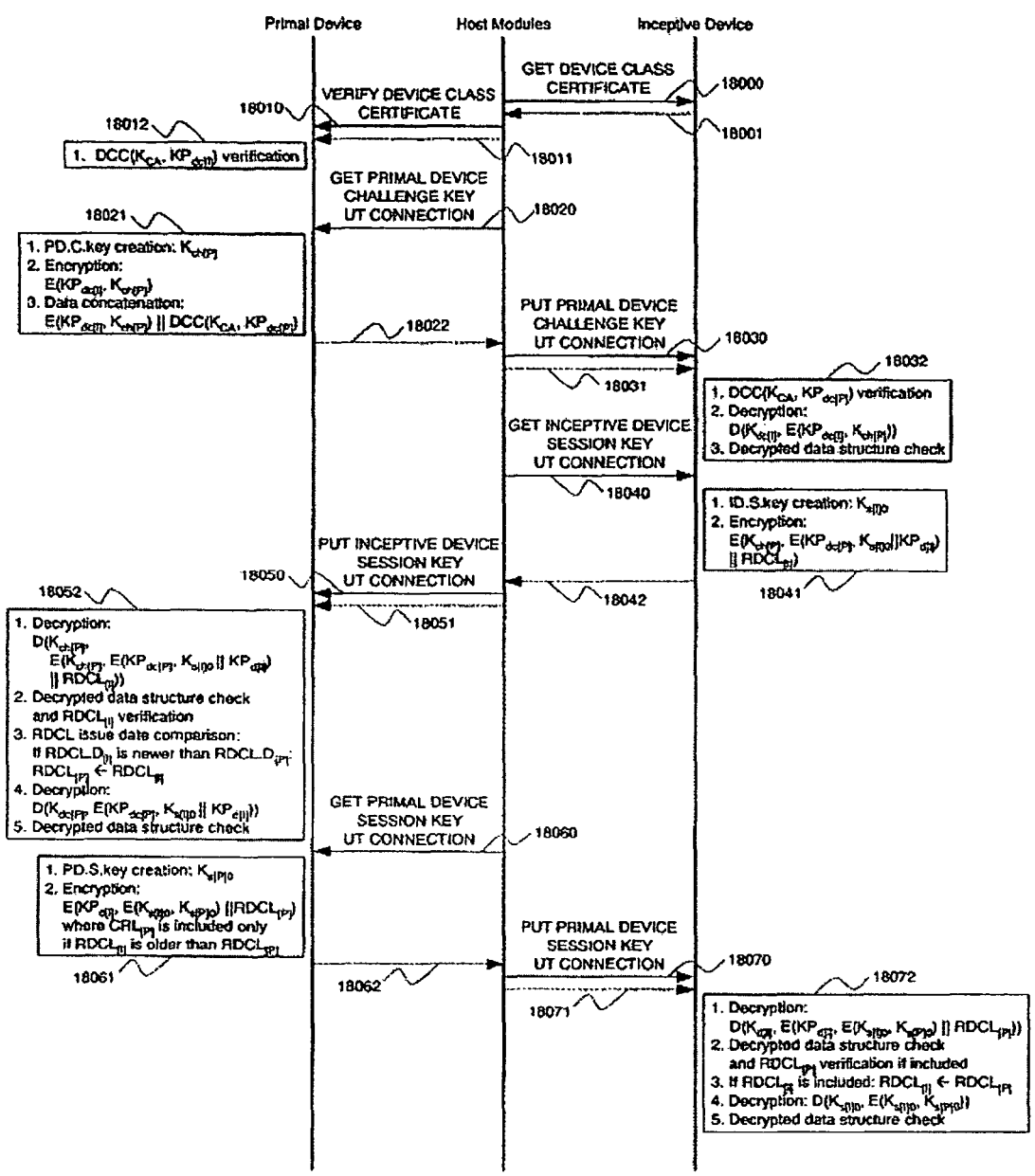
FIG. 18 is a diagram that shows a mutual authentication processing sequence conducted between the recorder/player and a storage device in UT mode in the embodiment.
Figure 19:
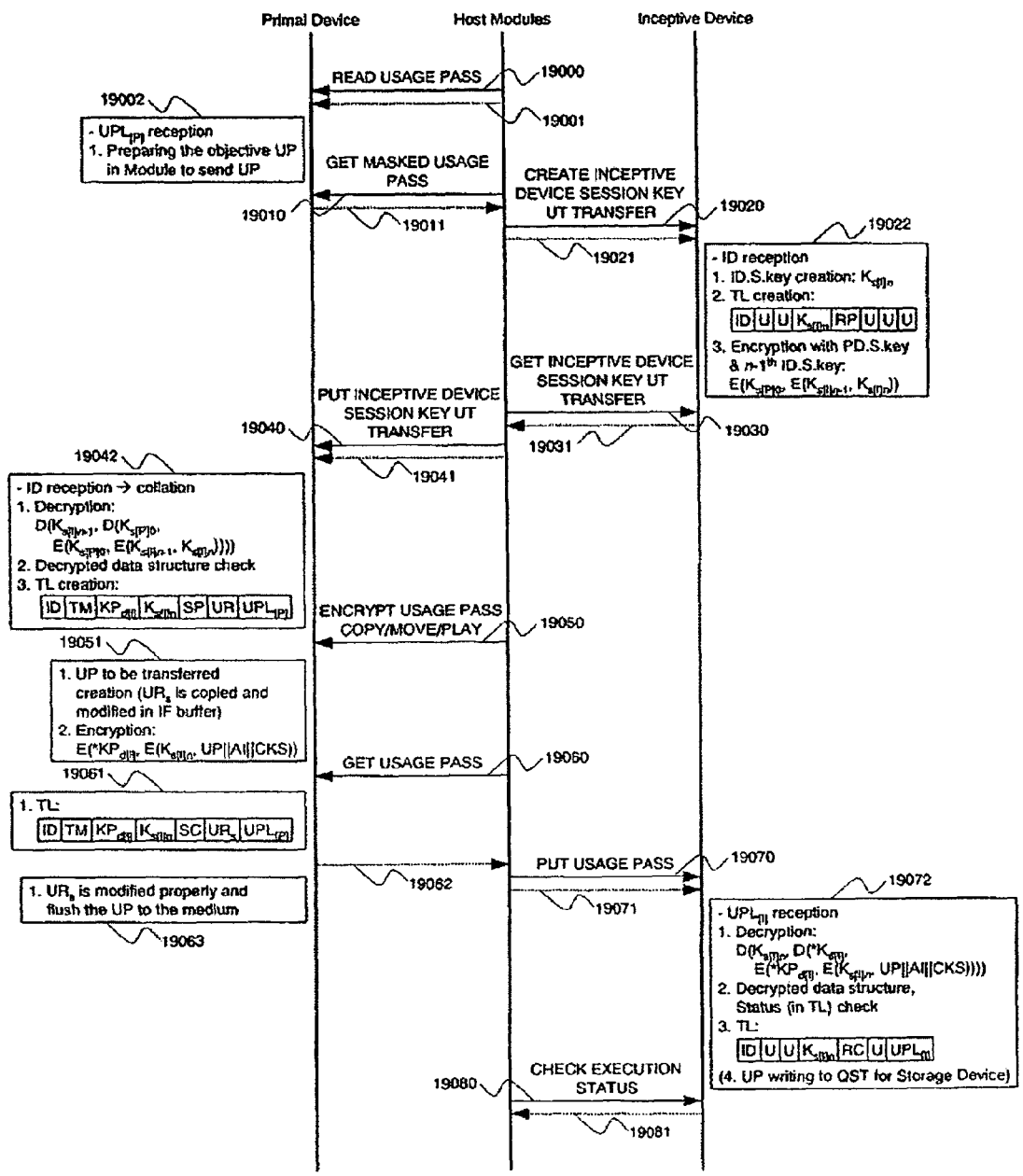
FIG. 19 is a diagram that shows a Usage Pass transfer processing sequence conducted between the recorder/player and the magnetic disk drive in UT mode in the embodiment.

A processing sequence for mutual authentication between the Primal Device and the Inceptive Device in UT mode is described below using FIG. 18.

The mutual authentication processing stage in UT mode is called "UT Connection stage" hereunder. Transfer of a Usage Pass between the two removable storage devices occurs, for example, when the Primal Device is the module 500 in the storage device 125 and the Inceptive Device is the module 502 in the storage device 126. For example, when a Usage Pass that the recording module or the like has newly generated is recorded in either removable storage device, the Primal Device is the module 600 and the Inceptive Device is the module 502. For example, when a Usage Pass present in the magnetic disk drive is transmitted to the playback module and decryption, reproduction/playback, or the like is performed on content data, the Primal Device is the module 500 and the Inceptive Device is the module 702. These relationships are also the same in the description of each processing sequence in UT mode in FIGS. 19 to 21.

First, the host module issues a GET DEVICE CLASS CERTIFICATE instruction 18000 to the Inceptive Device. The Inceptive Device then transmits the Device Class certificate embedded in data of the Device itself, to the host module 110, as denoted by reference number 18001. The Device Class certificate is hereinafter referred to as DCC (K_CA, KP_dc[I]). The certificate for certifying validity of KP_dc[I] indicates that an electronic signature section is encrypted using K_CA.

The host module 110, after receiving DCC (K_CA, KP_dc [I]), issues a VERIFY DEVICE CLASS CERTIFICATE instruction 18010 to the Primal Device and then transmits DCC (K_CA, KP_dc[I]) to the Primal Device (see 18012).

The Primal Device, after receiving DCC (K_CA, KP_dc [I]), executes one process (Process UT 1.1.1) shown in reference number 18012.

Process UT 1.1.1: Executed to verify DCC (K_CA, KP_dc [I]). The verification is accomplished by examining whether the data contained in the certificate is falsified and whether the number included in DCC (K_CA, KP_dc[I]) to identify the certificate is present in RDCL_[P] recorded in the Primal Device itself. Whether the data is falsified is judged by calculating a Hash value within all data inclusive of KP_dc[I], except for the electronic signature section, and then examining whether the Hash value agrees with the results obtained when the electronic signature section in DCC (K_CA, KP_dc[I]) is decrypted with KP_CA. If both agree, this indicates that the data contained in the certificate is not falsified. The authentication is aborted if the number identifying the certificate is present in RDCL_[P].

While the Primal Device is verifying DCC (K_CA, KP_dc [I]), the host module 110 waits for processing to be completed and issues a GET PRIMAL DEVICE CHALLENGE KEY UT CONNECTION instruction 18020 to the Primal Device. The Primal Device, after receiving the instruction, executes the following three processes shown in reference number 18021:

Process UT 1.2.1: Creates Challenge key K_ch[P].

Process UT 1.2.2: Uses KP_dc[I] within DCC (K_CA, KP_dc[I]) to decrypt the K_ch[P] key that was created during Process UT 1.2.1. The data obtained is E(KP_dc[I], K_ch[P]).

Process UT 1.2.3: Concatenates the Device Class certificate embedded in the Device's own data, to the data that was obtained during Process UT 1.2.2. The data consequently obtained is E(KP_dc[I], K_ch[P])||DCC (K_CA, KP_dc [P]).

After creating E(KP_dc[I], K_ch[P])||DCC (K_CA, KP_dc[P]) during Process UT 1.2.3, the Primal Device transmits the data to the host module (see reference number 18022). The host module then receives E(KP_dc[I], K_ch[P])||DCC (K_CA, KP_dc[P]) and after issuing a PUT PRIMAL DEVICE CHALLENGE KEY UT CONNECTION instruction 18030 to the Inceptive Device, transfers received data thereto (see reference number 18031).

The Inceptive Device, after receiving E(KP_dc[I], K_ch [P])||DCC (K_CA, KP_dc[P]), executes the following three processes shown in reference number 18032:

Process UT 1.3.1: Executed to verify DCC (K_CA, KP_dc [P]). The verification is conducted using the same method as that described for Process UT 1.1.1. The RDCL referred to, however, is RDCL_[I].

Process UT 1.3.2: Separates and decrypts only E(KP_dc[I], K_ch[P]) of the received data. The decryption uses the K_dc[I] embedded in the protected information storage region of the Device itself.

Process UT 1.3.3: Checks execution results on Process UT 1.3.2 whether K_ch[P] is included in proper form. The check is conducted as follows: first, prior to the execution of Process UT 1.3.2, it is specified that a characteristic number be concatenated to K_ch[P] during encryption thereof, and then if the characteristic number is obtained as a result of decrypting the received data in Process UT 1.3.2, the data is judged to be free of damage, destruction, and the like.

While the Inceptive Device is executing Processes UT 1.3.1 to UT 1.3.3, the host module 110 estimates completion timing of processing and issues a GET INCEPTIVE DEVICE SESSION KEY UT CONNECTION instruction 18040 in appropriate timing. The Inceptive Device, after receiving the instruction, executes the following two processes shown in reference number 18041:

Process UT 1.4.1: Creates zeroth-order session key K_s[I]0.

Process UT 1.4.2: Concatenates the Device public key embedded in the Device's own data, to K_s[I]0 that the Device created during Process UT 1.4.1, and conducts encryption with the KP_dc[P] that the Device received in UT 1.3.1. The RDCL_[I] that is already recorded in the Device's own region is concatenated to the data obtained by the encryption, and the entire data obtained by the concatenation is encrypted using the K_ch[P] that was obtained in Process UT 1.3.3. The data finally obtained is E(K_ch[P], E(KP_dc[P], K_s[I]0∥KP_d[I]∥RDCL_[I]).

After E(K_ch[P], E(KP_dc[P], K_s[I]0∥KP_d[I]∥RDCL_[I]) has been created in the Inceptive Device, the Device transmits the created data to the host module (see reference number 18042).

The host module then receives E(K_ch[P], E(KP_dc[P], $K_{13}$ s[I]0∥KP_d[I]∥RDCL_[I]) and after issuing a PUT INCEPTIVE DEVICE SESSION KEY UT CONNECTION instruction 18050 to the Primal Device, transfers received data thereto (see reference number 18051).

The Primal Device, after receiving E(K_ch[P], E(KP_dc[P], $K_{13}$ s[I]0∥KP_d[I]∥RDCL_[I]), executes the following five processes shown in reference number 18052:

Process UT 1.5.1: Decrypts the received data by using K_ch[P] that the Primal Device itself generated during Process UT 1.2.1.

Process UT 1.5.2: Separates RDCL_[I] from execution results on Process UT 1.5.1 and checks whether RDCL_[I] is included in proper form. The checking method is the same as that described for Process UT 1.3.3.

Process UT 1.5.3: Compares issue date information of the RDCL_[P] recorded in the Device's own region, and issue date information of the transmitted RDCL_[I]. The comparison assumes that the issue date information of the RDCLs is included therein. If, as a result of the comparison, the issue date information of the received RDCL_[I] is newer than that of the RDCL_[P] recorded in the Device's own region, the RDCL_[P] is overwritten with the RDCL_[I].

Process UT 1.5.4: Decrypts the remaining data E(K_dc[P], K_s[I]0∥KP_d[I] by using K_dc[P].

Process UT 1.5.5: Checks whether K_s[I]0∥KP_d[I] is included in proper form in data that was obtained in Process UT 1.5.4. The checking method is the same as that described for Process UT 1.3.3.

While the Primal Device is executing Processes UT 1.5.1 to UT 1.5.5, the host module 110 estimates completion timing of processing and issues a GET PRIMAL DEVICE SESSION KEY UT CONNECTION instruction 18061 in appropriate timing. The Primal Device, after receiving the instruction, executes the following two processes shown in reference number 18061:

Process UT 1.6.1: Creates zeroth-order session key K_s[P]0.

Process UT 1.6.2: Encrypts $K_{13}$ s[P]0 that was created in Process UT 1.6.1, with the zeroth-order session key K_s[I]0 that was received in Process UT 1.5.5. The data obtained is E(K_s[I]0, $K_{13}$ s[P]0). In this process step, if, as a result of the comparison between the issue date information of RDCL_[P] and that of RDCL_[I] in Process UT 1.5.3, the issue date information of RDCL_[P] was newer than that of RDCL_[I], RDCL_[P] is concatenated to E(K_s[I]0, K_s[P]0) and then the thus-obtained entire data is encrypted with the KP_d[I] that was obtained in Process UT 1.5.5. The data finally obtained is E(KP_d[I], E(K_s[I]0, $K_{13}$ s[P]0∥KP_d[P]∥RDCL_[P]).

After E(KP_d[I], E(K_s[I]0, $K_{13}$ s[P]0∥KP_d[P]∥RDCL_[P]) has been created in the Primal Device, the Device transmits the created data to the host module 110 (see reference number 18062).

The host module 110 then receives E(KP_d[I], E(K_s[I]0, $K_{13}$ s[P]0∥KP_d[P]∥RDCL_[P]) and after issuing a PUT PRIMAL DEVICE SESSION KEY UT CONNECTION instruction 18070 to the Inceptive Device, transfers received data thereto (see reference number 18071).

The Inceptive Device, after receiving E(KP_d[I], E(K_s[I]0, $K_{13}$ s[P]0∥KP_d[P]∥RDCL_[P]), executes the following five processes shown in reference number 18072:

Process UT 1.7.1: Decrypts the received data by using the K_d[I] embedded in the Device's own, protected information storage region.

Process UT 1.7.2: If RDCL_[P] is included in the data that was decrypted in Process UT 1.7.1, the RDCL_[P] data is separated and whether the data is included in proper form is checked. The checking method is the same as that described for Process UT 1.3.3.

Process UT 1.7.3: If, after the execution of Processes UT 1.7.1 and 1.7.2, RDCL_[P] is included in the received data, and if the fact that the RDCL_[P] is included in proper form is ascertainable, the RDCL_[I] recorded in the Device's own information storage region is overwritten with the received RDCL_[P].

Process UT 1.7.4: Decrypts the remaining data E($K_{13}$ s[I]0, $K_{13}$ s[P]0) by using the key data K_s[I]0 that the Inceptive Device itself generated during Process UT 1.4.1.

Process UT 1.7.5: Checks whether K_s[P]0 is included in proper form in data that was obtained in Process UT 1.7.4. The checking method is the same as that described for Process UT 1.3.3.

When the above Processes up to UT 1.7.5 are completed, this means that sharing between the symmetric Device public key *KP_d[I] (the same as the symmetric Device private key *K_D[I]), K_s[I]0, and $K_{13}$ s[P]0 has been completed.

Inter-Device Usage Pass Transfer Processing Sequence in UT Mode

After the mutual authentication between the Primal Device and the Inceptive Device in UT mode has been completed, Usage Passes can be transferred from the Primal Device to the Inceptive Device. The Usage Pass transfer processing sequence will be next described using FIG. 19. The Usage Pass transfer processing stage in UT mode is hereunder called "UT Transfer stage."

First, the host module 110 issues a READ USAGE PASS instruction 19000 to the Primal Device. After this, locations at which existing Usage Passes are recorded, and the number of Usage Passes to be read out are notified to the Primal Device (see reference number 19001). The Primal Device, after receiving the above instruction and information on the above-mentioned recording locations of the existing Usage Passes and on the number of Usage Passes to be read out, executes the following processes shown in reference number 19002:

Process UT 2.1.1: Sets up a Usage Pass to be transferred, in the Usage Pass transmitting module. For example, if the Primal Device is a magnetic disk drive, the setup of the Usage Pass to be transferred is equivalent to sending the Usage Pass from the qualified storage 223 to the module 501 via the Usage Pass buffer 510. Similarly, if the Primal Device is the recording module, the setup of the Usage Pass to be transferred is equivalent to sending the Usage Pass from the qualified storage 223 to a Usage Pass Creator and Content Encrypter 606.

After the Usage Pass to be transferred has been set up in the Usage Pass transmitting module, the host module 110 issues a GET MASKED USAGE PASS instruction 19010 to the Primal Device. The Primal Device, after receiving this instruction, creates a Masked Usage Pass and transmits data to the host module 110 (see reference number 19011). As described earlier, the Masked Usage Pass is the data obtained by concatenating Usage Pass Status to the O-replaced content key data included in the Usage Pass. After receiving the Masked Usage Pass, the host module analyzes the UR_s contained in the data, and judges whether the Usage Pass that has been read out into the Usage Pass transmitting module can be transferred. If the Usage Pass is judged to be transferable, the host module continues Usage Pass transfer processing described below.

When it continues Usage Pass transfer processing, the host module 110 issues a CREATE INCEPTIVE DEVICE SESSION KEY UT TRANSFER instruction 19020 to the Inceptive Device. The host module transmits to the Inceptive Device the Usage Pass identifier of the Usage Pass to be transferred (see reference number 19021). The Inceptive Device, after receiving the above Usage Pass identifier, executes the following three processes shown in 19022:

Process UT 2.2.1: Creates session key $K_{13}$ s[I]n. The session key is a symmetric key created each time a Usage Pass is transferred, and in that sense, "n" in $K_{13}$ s[I]n means that the key has been created for the nth Usage Pass transfer. In that case, "n">/=1.

Process UT 2.2.2: Creates a Transaction Log. The Usage Pass identifier of the Usage Pass to be transferred, the session key K_s[I]n that was created in Process UT 2.2.1, and Session Status are recorded in Process UT 2.2.2. In an element field, "RP" (Receive Prepared) is set up to mean that transfer destination device has become ready for receiving the Usage Pass, and "U" (Unspecified) is recorded in the remaining element fields.

Process UT 2.2.3: The session key K_s[I]n that was created in Process UT 2.2.1 is encrypted using the $K_{13}$ s[I]n−1 that was created during execution of the immediately preceding Usage Pass transfer, and the zeroth-order session key K_s [P]0 that was created at the Connection stage by the Primal Device. If, prior to execution of this process, no Usage Pass has been transferred, the Inceptive Device uses the zeroth-order session key that the Device itself created in Process UT 1.4.1 of the Connection stage. The data obtained is $E(K_{13}$ s[P]0, E(K_s[I]n−1, E(K_s[I]n)).

While the Inceptive Device is executing Processes UT 2.2.1 and UT 2.2.2, the host module estimates completion timing of processing and issues a GET INCEPTIVE DEVICE SESSION KEY UT TRANSFER instruction 19030 in appropriate timing. The Inceptive Device receives the instruction and then as denoted by reference number 19031, transmits to the host module 110 the data that was created during Process UT 2.2.3.

The host module 110, after receiving E(K_s[P]0, $E(K_{13}$ s[I]n−1, $E(K_{13}$ s[I]n)), issues a PUT INCEPTIVE DEVICE SESSION KEY UT TRANSFER instruction 19040 to the Primal Device, then concatenates a Usage Pass identifier to the received data, and transmits the concatenated data to the Primal Device (see reference number 19041). More specifically, the data transmitted is UPID‖E($K_{13}$ s[P]0, E($K_{13}$ s[I]n−1, E($K_{13}$ s[I]n)).

The Primal Device, after receiving UPID‖E($K_{13}$ s[P]0, E($K_{13}$ s[I]n−1, E($K_{13}$ s[I]n)), executes the following five processes shown in reference number 19042:

Process UT 2.3.1: Checks for matching between the received UPID and the UPID of the Usage Pass which was set up in the Usage Pass transmitting module in Process UT 2.1.1. If both UPIDs mismatch, Usage Pass transfer processing is aborted at this stage.

Process UT 2.3.2: Decrypts received data with $K_{13}$ s[P]0 and K_s[I]n−1, where $K_{13}$ s[P]0 is the session key that was created in Process UT 1.6.1 by the Primal Device itself, and $K_{13}$ s[I]n−1 is the same session key as that mentioned in the description of Process UT 2.2.3.

Process UT 2.3.3: Checks whether $K_{13}$ s[I]n is included in proper form in data that was obtained in Process UT 2.3.2. The checking method is the same as that described for Process UT 1.3.3.

Process UT 2.3.4: Creates a Transaction Log. The data recorded in this Process includes the Usage Pass identifier of the Usage Pass to be transferred, the Type Map included in the Inceptive Device Class certificate which was obtained in Process UT 1.1.1, the session key K_s[I]n that was created in Process UT 2.3.3, Session Status, UR_s of the Usage Pass to be transferred, and the Usage Pass Location of the Usage Pass that was read out in Process UT 2.1.1. In an element field, "SP" (Send Prepared) is set up to mean that the transmitting device has become ready for transmitting the Usage Pass.

While the Primal Device is executing Processes UT 2.3.1 to UT 2.3.4, the host module estimates completion timing of processing and issues either an ENCRYPT USAGE PASS COPY, ENCRYPT USAGE PASS MOVE, or ENCRYPT USAGE PASS PLAY instruction 19050 in appropriate timing. Issuance of the instruction assumes that all necessary information is predefined. More specifically, the predefined information means, for example, what UR_s is assigned to the Usage Pass to be transmitted following completion of instruction receiving, and in what form the UR_s information of the Usage Pass that will be left in the Primal Device after copying or playback is to be changed. After thus receiving the instruction, the Primal Device executes the following two processes shown in 19051:

Process UT 2.4.1: The Usage Pass to be transmitted to the Inceptive Device is generated from information on the Usage Pass set up in the Usage Pass transmitting module in Process UT 2.1.1. Information, such as the UPID and K_c, is usually copied intact, and only UR_s is changed in the predefined form.

Process UT 2.4.2: An Action Indicator indicating whether the instruction that has been received for the Usage Pass generated in Process UT 2.4.1 is ENCRYPT USAGE PASS COPY, ENCRYPT USAGE PASS MOVE, or ENCRYPT USAGE PASS PLAY, and a Checksum for the Usage Pass‖Action Indicator are calculated and concatenated. After the concatenation, obtained data is encrypted using $K_{13}$ s[I]n and *KP_d[I]. That is, the data is double encrypted with the symmetric keys. The data obtained is E(*KP_d[I], E(K_s[I]n, Usage Pass‖Action Indicator‖Checksum)). The Checksum will be calculated, for example, as follows: first, the Usage Pass‖Action Indicator to be calculated is split according to fixed data length. Next after summation of both sets of block data thus obtained, all bit values are reversed in terms of polarity and then 1 is further added. This, of course, means calculating a 2's complement of the entire data "Usage Pass‖Action Indicator‖Checksum" including the Checksum. During verification, the entire data "Usage Pass‖Action Indicator‖Checksum" including the Checksum is split according to the same fixed data length as the above, and then a summing operation is conducted between both sets of block data. If the summation results in 0, this indicates that no data changes have been detected during the verification.

While the Primal Device is executing Processes UT 2.4.1 and UT 2.4.2, the host module 110 estimates completion timing of processing and issues a GET USAGE PASS instruction 19060 in appropriate timing. After receiving this instruction, the Primal Device executes the following three processes shown in reference number 19062:

Process UT 2.5.1: The Session Status in the Transaction Log is updated. On completion of the Usage Pass transmission, the Session Status is set to "SC" (Send Completed).

Process UT 2.5.2: The data E(*KP_d[I], E($K_{13}$ s[I]n, Usage Pass||Action Indicator||Checksum)) that was generated in Process UT 2.4.2 is sent to the host module.

Process UT 2.5.3: The UR_s in the original Usage Pass is changed as predefined. If the Primal Device is a magnetic disk drive, the Usage Pass whose UR_s has been changed is overwritten with the information at the original recording location of the Usage Pass in the qualified storage. If the instruction 19050 was ENCRYPT USAGE PASS MOVE, "Invalid" is set as the value of the validity indicator flag.

The host module 110, after receiving E(*KP_d[I], E($K_{13}$ s[I]n, Usage Pass||Action Indicator||Checksum)), issues a PUT USAGE PASS instruction 19070 to the Inceptive Device and transmits E(*KP_d[I], E($K_{13}$ s[I]n, Usage Pass||Action Indicator||Checksum)) thereto (see 19071). The Inceptive Device, after receiving the above instruction and data, executes the following three processes shown in 19072:

Process UT 2.5.1: Decrypts received data with K_d[I] and $K_{13}$ s[I]n, where K_d[I] is the session key that was obtained in Process UT 1.7.1, and $K_{13}$ s[I]n is the session key that the Device itself generated in Process UT 2.2.1.

Process UT 2.5.2: Checks whether the Usage Pass||Action Indicator||Checksum is included in proper form in the data that was obtained in Process UT 2.5.1. The check is conducted by verifying the Checksum and using the method described for Process UT 1.3.3. The verification method using the Checksum is as described for Process UT 2.4.2.

Process UT 2.5.3: Updates the Session Status and Usage Pass Location in the Transaction Log. In the Session Status, "RC" (Receive Completed) is set up to mean that Usage Pass receiving has been completed. The recording destination address of the Usage Pass is set up in the Usage Pass Location field.

If the Inceptive Device is a magnetic disk drive, the received Usage Pass is recorded in the qualified storage 223 after Process UT 2.5.3. During Usage Pass recording, the validity indicator flag is set to "Valid."

After this, the host module 110 may issue a CHECK EXECUTION STATUS instruction 19080 to the Inceptive Device in order to confirm whether the receiving of the Usage Pass by the Inceptive Device or recording of the Usage Pass in the qualified storage 223 has come to a normal end. In that case, execution status is transmitted as a response 19081 from the Inceptive Device to the host module.

Repeating the above-described UT Transfer stage makes it possible to continuously execute Usage Pass transfer without repeating the Connection stage.

Inter-Device Mutual Re-Authentication Processing Sequence in UT Mode

After the UT Transfer stage has been repeated at least once between the Primal Device and the Inceptive Device and the session key K_s[I]n has been shared between both Devices and recorded in the Transaction Log, if the recorder/player becomes abnormal and the session key is lost in both the Usage Pass transmitting module and receiving module, mutual authentication can be re-completed under a small processing load compared with that of the Connection stage.

Figure 20:
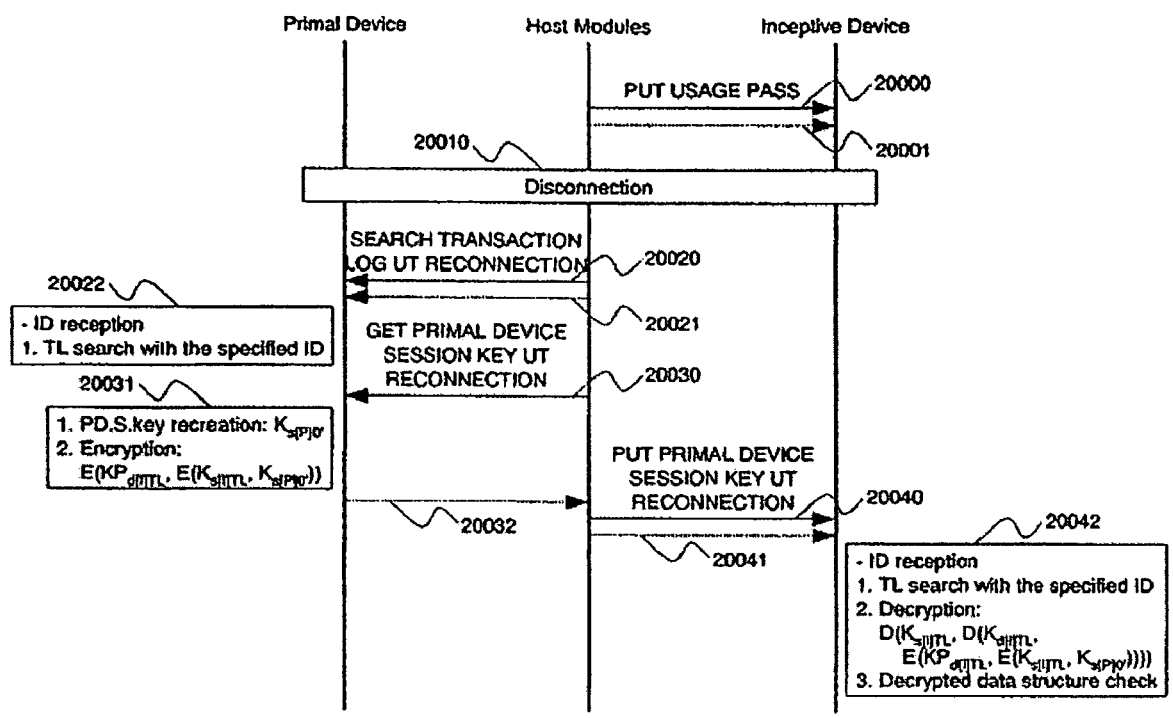
FIG. 20 is a diagram that shows a simplified mutual re-authentication processing sequence conducted between the recorder/player and the magnetic disk drive in UT mode in the embodiment.

This mutual re-authentication processing sequence will be next described using FIG. 20. This processing stage in UT mode is hereunder called "UT Reconnection stage."

First, description is given assuming a situation under which, at the UT Transfer stage, the Inceptive Device is receiving a PUT USAGE PASS instruction 20000 and a Usage Pass 20001 subsequent thereto. The description also assumes that: before Usage Pass receive processing is executed to completion, disconnection is caused between the Primal Device and the Inceptive Device by the occurrence of an abnormality, and consequently, the session key K_s[I] used to encrypt the Usage Pass 20001 being received, and the symmetric Device public key *KP_d[I] are lost in both Devices (see reference number 20010).

In the above case, the host module 110 first issues a SEARCH TRANSACTION LOG RECONNECTION instruction 20020 to the Primal Device. Following the instruction, the Usage Pass identifier of the Usage Pass 20001 being transmitted is sent (see reference number 20021).

The Primal Device, after receiving the identifier, executes the following process shown in reference number 20022:

Process UT 3.1.1: Searches the protected information storage region for the Transaction Log containing the same identifier value as that of the identifier.

While the Primal Device is executing Process UT 3.1.1, the host module 110 estimates completion timing of processing and issues a GET PRIMAL DEVICE SESSION KEY UT RECONNECTION instruction 20030 in appropriate timing. After receiving this instruction, the Primal Device executes the following two processes shown in reference number 20031:

Process UT 3.2.1: Creates a zeroth-order session key K_s[P] 0'.

Process UT 3.2.2: Encrypts the $K_{13}$ s[P]0' that was created during Process UT 3.2.1. The encryption uses the session key K_s[I]TL and Device public key KP_d[I]TL recorded in the Device's own Transaction Log that was detected in Process UT 3.1.1. The keys $K_{13}$ s[I]TL and KP_d[I]TL indicate that the key data is recorded in the Transaction Log. The data finally obtained is E(KP_d[I]TL, E(K_s[I]TL, $K_{13}$ s[P]0')).

After finishing the encryption in Process UT 3.2.2, the Primal Device transmits the encrypted data to the host module (see 20032).

The host module 110, after receiving E(KP_d[I]TL, E(K_s[I]TL, K_s[P]0')), issues a PUT PRIMAL DEVICE SESSION KEY UT RECONNECTION instruction 20040 to the Inceptive Device and after concatenating to the received data the same identifier as the Usage Pass identifier which was transmitted to the Primal Device, transmits the concatenated data to the Inceptive Device (see reference number 20041).

The Inceptive Device, after receiving E(KP_d[I]TL, E(K_s[I]TL, K_s[P]0')), executes the following three processes shown in reference number 20042:

Process UT 3.3.1: Searches the protected information storage region for the Transaction Log containing the same identifier value as the value of the identifier.

Process UT 3.3.2: Decrypts the received data. The decryption uses the K_d[I] embedded in the Inceptive Device's own protected information storage region, and the session key K_s[I]TL included in the Transaction Log that was detected in Process UT 3.1.1.

Process UT 3.3.3: Checks whether $K_{13}$ s[P]0' is included in proper form as a result of Process UT 3.3.2 execution. The checking method is the same as that described for Process UT 1.3.3. When Process UT 3.3.2 is completed, this indicates that sharing between *KP_d[I] (the same as *K_d[I]) and $K_{13}$ s[P]0' has been completed. When the UT Transfer stage is executed following completion of the above processes, $K_{13}$ s[I]TL is used as $K_{13}$ s[I]n−1.

Usage Pass Recovery Processing Sequence in UT Mode

During Usage Pass movement at the UT Transfer stage, in case of a recorder/player abnormality such as a power supply failure, the Usage Pass being transferred may be lost in both the Primal Device and the Inceptive Device, or when the Usage Pass to be transferred is actually transferred from the Primal Device to the Inceptive Device, although the Play Count of the Usage Pass in the Primal Device is reduced, the Usage Pass may not be reproduced at all in the Inceptive Device. It is significant to provide a Usage Pass recovery-featured system in such a form as to present a Play Count of the Usage Pass that originally existed in the Primal Device.

Figure 21:
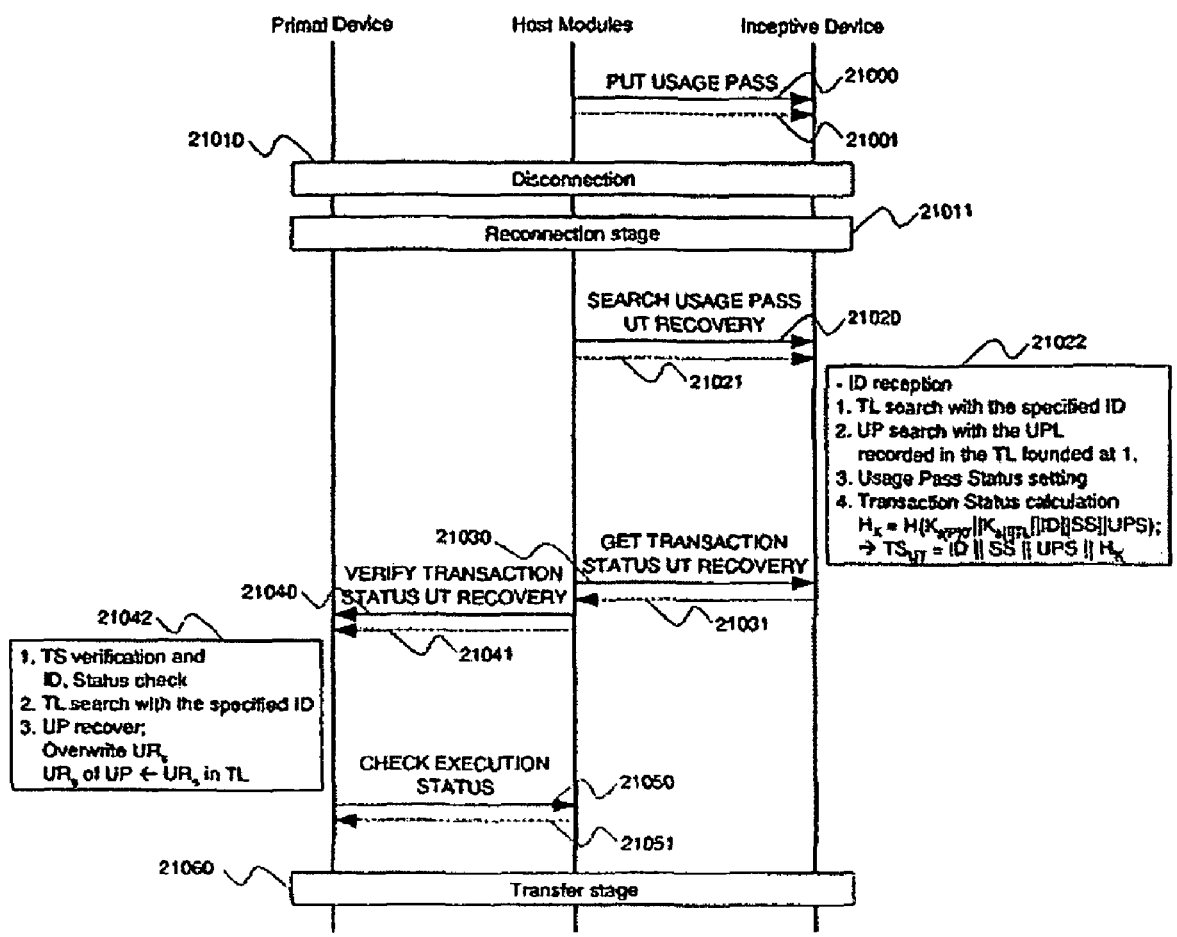
FIG. 21 is a diagram that shows a processing sequence conducted between the recorder/player and the magnetic disk drive in UT mode to recover a lost Usage Pass in the embodiment.

Such Usage Pass recovery processing will be next described using FIG. 21. This processing stage in UT mode is hereunder called "UT Recovery stage."

First, description is given assuming a situation under which, at the UT Transfer stage, the Inceptive Device is receiving a PUT USAGE PASS instruction 21000 and a Usage Pass 21001 subsequent thereto. The description also assumes that: before Usage Pass receive processing is executed to completion, disconnection is caused between the Primal Device and the Inceptive Device by the occurrence of an abnormality, and consequently, the session key $K_{13}$ s[I] used to encrypt the Usage Pass 21001 being received is lost in both Devices (see reference number 21001). In this case, the UT Reconnection stage described hereinbefore is first executed and *KP_d[I] (the same as *K_d[I]), $K_{13}$ s[P]0' is newly shared.

After the UT Reconnection stage, the host module 110 first issues a SEARCH USAGE PASS UT RECOVERY instruction 21020 to the Inceptive Device. Following the instruction, the host module 110 sends the Usage Pass identifier of the Usage Pass 21001 being transmitted (see 21021).

The Primal Device, after receiving the identifier, executes the following four processes shown in reference number 21022:

Process UT 4.1.1: Searches the protected information storage region for the Transaction Log containing the same identifier value as that of the identifier.

Process UT 4.1.2: Searches for the Usage Pass storage region in the qualified storage, specified by the Usage Pass Location recorded in the Transaction Log which was detected in Process UT 4.1.1.

Process UT 4.1.3: Examines the value of a validity indicator flag associated with the Usage Pass which was detected in Process UT 4.1.2, and sets up either the "Valid", "Invalid", or "Not recorded" value in the Usage Pass Status.

Process UT 4.1.4: Creates a Transaction Status for UT mode. The Transaction Status is a "Usage Pass Status∥Hash" value that was set up in the "Session Status∥Process UT 4.1.3" recorded in the "UPID∥Transaction Log" of the Usage Pass to be transferred. The Hash value here is calculated from $K_{13}$ s[P]0'∥$K_{13}$ s[I]TL∥UPID∥Session Status∥Usage Pass Status. The Transaction Status that has been generated during this process is hereunder called "UT Transaction Status."

While the Inceptive Device is executing Processes UT 4.1.1 to UT 4.1.4, the host module estimates completion timing of processing and issues a GET TRANSACTION STATUS UT RECOVERY instruction 21030 in appropriate timing. The Inceptive Device receives the instruction and then as denoted by reference number 21031, transmits to the host module 110 the UT Transaction Status that was created during Process UT 4.1.4.

The host module 110, after receiving the Transaction Status, issues a VERIFY TRANSACTION STATUS UT RECOVERY instruction 21040 to the Primal Device and then transmits received data (see 21041). More specifically, the data transmitted is the UT Transaction Status.

The Primal Device, after receiving the UT Transaction Status, executes the following three processes shown in reference number 21042:

Process UT 4.2.1: Verifies the UT Transaction Status and confirms the Usage Pass identifier, Session Status, and Usage Pass Status included in the UT Transaction Status. The verification of the UT Transaction Status is accomplished by calculating the Hash value contained in the data, from the K_s[P]0' and K_s[I]TL held in the Primal Device's own information region. If calculation results match the Hash value, the data is judged to be free of falsification. The Usage Pass identifier is used to confirm whether the Usage Pass is that which is to be recovered, and the Session Status and Usage Pass Status are used to judge whether the Usage Pass is recoverable. A recovery process (Process UT 4.2.2 below) by the Primal Device is conducted if the Session Status is "RP" or if the Session Status is "RP" but the Usage Pass Status is "Invalid" or "Not recorded."

Process UT 4.2.2: Searches the protected information storage region for the Transaction Log containing the same identifier value as that of the identifier.

UT Process UT 4.2.3: Executes the Usage Pass recovery process. The recovery of the Usage Pass is accomplished by changing the validity indicator flag value of the intended Usage Pass to "Valid" (if "Invalid") and overwriting the UR_s of the Usage Pass with the UR_s recorded in the Transaction Log which was detected in Process UT 4.2.2.

After that, the host module may issue a CHECK EXECUTION STATUS instruction 21050 to the Primal Device to confirm whether the Usage Pass recovery thereby has come to a normal end. Execution status is transmitted from the Primal Device to the host module (see reference number 21051).

When Process UT 4.2.2 is completed, the Usage Pass existing before being transmitted will exist in the Primal Device.

Inter-Device Mutual Authentication Processing Sequence in BT Mode

Figure 22:
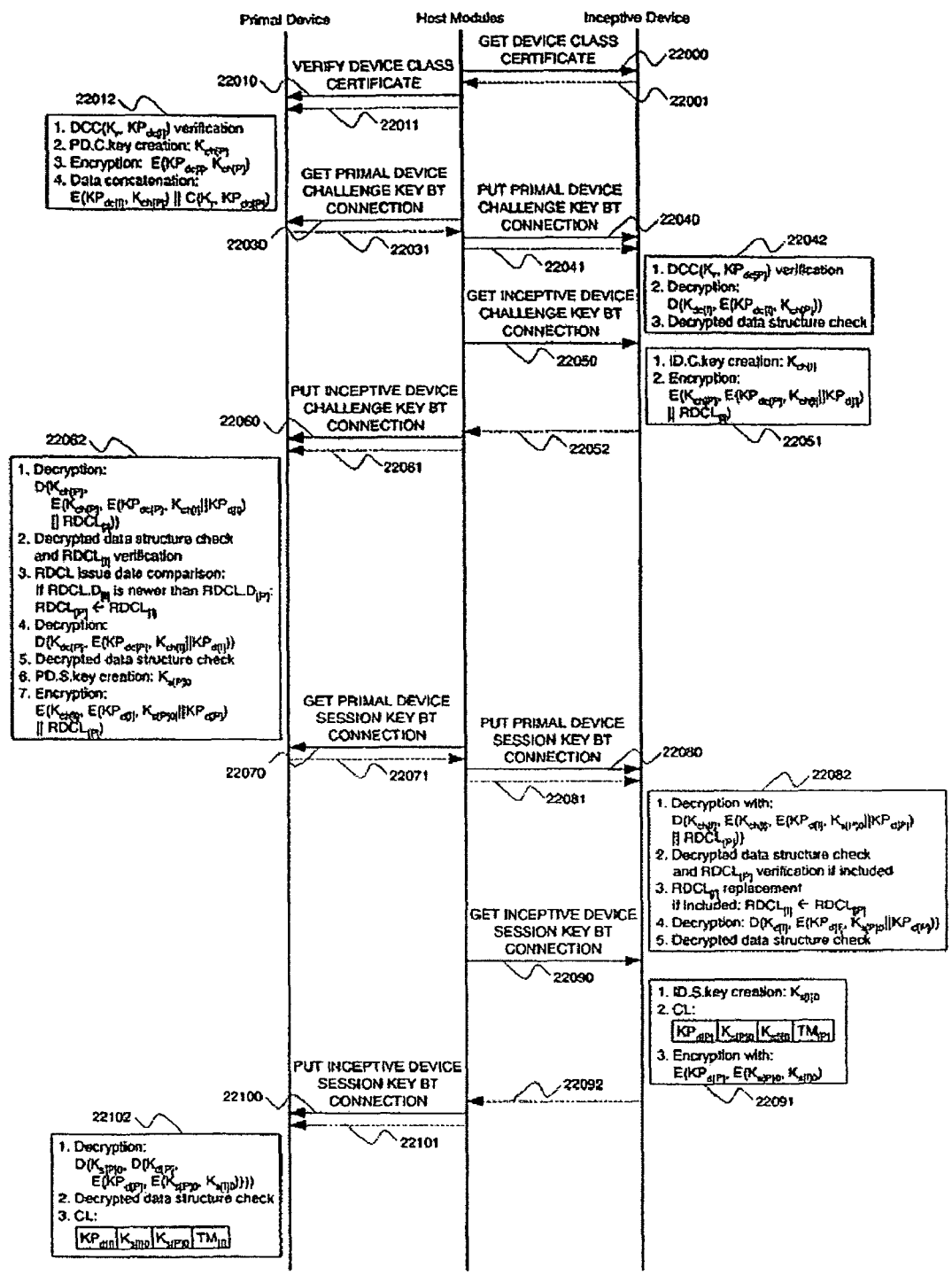
FIG. 22 is a diagram that shows a mutual authentication processing sequence conducted between the recorder/player and the magnetic disk drive in BT mode in the embodiment.

A processing sequence for mutual authentication between the Primal Device and the Inceptive Device in BT mode is described below using FIG. 22. The mutual authentication processing stage in BT mode is called "BT Connection stage" hereunder.

Figure 13:
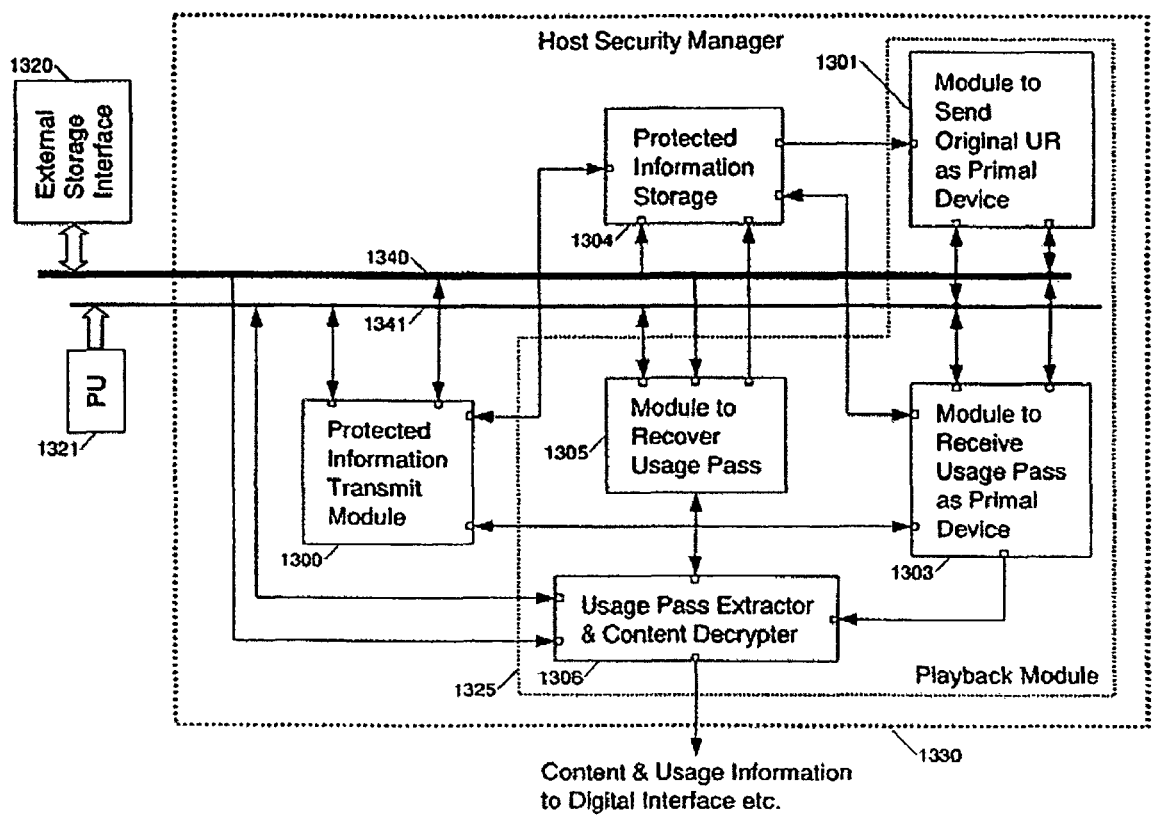
FIG. 13 is a diagram that shows a decryption-only function module which implements Usage Pass transmission in BT mode in the recorder/player.

As described per FIGS. 11 to 13, in BT mode, the entire host security manager 111 inside the recorder/player operates as the Primal Device. Among all internal modules of the manager, only the module 1400 inside the protected information transmit module 1410 undertakes the mutual authentication, and only the module 1201 or 1303 inside the recording module or playback module, respectively, undertakes Usage Pass transmitting and/or receiving processes. Also, the Usage Pass transfer module 1130 inside the magnetic disk drive operates as the Inceptive Device. These relationships are also the same in later description of each processing sequence in BT mode in FIGS. 22 to 27.

First, the host module 110 issues a GET DEVICE CLASS CERTIFICATE instruction 22000 to the Inceptive Device. Then as denoted by reference number 22001, the Inceptive Device transmits the Device Class certificate DCC (K_CA, KP_dc[I]) embedded in the Device's own data, to the host module 110.

The host module 110, after receiving DCC (K_CA, KP_dc [I]), issues a VERIFY DEVICE CLASS CERTIFICATE instruction 22010 to the Primal Device and then transmits DCC (K_CA, KP_dc[I]) thereto (see 22012).

The Primal Device, after receiving DCC (K_CA, KP_dc[I]), executes the following four processes shown in 22012:

Process BT 1.1.1: Executed to verify DCC (K_CA, KP_dc[I]). The verification refers to examining whether the data contained in the certificate is falsified and whether the number included in DCC (K_CA, KP_dc[I]) to identify the certificate is present in RDCL_[P] recorded in the Primal Device itself. The verification method is the same as that described for UT Process 1.1.1.

Process BT 1.1.2: Creates a Challenge key K_ch[P].

Process BT 1.1.3: Encrypts the K_ch[P] that was created during Process BT 1.1.3, with the KP_dc[I] included in DCC (K_CA, KP_dc[I]). The encryption uses a public key encoding scheme. The data obtained is E(KP_dc[I], K_ch[P]).

Process BT 1.1.4: Concatenates the Device Class certificate embedded in the Device's own data, to data that was obtained in Process BT 1.1.3. The data obtained is E(KP_dc[I], K_ch[P])||DCC (K_CA, KP_dc[P]).

While the Primal Device is executing Processes BT 1.1.1 to 1.1.4, the host module 110 waits for processing to be completed and issues a GET PRIMAL DEVICE CHALLENGE KEY BT CONNECTION instruction 22030. The Primal Device, after receiving the instruction, transmits the data that was created during Process BT 1.1.4, to the host module (see reference number 22031).

The host module 110 then receives E(KP_dc[I], K_ch[P]||DCC(K_CA, KP_dc[P]) and after issuing a PUT PRIMAL DEVICE CHALLENGE KEY BT CONNECTION instruction 22040 to the Inceptive Device, transfers the received data thereto (see reference number 22041).

The Primal Device, after receiving E(KP_dc[I], K_ch[P]||DCC(K_CA, KP_dc[P]), executes the following three processes shown in reference number 22042:

Process BT 1.2.1: Executed to verify DCC (K_CA, KP_dc[P]). The verification method is the same as that described for Process UT 1.1.1. The RDCL referred to, however, is RDCL_[I].

Process BT 1.2.2: Separates and decrypts only E(KP_dc[I], K_ch[P]) of the received data. The decryption uses the K_dc[I] embedded in the protected information storage region of the Device itself.

Process BT 1.2.3: Checks execution results on Process BT 1.2.2 whether K_ch[P] is included in proper form. The checking method is the same as that described for Process UT 1.3.3.

During the execution of Processes BT 1.2.1 to 1.2.3, the host module 110 estimates completion timing of processing and issues a GET INCEPTIVE DEVICE CHALLENGE KEY BT CONNECTION instruction 22050 in appropriate timing. The Inceptive Device, after receiving the instruction, executes the following two processes shown in reference number 22051:

Process BT 1.3.1: Creates a Challenge key K_ch[I].

Process BT 1.3.2: Concatenates the Device public key KP_d[I] embedded in the Device's own information storage region, to data that was created during Process BT 1.3.1, and conducts encryption with the KP_dc[P] that was received in Process BT 1.2.1. The RDCL_[I] recorded in the Device's own information region is concatenated to data that has been obtained by the encryption, and the obtained entire data is encrypted using the K_ch[P] that was obtained in Process BT 1.2.3. The data finally obtained is E(K_ch[P], E(KP_dc[P], K_ch[I]||KP_d[I])||RDCL_[I]).

After E(K_ch[P], E(KP_dc[P], K_ch[I]||KP_d[I])||RDCL_[I]) has been created in the Inceptive Device, the Device transmits the created data to the host module (see reference number 22052).

The host module 110 then receives E(K_ch[P], E(KP_dc[P], K_{13} s[I]0||KP_d[I]||RDCL_[I]) and after issuing a PUT INCEPTIVE DEVICE CHALLENGE KEY BT CONNECTION instruction 22060 to the Primal Device, transfers the received data thereto (see reference number 22061).

The Primal Device, after receiving E(K_ch[P], E(KP_dc[P], K_s[I]0||KP_d[I]||RDCL_[I]), executes the following seven processes shown in reference number 22062:

Process BT 1.4.1: Decrypts the received data by using the key data K_ch[P] that the Device itself generated during Process BT 1.1.2.

Process BT 1.4.2: Separates RDCL_[I] from execution results on Process UT 1.4.1 and checks whether RDCL_[I] is included in proper form. The checking method is the same as that described for Process UT 1.3.3.

Process BT 1.4.3: Compares issue date information of the RDCL_[P] recorded in the Device's own region, and issue date information of the transmitted RDCL_[I]. The comparison assumes that the issue date information of the RDCLs is included therein. If, as a result of the comparison, the issue date information of the received RDCL_[I] is newer than that of the RDCL_[P] recorded in the Device's own region, the RDCL_[P] is overwritten with the RDCL_[I].

Process BT 1.4.4: Decrypts the remaining data E(KP_dc[P], K_ch[I]||KP_d[I] by using K_dc[P].

Process BT 1.4.5: Checks whether K_ch[I]||KP_d[I] is included in proper form in data that was obtained in Process BT 1.4.4. The checking method is the same as that described for Process UT 1.2.3.

Process BT 1.4.6: Creates a zeroth-order session key K_s[P]0.

Process BT 1.4.7: Concatenates the Device public key KP_d[I] embedded in the Device's own information storage region, to K_{13} s[P]0 that was created during Process BT 1.4.6, and conducts encryption with the KP_d[I] that was received in Process BT 1.4.5. The data consequently obtained is E(KP_d[I], K_s[P]0||KP_d[P]). At this time, if, as a result of the comparison of the RDCL_[P] and RDCL_[I] issue date information in Process BT 1.4.3, the issue date of RDCL_[P] is newer, RDCL_[P] is concatenated to E(KP_d[I], K_s[P]0||KP_d[P]) and the entire data consequently obtained is encrypted using the K_ch[I] that was obtained in Process BT 1.4.5. The data finally obtained is E(K_ch[I], E(KP_d[I], K_{13} s[P]0||KP_d[P]||RDCL[P]).

While the Primal Device is executing Processes BT 1.4.1 to 1.4.7, the host module 110 estimates completion timing of processing and issues a GET PRIMAL DEVICE SESSION KEY BT CONNECTION instruction 22071 in appropriate timing. The Primal Device, after receiving the instruction, transmits the data E(K_ch[I], E(KP_d[I], K_s[P]0||KP_d[P]||RDCL[P]) that was created during Process BT 1.4.7, to the host module (see reference number 22071).

The host module 110 then receives E(K_ch[I], E(KP_d[I], K_{13} s[P]0||KP_d[P]||RDCL[P]) and after issuing a PUT PRIMAL DEVICE SESSION KEY BT CONNECTION instruction 22080 to the Inceptive Device, transfers the received data to the Device (see reference number 22081).

The Inceptive Device, after receiving E(K_ch[I], E(KP_d[I], K_s[P]0||KP_d[P]||RDCL[P]), executes the following five processes shown in reference number 22082:

Process BT 1:5.1: Decrypts the received data by using the key data K_ch[I] that the Device itself generated during Process BT 1.3.1.

Process BT 1.5.2: If RDCL_[P] is included in execution results of Process BT 1.5.1, the RDCL_[P] data is separated and whether the data is included in proper form is checked. The checking method is the same as that described for Process UT 1.3.3.

Process BT 1.5.3: If, after the execution of Processes BT 1.5.1 and 1.5.2, RDCL_[P] is included in the received data, and if the fact that the RDCL_[P] is included in proper form is ascertainable, the RDCL_[I] recorded in the Device's own information storage region is overwritten with the received RDCL_[P].

Process BT 1.5.4: Decrypts the remaining data E(KP_d[I], K_s[P]0∥KP_d[P]) by using the K_s[I]0 embedded in the Device's own protected information storage region.

Process BT 1.5.5: Checks whether K_s[P]0∥KP_d[P]) is included in proper form in data that was obtained in Process UT 1.5.4. The checking method is the same as that described for Process UT 1.3.3.

While the Inceptive Device is executing Processes BT 1.5.1 to 1.5.5, the host module estimates completion timing of processing and issues a GET INCEPTIVE DEVICE SESSION KEY BT CONNECTION instruction 22090 in appropriate timing. The Inceptive Device, after receiving the instruction, executes the following three processes shown in reference number 22091:

Process BT 1.6.1: Creates a zeroth-order session key K_s[I]0.

Process BT 1.6.2: Records on the Connection Log the $K_{13}$ s[P]0 and KP_d[P] that were received during Process BT 1.5.5, $K_{13}$ s[I]0 that was created during Process BT 1.6.1, and the Primal Device's Type Map TM_[P] included in the DCC (K_CA, KP_dc[P]) which was received during Process BT 1.2.1.

Process BT 1.6.3: Encrypts the $K_{13}$ s[I]0 that was created during Process BT 1.6.1. The encryption uses the K_s[P]0 and KP_d[P] that were received during Process BT 1.5.5. The data to be created is E(KP_d[P], K_s[P]0, $K_{13}$ s[I]0.

After E(KP_d[P], K_s[P]0, $K_{13}$ s[I]0 has been created in the Inceptive Device, the Device transmits the created data to the host module (see reference number 22092).

The host module 110 then receives E(KP_d[P], K_s[P]0, $K_{13}$ s[I]0 and after issuing a PUT INCEPTIVE DEVICE SESSION KEY BT CONNECTION instruction 22100 to the Primal Device, transfers the received data thereto (see reference number 22101).

The Primal Device, after receiving E(KP_d[P], E($K_{13}$ s[P]0, $K_{13}$ s[I]0), executes the following three processes shown in reference number 22102:

Process BT 1.7.1: Decrypts the received data by using K_d[P] and $K_{13}$ s[P]0, where K_d[P] is key data embedded in the Device's own protected information region, and K_s[P]0 is key data that the Device itself generated during Process BT 1.4.6.

Process BT 1.7.2: Checks whether K_s[I]0 is included in proper form in data that was obtained in Process UT 1.7.1. The checking method is the same as that described for Process UT 1.3.3.

Process BT 1.7.3: Records on the Connection Log the KP_d [I] that was received during Process BT 1.4.5, $K_{13}$ s[I]0 that was received during Process BT 1.7.2, and the Primal Device's Type Map TM_[I] included in the DCC (K_CA, KP_dc[I]) which was received during Process BT 1.1.1.

When each Process up to BT 1.7.3 is completed, this means that sharing between the symmetric Device public key *KP_d [P] (the same as the symmetric Device private key *K_d[P]), K_s[P]0, and $K_{13}$ s[I]0 has been completed.

Processing Sequence for Usage Pass Transfer from the Primal Device to the Inceptive Device in BT Mode After mutual authentication between the Primal Device and the Inceptive Device in BT mode has been completed, Usage Passes can be transferred from the Primal Device to the Inceptive Device, or vice versa.

Figure 23:
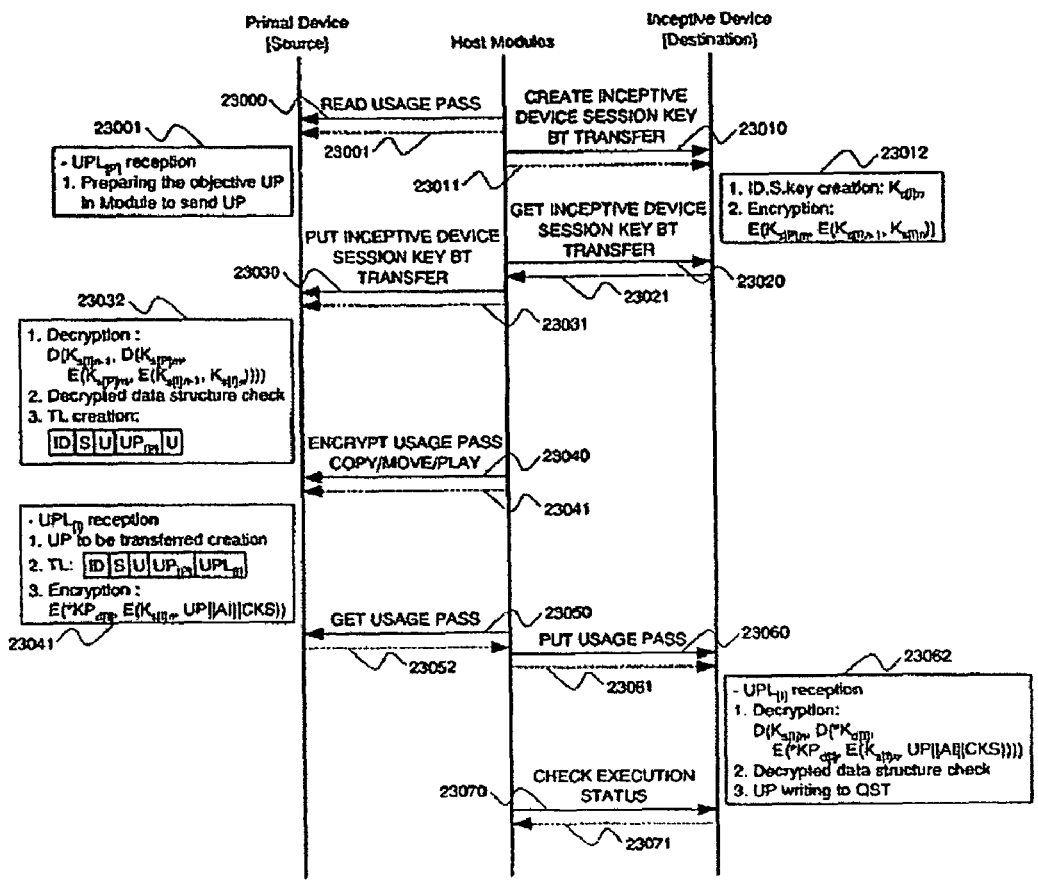
FIG. 23 is a diagram showing a transfer processing sequence for Usage Pass transmission from the recorder/player to the magnetic disk drive in BT mode in the embodiment.

Usage Pass transfer from the Primal Device to the Inceptive Device will be first described using FIG. 23. One such example applies when the recording module 102 operates as the Primal Device to transfer Usage Passes to the magnetic disk drive. A processing stage of the Usage Pass transfer from the Primal Device to the Inceptive Device in BT mode is hereunder called "BT PI Transfer stage."

First, the host module 110 issues a READ USAGE PASS instruction 23000 to the Primal Device. After this, locations at which existing Usage Passes are recorded and the number of Usage Passes to be read out are notified to the Primal Device (see reference number 23001). The Primal Device, after receiving the above instruction and information on the above-mentioned recording locations of the existing Usage Passes and on the number of Usage Passes to be read out, executes the following process shown in reference number 23002:

Process BT 2.1.1: Sets up a Usage Pass to be transferred, in the Usage Pass transmitting module. If the Primal Device is the recording module, the setup of the Usage Pass to be transferred is equivalent to sending the Usage Pass from the Usage Pass creator and content encrypter 606 to the module 601.

While getting the Primal Device to execute Process BT 2.1.1, the host module 110 issues a CREATE INCEPTIVE DEVICE SESSION KEY UT TRANSFER instruction 19020 to the Inceptive Device. The Inceptive Device, after receiving this instruction, executes the following two processes shown in reference number 23012:

Process BT 2.2.1: Creates a session key K_s[I]n, where "n" means that this process is the nth BT PI Transfer stage after completion of the BT Connection stage.

Process BT 2.2.2: Encrypts the K_s[I]n that was created during Process BT 2.2.1. The encryption uses the session key K_s[I]n−1 created during execution of the immediately preceding Usage Pass transfer, and the latest session key K_s[P]m created by the Primal Device. The key K_s [P]m is generated each time a Usage Pass is transferred from the Inceptive Device to the Primal Device, and means that the transfer process has been repeated an "m" number of times after completion of the BT Connection stage. A processing sequence for Usage Pass transfer from the Inceptive Device to the Primal Device will be later described in detail using FIG. 24. If no Usage Passes have been transferred from the Inceptive Device to the Primal Device, the zeroth-order session key K_s[P]0 shared at the BT Connection stage will be used as $K_{13}$ s[P]m. The data obtained will be E(K_s[P]m, E(K_s[I]n−1, $K_{13}$ s[I]n)).

While the Inceptive Device is executing Processes BT 2.2.1 and 2.2.2, the host module estimates completion timing of processing and issues a GET INCEPTIVE DEVICE SESSION KEY BT TRANSFER instruction 23020 in appropriate timing. The Inceptive Device, after receiving the instruction, transmits the data E(K_s[P]m, E(K_s[I]n−1, K_s[I]n)) generated during Process BT 2.2.2, to the host module (see reference number 23021).

The host module 110, after receiving E(K_s[P]m, E(K_s [I]n−1, K_s[I]n)), issues a PUT INCEPTIVE DEVICE SES- SION KEY BT TRANSFER instruction 22030 to the Primal Device and then sends the received data thereto (see reference number 23031).

The Primal Device, after receiving E(K_s[P]m, E(K_s[I]n−1, $K_{13}$ s[I]n)), executes the following three processes shown in reference number 23032:

Process BT 2.3.1: Decrypts the received data by using $K_{13}$ s[P]m and $K_{13}$ s[I]n−1. Both sets of key data are as described for Process BT 2.2.2.

Process BT 2.3.2: Checks whether $K_{13}$ s[I]n is included in proper form in the data that was obtained in Process BT 2.3.1. The checking method is the same as that described for Process UT 1.3.3.

Process BT 2.3.3: Creates a Transaction Log. During a Usage Pass transfer process in BT mode, only the Primal Device records data in the Transaction Log. Elements of the Transaction Log in BT mode are: the Usage Pass identifier of the Usage Pass to be transferred; the role of the Primal Device in the Usage Pass transfer process (i.e., whether to operate as the Usage Pass transfer "Source" or "Destination"); only when the Primal Device is the Usage Pass transfer destination, UR_s of the Usage Pass existing before it arrives at the Primal Device planned to receive it, or only when the Primal Device is the Usage Pass transfer source, the Usage Pass itself that exists before being transmitted from the Primal Device planned to transfer the Usage Pass; and only when the Primal Device is the Usage Pass transfer destination, the Usage Pass Location (readout source address) at the transfer source, or only when the Primal Device is the Usage Pass transfer source, the Usage Pass Location (recording destination address) at the transfer destination.

Of the above, only the following elements are recorded in the Transaction Log: the Usage Pass identifier of the Usage Pass to be transferred; the role of the Primal Device in the Usage Pass transfer process, i.e., the "Source" (in FIG. 23, shown as "S" in abbreviated form); the Usage Pass itself that exists before being transmitted; and the Usage Pass Location (recording destination address) of the Usage Pass.

While the Primal Device is executing Processes BT 2.3.1 to BT 2.3.3, the host module estimates completion timing of processing and issues either an ENCRYPT USAGE PASS COPY, ENCRYPT USAGE PASS MOVE, or ENCRYPT USAGE PASS PLAY instruction 23040 in appropriate timing. Following the instruction, recording destination address information of the Usage Pass to the Inceptive Device is transmitted to the Primal Device (see reference number 23041). In BT mode, as in UT mode, issuance of the instruction assumes that all necessary information is predefined. More specifically, the predefined information means, for example, what UR_s is assigned to the Usage Pass to be transmitted following completion of instruction receiving, and in what form the UR_s information of the Usage Pass that will be left in the Primal Device after copying or playback is to be changed. After thus receiving the instruction, the Primal Device executes the following three processes shown in reference number 23042:

Process BT 2.4.1: The Usage Pass to be transmitted to the Inceptive Device is generated from information on the Usage Pass set up in the Usage Pass transmitting module in Process BT 2.1.1. Information, such as the UPID and K_c, is usually copied intact, and only UR_s is changed in the predefined form.

Process BT 2.4.2: The Usage Pass recording destination address in the Inceptive Device, received during Process BT 23041, is recorded at the Usage Pass Location in the Transaction Log.

Process BT 2.4.3: The Action Indicator indicating whether the instruction that has been received for the Usage Pass generated in Process BT 2.4.1 is ENCRYPT USAGE PASS COPY, ENCRYPT USAGE PASS MOVE, or ENCRYPT USAGE PASS PLAY, and the Checksum for the Usage Pass‖Action Indicator are calculated and concatenated together. After the concatenation, obtained data is encrypted using $K_{13}$ s[I]n and *KP_d[I]. That is, the data is double-encrypted with the symmetric keys. The data obtained is E(*KP_d[I], E(K_s[I]n, Usage Pass‖Action Indicator‖Checksum)). The calculation of the Checksum is as described for Process UT 2.4.2.

While the Primal Device is executing Processes BT 2.4.1 to BT 2.4.3, the host module estimates completion timing of processing and issues a GET USAGE PASS instruction 23050 in appropriate timing. After receiving this instruction, the Primal Device transmits E(*KP_d[I], E(K_s[I]n, Usage Pass‖Action Indicator‖Checksum)) to the host module (see reference number 23052). The host module 110, after receiving E(*KP_d[I], E($K_{13}$ s[I]n, Usage Pass‖Action Indicator‖Checksum)), issues a PUT USAGE PASS instruction 23060 to the Inceptive Device and then transfers E(*KP_d[I], E(K_s[I]n, Usage Pass‖Action Indicator‖Checksum)) thereto (see reference number 23061).

The Inceptive Device, after receiving E(*KP_d[I], E(K_s[I]n, Usage Pass‖Action Indicator‖Checksum)), executes the following three processes shown in reference number 23062:

Process BT 2.5.1: Decrypts received data with *K_d[I] and K_s[I]n, where *K_d[I] is the symmetric key that was obtained in Process BT 1.5.4, and $K_{13}$ s[I]n is the session key that the Device itself generated in Process BT 2.2.1.

Process BT 2.5.2: Checks whether the Usage Pass‖Action Indicator‖Checksum is included in proper form in the data that was obtained in Process BT 2.5.1. The check is conducted by verifying the Checksum and using the method described for Process UT 1.3.3. The verification method using the Checksum is as described for Process UT 2.4.2.

Process BT 2.5.3: Records the received Usage Pass in the qualified storage. During Usage Pass recording, the validity indicator flag is set to "Valid."

After this, the host module 110 may issue a CHECK EXECUTION STATUS instruction 23070 to the Inceptive Device in order to confirm whether the receiving of the Usage Pass by the Inceptive Device or recording of the Usage Pass in the qualified storage 223 has come to a normal end. In that case, execution status is transmitted as a response 23071 from the Inceptive Device to the host module.

Repeating the above-described BT Transfer stage makes it possible to continuously execute Usage Pass transfer without repeating the Connection stage.

Figure 24:
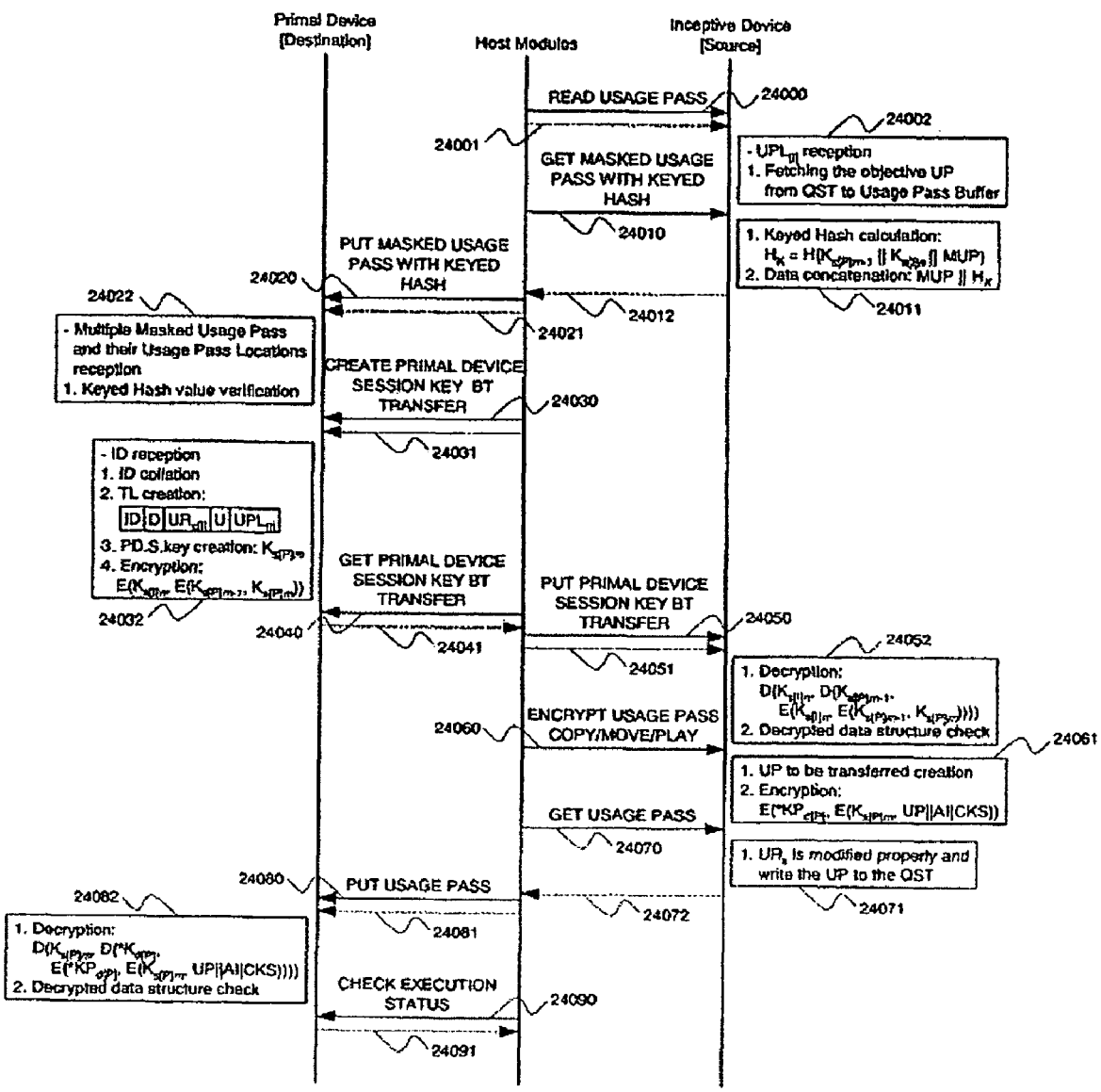
FIG. 24 is a diagram showing a transfer processing sequence for Usage Pass transmission from the magnetic disk drive to the recorder/player in BT mode in the embodiment.
Figure 25:
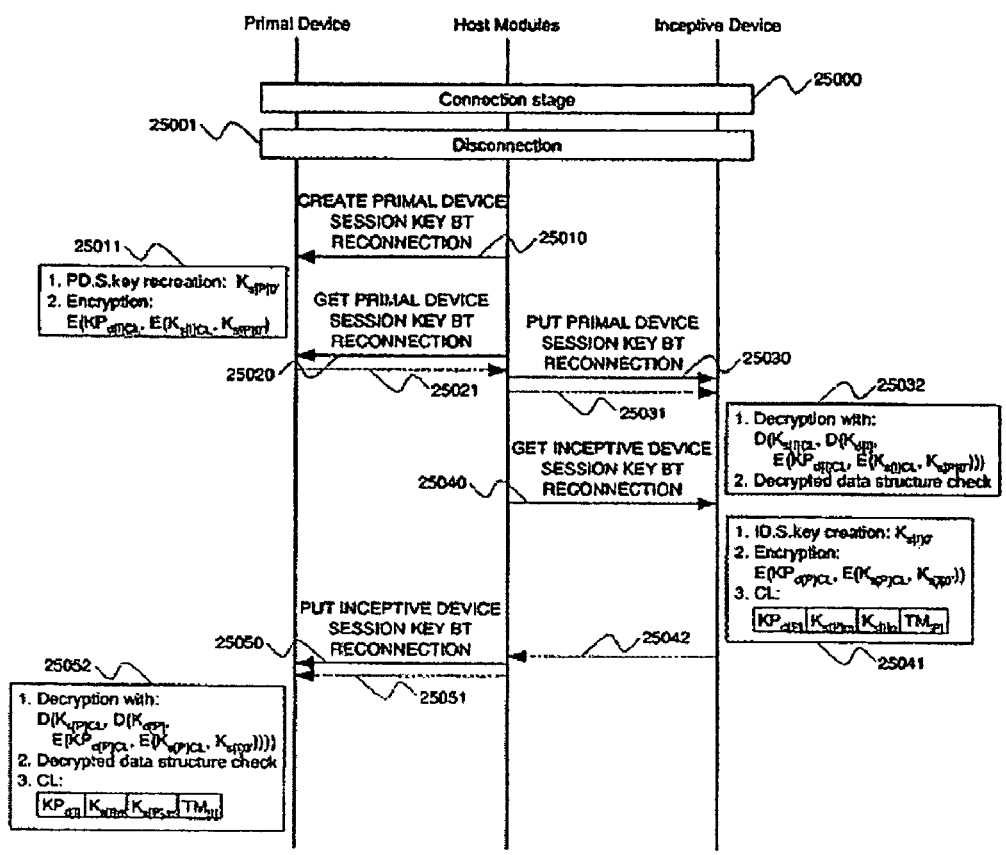
FIG. 25 is a diagram that shows a simplified mutual re-authentication processing sequence conducted between the recorder/player and the magnetic disk drive in BT mode in the embodiment.
Figure 2:
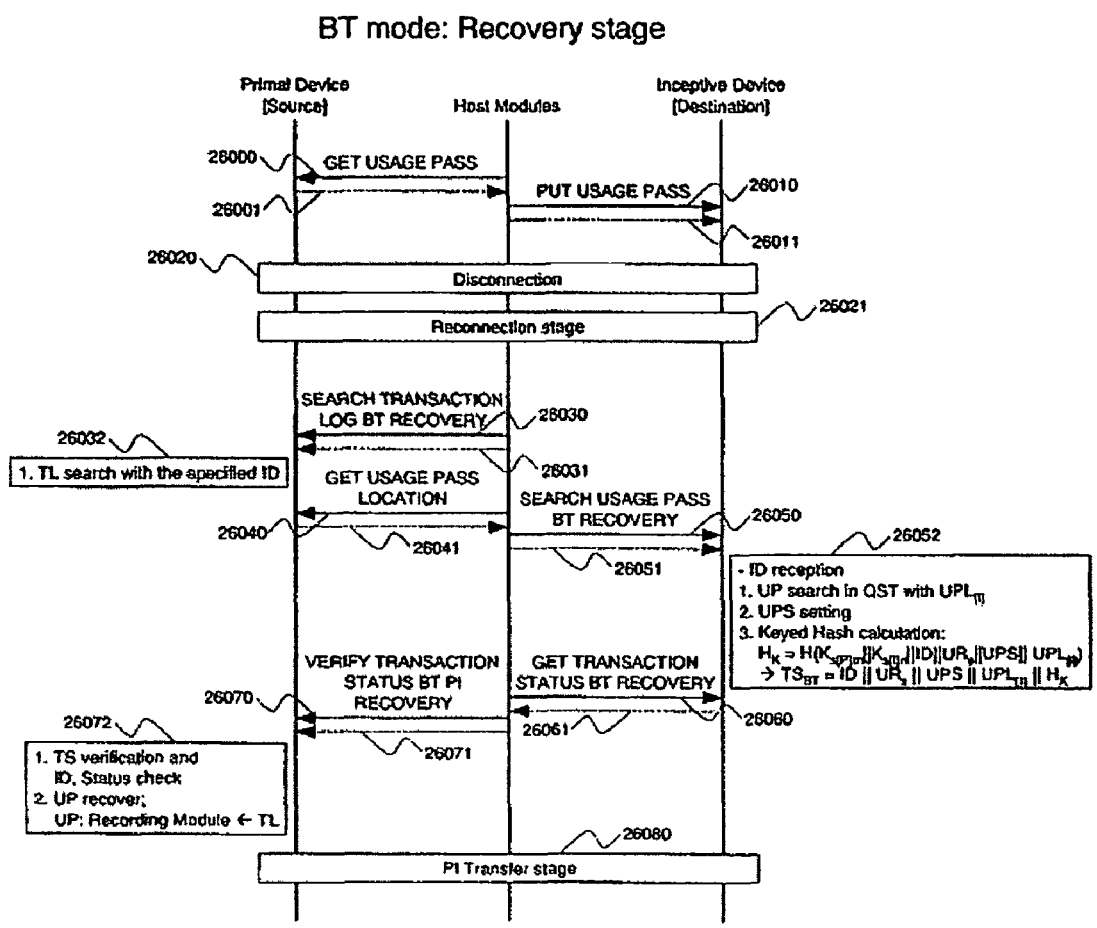
Figure 27:
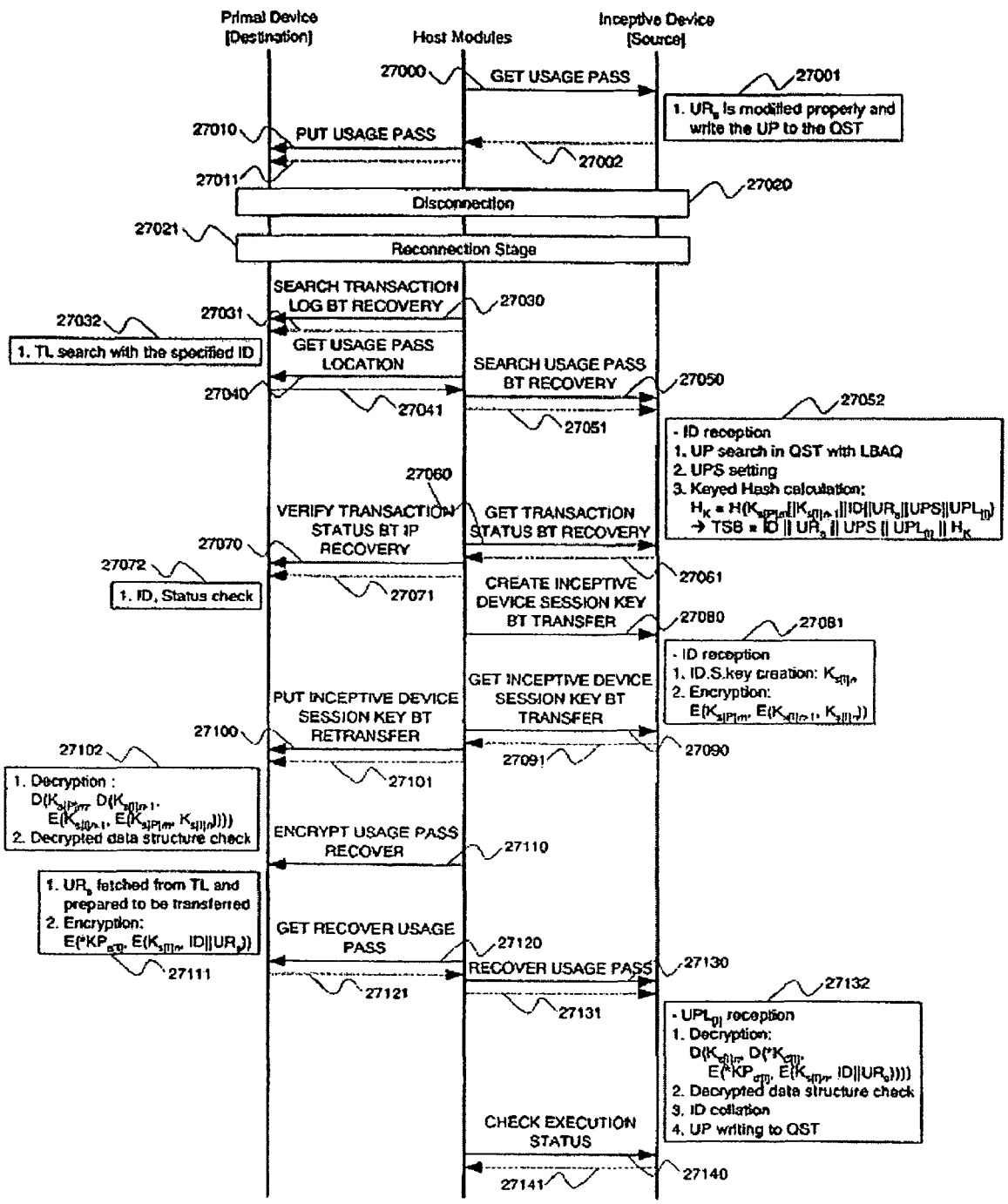
FIG. 27 is a diagram that shows a processing sequence conducted in BT mode in the embodiment in order to recover a Usage Pass that has been lost after being transmitted from the magnetic disk drive to the recorder/player.

Processing Sequence for Usage Pass Transfer from the Inceptive Device to the Primal Device in BT Mode Next, Usage Pass transfer from the Inceptive Device to the Primal Device will be described using FIG. 24. One such example applies when the magnetic disk drive operates as the Primal Device to transfer Usage Passes to the playback module 104. A processing stage of the Usage Pass transfer from the Inceptive Device to the Primal Device in BT mode is hereunder called "BT IP Transfer stage."

First, the host module 110 issues a READ USAGE PASS instruction 24000 to the Inceptive Device. After this, locations at which existing Usage Passes are recorded, and the number of Usage Passes to be read out are notified to the Primal Device (see reference number 24001). The Inceptive Device, after receiving the above instruction and information on the above-mentioned recording locations of the existing Usage Passes and on the number of Usage Passes to be read out, executes the following process shown in reference number 24002:

Process BT 3.1.1: Reads out a Usage Pass to be transferred, from a specified address in the qualified storage, and transmits the Usage Pass to the Usage Pass buffer 1110.

While the Inceptive Device is executing Process BT 3.1.1, the host module estimates completion timing of processing and issues a GET MASKED USAGE PASS WITH MASKED HASH instruction 24010 to the Primal Device in appropriate timing. The Inceptive Device, after receiving this instruction, executes the following two processes shown in reference number 24011:

Process BT 3.2.1: Creates a Masked Usage Pass from one of the Usage Passes which were read out from the qualified storage in accordance with the READ USAGE PASS instruction 24000, and calculates the Hash value of that read Usage Pass from the data obtained by concatenating the latest session key $K_{13}$ s[P]m−1 and $K_{13}$ s[I]n existing when the GET MASKED USAGE PASS WITH MASKED HASH instruction 24010 was received. If multiple Usage Passes are read out at a time in accordance with the READ USAGE PASS instruction 24000, the Hash values of each Usage Pass are calculated.

Process BT 3.2.2: The Hash values that were generated during Process BT 3.2.1 are concatenated to the respective Masked Usage Passes. The data obtained is MUP∥H($K_{13}$ s[P]m−1∥K_s[I]n∥MUP).

After finishing Process BT 3.2.2, the Inceptive Device sends the created data MUP∥H(K_s[P]m−1∥K_s[I]n∥MUP) to the host module (see reference number 24012).

The host module 110, after receiving MUP∥H(K_s[P]m−1∥K_s[I]n∥MUP), issues a PUT MASKED USAGE PASS WITH MASKED HASH instruction to the Primal Device and then transmits data thereto.

The Primal Device, after receiving the data, executes the following process shown in reference number 24022:

Process BT 3.3.1: Verifies whether the received data is falsified, and calculates the Hash value H(K_s[P]m−1∥K_s[I]n∥MUP) using the received MUP and the session key $K_{13}$ s[P]m−1 and $K_{13}$ s[I]n that the Device itself holds. If calculation results match the received Hash value, the received data is judged not to be falsified.

While the Primal Device is executing Process BT 3.3.1, the host module estimates completion timing of processing and after issuing a CREATE PRIMAL DEVICE SESSION KEY BT TRANSFER instruction 24030 to the Primal Device in appropriate timing, transmits the Usage Pass identifier of the Usage Pass to be transferred (see reference number 24031).

The Primal Device, after receiving the above instruction and data, executes the following four processes shown in reference number 24032:

Process BT 3.4.1: Checks for matching between the Usage Pass identifier that was received in 24031, and the Usage Pass identifier of the Masked Usage Pass which was received in 24021.

Process BT 3.4.2: Creates a Transaction Log. Recorded in the Transaction Log are: the Usage Pass identifier of the Usage Pass to be transferred; the role of the Primal Device in the Usage Pass transfer process, i.e., the "Destination" (in FIG. 24, shown as "D" in abbreviated form); UR_s included in the Masked Usage Pass which was received in reference number 24021; and the Usage Pass Location (recording source address) in the qualified storage of the Inceptive Device.

Process BT 3.4.3: Creates a session key K_s[P]m, where "m" means that the session key was created at the mth BT IP Transfer stage after the BT Connection stage.

Process BT 3.4.4: Encrypts the $K_{13}$ s[P]m that was created during Process BT 3.4.3. The encryption uses the session key K_s[P]m−1 created during execution of the immediately preceding Usage Pass transfer, and the latest session key K_s[P]n created by the Inceptive Device. The key K_s[I]n is generated each time the BT Transfer stage is executed, and means that the transfer process has been repeated an "n" number of times after completion of the BT Connection stage. The BT Transfer stage has already been described hereinbefore per FIG. 23. If no Usage Passes have been transferred from the Primal Device to the Inceptive Device, the zeroth-order session key K_s[I]0 shared at the BT Connection stage will be used as $K_{13}$ s[I]n. The data obtained will be E(K_s[I]n, E(K_s[P]m−1, $K_{13}$ s[P]m)).

While the Primal Device is executing Processes BT 3.4.1 to 3.4.4, the host module estimates completion timing of processing and issues a GET PRIMAL DEVICE SESSION KEY BT TRANSFER instruction 24040 in appropriate timing. The Primal Device, after receiving the instruction, transmits the data that was created during Process BT 3.4.4, to the host module, as denoted by reference number 24041.

The host module 110, after receiving E($K_{13}$ s[I]n, E($K_{13}$ s[P]m−1, $K_{13}$ s[P]m)), issues a PUT PRIMAL DEVICE SESSION KEY BT TRANSFER instruction 24050 to the Inceptive Device and then transmits the received data thereto (see reference number 24051).

The Inceptive Device, after receiving E(K_s[I]n, E(K_s[P]m−1, K_s[P]m)), executes the following two processes shown in reference number 24052:

Process BT 3.5.1: Decrypts the received data by using K_s[I]n and $K_{13}$ s[P]m−1. Both sets of key data are as described for Processes BT 3.2.1 and 3.4.4.

Process BT 3.5.2: Checks whether K_s[P]m is included in proper form in the data that was obtained in Process BT 3.5.1. The checking method is the same as that described for Process UT 1.3.3.

While the Inceptive Device is executing Processes BT 3.5.1 and 3.5.2, the host module estimates completion timing of processing and issues either an ENCRYPT USAGE PASS COPY, ENCRYPT USAGE PASS MOVE, or ENCRYPT USAGE PASS PLAY instruction 24060 in appropriate timing. In BT mode, as in UT mode, issuance of the instruction assumes that all necessary information is predefined. More specifically, the predefined information means, for example, what UR_s is assigned to the Usage Pass to be transmitted following completion of instruction receiving, and in what form the UR_s information of the Usage Pass that will be left in the Primal Device after copying or playback is to be changed. After thus receiving the instruction, the Inceptive Device executes the following two processes shown in reference number 24062:

Process BT 3.6.1: In the module 1103, the Usage Pass to be transmitted to the Primal Device is generated from the Usage Pass that was sent to the Usage Pass buffer in Process BT 3.1.1. Information, such as the UPID and K_c, is usually copied intact, and only UR_s is changed in the predefined form.

Process BT 3.6.2: The identifier information Action Indicator indicating whether the instruction that has been received for the Usage Pass generated in Process BT 3.6.1 is ENCRYPT USAGE PASS COPY, ENCRYPT USAGE PASS MOVE, or ENCRYPT USAGE PASS PLAY, and the Checksum for the Usage Pass∥Action Indicator are calculated and concatenated together. After the concatenation, obtained data is encrypted using $K_{13}$ s[P]m and *KP_d[P]. That is, the data is double-encrypted with the symmetric keys. The data obtained is E(*KP_d[P], E($K_{13}$ s[P]m, Usage Pass||Action Indicator||Checksum)). The calculation of the Checksum is as described for Process UT 2.4.2.

While the Inceptive Device is executing Processes B T 3.6.1 and 3.6.2, the host module estimates completion timing of processing and issues a GET USAGE PASS instruction 24070 in appropriate timing. After receiving this instruction, the Inceptive Device executes the following process shown in reference number 24071:

Process BT 3.7.1: The UR_s of the Usage Pass in the Usage Pass buffer is changed as predefined. After this, the Usage Pass is overwritten in where it was originally recorded in the qualified storage. The value of the validity indicator flag is set to "Invalid" if the instruction 24060 was ENCRYPT USAGE PASS MOVE.

The Inceptive Device, after finishing Process BT 3.7.1, transmits the data that has been created during the Process, to the host module, as denoted by reference number 24072.

The host module 110, after receiving E(*KP_d[P], E(K_s[P]m, Usage Pass||Action Indicator||Checksum)), issues a PUT USAGE PASS instruction 24080 to the Primal Device and transmits E(*KP_d[P], E(K_s[P]m, Usage Pass||Action Indicator||Checksum)) to the Device (see reference number 24081).

The Inceptive Device, after receiving the above instruction and data, executes the following two processes shown in reference number 24082:

Process BT 3.8.1: Decrypts received data with *K_d[P] and $K_{13}$ s[P]m, where *K_d[P] is the symmetric key that was obtained in Process BT 1.7.1, and $K_{13}$ s[P]m is the session key that the Device itself generated in Process BT 3.4.3.

Process BT 3.8.2: Checks whether the Usage Pass||Action Indicator||Checksum is included in proper form in the data that was obtained in Process BT 3.8.1. The check is conducted by verifying the Checksum and using the method described for Process UT 1.3.3. The verification method using the Checksum is as described for Process UT 2.4.2.

After the above, the host module may issue a CHECK EXECUTION STATUS instruction 24090 to the Primal Device in order to confirm whether the receiving of the Usage Pass by the Inceptive Device has come to a normal end. Execution status is transmitted as a response 24091 from the Primal Device to the host module.

Repeating the above-described BT Transfer stage makes it possible to continuously execute Usage Pass transfer without repeating the Connection stage.

Inter-Device Mutual Re-Authentication Processing Sequence in BT Mode

After execution of the BT Connection stage once between the Primal Device and the Inceptive Device has been followed by sharing between the respective symmetric Device public keys KP_d[P] and KP_s[I] and zeroth-order session keys $K_{13}$ s[P]0 and $K_{13}$ s[I]0 and also recording of each of these keys in the Connection Log, if the recorder/player becomes abnormal and the session key is lost in both the Usage Pass transmitting module and receiving module, mutual authentication can be re-completed under a small processing load compared with that of the Connection stage. This mutual re-authentication processing sequence will be described using FIG. 25. This processing stage in BT mode is hereunder called "BT Reconnection stage."

First, description is given assuming that after completion of the BT Connection stage in reference number 25000, disconnection is caused between the Primal Device and the Inceptive Device by the occurrence of an abnormality, and consequently, the latest session keys $K_{13}$ s[P]m and $K_{13}$ s[I]n at that point of time and/or the symmetric Device public keys *KP_s[P] and *KP_d[I] are lost in both Devices, as denoted by reference number 25001.

In the above case, the host module 110 first issues a CREATE PRIMAL DEVICE SESSION KEY BT RECONNECTION instruction 25010 to the Primal Device.

The Primal Device, after receiving the instruction, executes the following two processes shown in reference number 25011:

Process BT 4.1.1: Creates a zeroth-order session key K_s[P]0'.

Process BT 4.1.2: Encrypts the $K_{13}$ s[P]0' that was created during Process BT 4.1.1. The encryption uses the session key K_s[I]CL and Device public key KP_d[I]CL recorded in the Device's own Connection Log. The keys K_s[I]CL and KP_d[I]CL indicate that the key data is recorded in the Connection Log. The data finally obtained is E(KP_d[I]CL, E(K_s[I]CL, K_s[P]0')).

While the Primal Device is executing Processes BT 4.1.1 and 4.1.2, the host module estimates completion timing of processing and issues a GET PRIMAL DEVICE SESSION KEY BT RECONNECTION instruction 25020 in appropriate timing. The Primal Device, after receiving the instruction, transmits the above data E(KP_d[I]CL, E(K_s[I]CL, K_s[P]0')) to the host module. The host module 110, after receiving E(KP_d[I]CL, E(K_s[I]CL, K_s[P]0')), issues a PUT PRIMAL DEVICE SESSION KEY BT RECONNECTION instruction 25030 to the Inceptive Device and then transmits the received data thereto (see reference number 25031). The Inceptive Device, after receiving E(KP_d[I]CL, E($K_{13}$ s[I]CL, $K_{13}$ s[P]0')), executes the following two processes shown in reference number 25032:

Process BT 4.2.1: Decrypts the received data. The decryption uses the K_d[I] embedded in the Device's own protected information region, and the session key $K_{13}$ s[I]CL included in the Connection Log.

Process BT 4.2.2: Checks whether $K_{13}$ s[P]0' is included in proper form in execution results of Process UT 4.2.1. The checking method is the same as that described for Process UT 1.3.3.

During the execution of Processes BT 4.2.1 and 4.2.2, the host module estimates completion timing of processing and issues a GET INCEPTIVE DEVICE SESSION KEY BT RECONNECTION instruction 25040 in appropriate timing. The Inceptive Device, after receiving the instruction, executes the following three processes shown in reference number 25041:

Process BT 4.3.1: Creates a zeroth-order session key $K_{13}$ s[I]0'.

Process BT 4.3.2: Encrypts the $K_{13}$ s[I]0' that was created during Process BT 4.3.1. The encryption uses the session key K_s[P]CL and Device public key KP_d[P]CL recorded in the Device's own Connection Log. The keys $K_{13}$ s[P]CL and KP_d[P]CL indicate that the key data is recorded in the Connection Log. The data finally obtained is E(KP_d[P]CL, E(K_s[P]CL, $K_{13}$ s[I]0')).

Process BT 4.3.3: Records both the $K_{13}$ s[P]0' that was received during Process BT 4.2.2, and the $K_{13}$ s[I]0' that was created during Process BT 4.3.1, in the Connection Log by overwriting. At that time, KP_d[P] and TM_[P] are maintained as they are.

The Inceptive Device, after finishing Process BT 4.3.3, transmits the data E(KP_d[P]CL, E(K_s[P]CL, K_s[I]0')) that was created during Process BT 4.3.2, to the host module, as denoted by reference number 25040. The host module 110, after receiving E(KP_d[P]CL, E(K_s[P]CL, K_s[I]0')), issues a PUT INCEPTIVE DEVICE SESSION KEY BT RECONNECTION instruction 25050 to the Primal Device and then transmits the received data thereto (see reference number 25051). The Primal Device, after receiving E(KP_d [P]CL, E(K_s[P]CL, $K_{13}$ s[I]0')), executes the following three processes shown in reference number 25052:

Process BT 4.4.1: Decrypts the received data. The decryption uses the K_d[P] embedded in the Device's own protected information region, and the session key $K_{13}$ s[P]CL included in the Connection Log.

Process BT 4.4.2: Checks whether $K_{13}$ s[I]0' is included in proper form in execution results of Process UT 4.4.1. The checking method is the same as that described for Process UT 1.3.3.

Process BT 4.4.3: Records both the K_s[I]0' that was received during Process BT 4.4.2. and the $K_{13}$ s[P]0' that was created during Process BT 4.1.1, in the Connection Log by overwriting. At that time, KP_d[I] and TM_[I] are maintained as they are.

When Process BT 4.4.3 is completed, this indicates that sharing between *KP_d[I] (the same as *K_d[I]), K_s[P]0', and $K_{13}$ s[I]0' has been completed. The key K_s[I]0' is used as $K_{13}$ s[I]n−1 when the BT PI Transfer stage is executed following completion of the above process. The key K_s[P]0' is used as $K_{13}$ s[P]m−1 when the BT IP Transfer stage is executed following completion of the above processes.

Usage Pass Recovery Processing Sequence with Respect to the BT PI Transfer Stage If, during movement of a Usage Pass at the BT PI Transfer stage, the recorder/player becomes abnormal and the Usage Pass being transferred is lost in both the Primal Device and the Inceptive Device, the Usage Pass is recovered to exist in the Primal Device in such a form that the Usage Pass has the same UR_s as it originally had. Such Usage Pass recovery processing will be described using FIG. 26. This processing stage in BT mode is hereunder called "BT PI Recovery stage."

First, description is given assuming that during the BT PI Transfer stage, the Inceptive Device is receiving a PUT USAGE PASS instruction 26010 and a Usage Pass 26011 subsequently thereto. The description also assumes that before Usage Pass receive processing is executed to completion, disconnection is caused between the Primal Device and the Inceptive Device by the occurrence of an abnormality, and consequently, the session keys $K_{13}$ s[I]n and *KP_d[I] (*K_d [I]) that were being used for encrypting the flowing Usage Pass 26011 are lost in both Devices (see reference number 26020). In such a case, first, the BT Reconnection stage described hereinbefore is executed and *KP_d[P] (the same as *K_d[P]), *KP_d[I] (the same as *K_d[I]), K_s[P]0', and $K_{13}$ s[I]0' are newly shared.

After finishing the BT Reconnection stage, the host module 110 first issues a SEARCH TRANSACTION LOG BT RECOVERY instruction 26030 to the Primal Device. Next after issuing the instruction, the host module sends, as denoted by reference number 26031, the Usage Pass identifier of the Usage Pass 21011 which was being transmitted. The Primal Device, after receiving the identifier, executes the following process shown in reference number 26032:

Process BT 5.1.1: Searches the protected information region for the Transaction Log containing the same identifier value as that of the identifier.

While the Primal Device is executing Process BT 5.1.1, the host module estimates completion timing of processing and issues a GET USAGE PASS LOCATION instruction 26040 in appropriate timing. The Primal Device, after receiving the instruction, transmits the Usage Pass Location information recorded in the Transaction Log which was detected during Process BT 5.1.1, to the host module as shown in reference number 26041.

The host module 110, after receiving the Usage Pass Location information, issues a SEARCH USAGE PASS RECOVERY instruction 26050 to the Inceptive Device and then sends the received data thereto (see reference number 26051).

The Inceptive Device, after receiving the Usage Pass Location information, executes the following three processes shown in reference number 26052:

Process BT 5.2.1: Searches the qualified storage for a Usage Pass storage region specified by the received Usage Pass Location.

Process BT 5.2.2: Examines the value of the validity indicator flag of the Usage Pass detected during Process BT 5.2.1, and sets up either the value "Valid", "Invalid", or "Not recorded", in Usage Pass Status.

Process BT 5.2.3: Generates a Transaction Status for BT mode. The Transaction Status is the "UPID of the Usage Pass to be recovered∥UR_s of the Usage Pass detected during Process BT 5.2.1∥Usage Pass Status set up during Process BT 5.2.2∥Usage Pass Location received in 26041∥Hash value." The Hash value is calculated from K_s[P]m∥K_s[I]n∥UPID∥UR_s∥Usage Pass Status∥Usage Pass Location. The $K_{13}$ s[P]m∥K_s[I]n used here are the latest session keys shared when the Connection stage or the Reconnection stage is completed. These keys indicate that after the stage, the BT PI Transfer stage and the BT IP Transfer stage have been executed an "m" number of times and an "n" number of times, respectively. The Transaction Status generated during this process is hereunder called "BT PI Transfer Status."

While the Inceptive Device is executing Processes BT 5.2.1 to 5.2.3, the host module estimates completion timing of processing and issues a GET TRANSACTION STATUS BT RECOVERY instruction 26060 in appropriate timing. The Inceptive Device, after receiving the instruction, transmits the BT PI Transaction Status generated during Process BT 5.2.3, to the host module as shown in reference number 26061.

The host module 110, after receiving the BT PI Transaction Status, issues a VERIFY TRANSACTION STATUS BT PI RECOVERY instruction 26070 to the Primal Device and then sends the received BT PI Transaction Status thereto (see reference number 26071).

The Primal Device, after receiving the BT PI Transaction Status, executes the following two processes shown in reference number 26072:

Process BT 5.3.1: Verifies the BT PI Transaction Status, and confirms the Usage Pass identifier, Usage Pass Status, and Usage Pass Location included in the BT PI Transaction Status. The verification of the BT PI Transaction Status is accomplished by calculating the data-contained Hash value from the $K_{13}$ s[P]m that the Device itself holds, and from $K_{13}$ s[I]n. If calculation results match the Hash value, the data is judged not to be falsified. Also, the Usage Pass identifier is used to confirm whether the Usage Pass is that which is to be recovered, the Usage Pass Status is used to judge whether the recovery is possible, and the Usage Pass Location is used to confirm whether the Usage Pass storage region in the qualified storage, specified by the Usage Pass Location recorded in the Device's own region, has been searched for properly. If the Usage Pass Status is "Invalid" or "Not recorded", recovery processing for the Usage Pass is executed in the Primal Device. Usage Pass recovery processing, however, is not executed if the Usage Pass Status is different from the information recorded in the Device's own Transaction Log.

Process BT 5.3.2: Executes Usage Pass recovery processing.
  Recovery of the Usage Pass is accomplished by changing the validity indicator flag of the intended Usage Pass to "Valid" (if "Invalid") and overwriting this Usage Pass with the Usage Pass recorded in the Transaction Log.

When Process BT 5.3.2 is completed, the Usage Pass existing before it was transmitted will exist in the Primal Device.
Usage Pass Recovery Processing Sequence with Respect to the BT IP Transfer Stage If, during movement of a Usage Pass at the BT IP Transfer stage, the recorder/player becomes abnormal and the Usage Pass being transferred is lost in both the Primal Device and the Inceptive Device, the Usage Pass can be recovered to exist in the Inceptive Device in such a form that the Usage Pass has the same UR_s as it originally had. Such Usage Pass recovery processing will be described using FIG. 27. This processing stage in BT mode is hereunder called "BT IP Recovery stage."

First, description is given assuming that during the BT IP Transfer stage, the Primal Device is receiving a PUT USAGE PASS instruction 27010 and a Usage Pass 27011 subsequently thereto. The description also assumes that before Usage Pass receive processing is executed to completion, disconnection is caused between the Primal Device and the Inceptive Device by the occurrence of an abnormality, and consequently, the session keys K_s[P]n and *KP_d[P] (*K_d[P]) that were being used for encrypting the flowing Usage Pass 27001 are lost in both Devices (see reference number 27020). In such a case, first, the BT Reconnection stage described hereinbefore is executed and *KP_d[P] (the same as *K_d[P]), *KP_d[I] (the same as *K_d[I]), K_s[P]0', and $K_{13}$ s[I]0' are newly shared.

After finishing the BT Reconnection stage, the host module first issues a SEARCH TRANSACTION LOG BT RECOVERY instruction 27030 to the Primal Device. Next after issuing the instruction, the host module sends, as denoted by reference number 27031, the Usage Pass identifier of the Usage Pass 27011 which was being transmitted. The Primal Device, after receiving the identifier, executes the following process shown in reference number 27032:

Process BT 6.1.1: Searches the protected information region for the Transaction Log containing the same identifier value as that of the identifier.

While the Primal Device is executing Process BT 6.1.1, the host module estimates completion timing of processing and issues a GET USAGE PASS LOCATION instruction 27040 in appropriate timing. The Primal Device, after receiving the instruction, transmits the Usage Pass Location information recorded in the Transaction Log which was detected during Process BT 6.1.1, to the host module as shown in reference number 27041.

The host module 110, after receiving the Usage Pass Location information, issues a SEARCH USAGE PASS RECOVERY instruction 27050 to the Inceptive Device and then sends the received data thereto (see reference number 27051).

The Inceptive Device, after receiving the Usage Pass Location information, executes the following three processes shown in reference number 27052:

Process BT 6.2.1: Searches the qualified storage for the Usage Pass storage region specified by the received Usage Pass Location.

Process BT 6.2.2: Examines the value of the validity indicator flag of the Usage Pass detected during Process BT 6.2.1, and sets up either the value "Valid", "Invalid", or "Not recorded", in Usage Pass Status.

Process BT 6.2.3: Generates Transaction Status for BT mode. The Transaction Status is the "UPID of the Usage Pass to be recovered∥UR_s of the Usage Pass detected during Process BT 6.2.1∥Usage Pass Status set up during Process BT 6.2.2∥Usage Pass Location received in reference number 27041∥Hash value." The Hash value is calculated from $K_{13}$ s[P]m∥$K_{13}$ s[I]n−1∥UPID∥UR_s∥Usage Pass Status∥Usage Pass Location. The $K_{13}$ s[P]m∥$K_{13}$ s[I]n−1 used here are the latest session keys shared when the Connection stage or the Reconnection stage is completed. These keys indicate that after the stage, the BT PI Transfer stage and the BT IP Transfer stage have been executed an "m" number of times and an "n−1" number of times, respectively. The Transaction Status generated during this process is hereunder called "BT IP Transfer Status."

While the Inceptive Device is executing Processes BT 6.2.1 to 6.2.3, the host module estimates completion timing of processing and issues a GET TRANSACTION STATUS BT RECOVERY instruction 27060 in appropriate timing. The Inceptive Device, after receiving the instruction, transmits the BT IP Transaction Status generated during Process BT 6.2.3, to the host module as shown in reference number 27061.

The host module 110, after receiving the BT IP Transaction Status, issues a VERIFY TRANSACTION STATUS BT IP RECOVERY instruction 27070 to the Primal Device and then sends the received BT IP Transaction Status thereto (see reference number 27071).

The Primal Device, after receiving the BT IP Transaction Status, executes the following process shown in reference number 27072:

Process BT 6.3.1: Verifies the BT IP Transaction Status, and confirms the Usage Pass identifier, Usage Pass Status, and Usage Pass Location included in the BT IP Transaction Status. The verification of the BT IP Transaction Status is accomplished by calculating the data-contained Hash value from the $K_{13}$ s[P]m that the Device itself holds, and from $K_{13}$ s[I]n−1. If calculation results match the Hash value, the data is judged not to be falsified. Also, the Usage Pass identifier is used to confirm whether the Usage Pass is that which is to be recovered, the UR_s and the Usage Pass Status is used to judge whether the recovery is possible, and the Usage Pass Location is used to confirm whether the Usage Pass storage region in the qualified storage, specified by the Usage Pass Location recorded in the Device's own region, has been searched for properly. The Usage Pass Status may be "Invalid" or after the UR_s included in the BT IP Transfer Status has been checked against the UR_s of the Usage Pass recorded in the Transaction Log detected during Process BT 6.1.1, the UR_s of the intended Usage Pass left in the Inceptive Device may be found to have changed. In such cases, recovery processing is executed for subsequent Usage Passes.

While the Primal Device is executing Process BT 6.3.1, the host module 110 issues a CREATE INCEPTIVE DEVICE SESSION KEY BT TRANSFER instruction 27080 in parallel. The Inceptive Device, after receiving the instruction, executes the following two processes shown in reference number 27081:

Process BT 6.4.1: Creates a session key K_s[I]n, where "n" means that this process is the nth BT IP Transfer stage after completion of the BT Connection stage.

Process BT 6.4.2: Encrypts the $K_{13}$ s[I]n that was created during Process BT 6.4.1. The encryption uses the session key K_s[I]n−1 created during execution of the immediately preceding Usage Pass transfer, and the latest session key K_s[P]m created by the Inceptive Device. The key K_s[P]m means that the BT IP Transfer stage has been repeated an "m" number of times after completion of the BT Connection stage. If no Usage Passes have been transferred from the Inceptive Device to the Primal Device, the zeroth-order session key K_s[P]0' shared at the BT Reconnection stage will be used as $K_{13}$ s[P]m. The data obtained will be E(K_s[P]m, E(K_s[I]n−1, $K_{13}$ s[I]n)).

While the Inceptive Device is executing Processes BT 6.4.1 and 6.4.2, the host module estimates completion timing of processing and issues a GET INCEPTIVE DEVICE SESSION KEY BT TRANSFER instruction 27090 in appropriate timing. The Inceptive Device, after receiving the instruction, transmits the data E(K_s[P]m, E(K_s[I]n−1, K_s[I]n)) that was created during Process BT 6.4.2, to the host module as shown in reference number 27091.

The host module 110, after receiving E(K_s[P]m, E(K_s[I]n−1, $K_{13}$ s[I]n)), issues a PUT INCEPTIVE DEVICE SESSION KEY BT TRANSFER instruction 27100 to the Primal Device and then transmits the received data thereto (see reference number 27101).

The Primal Device receives E(K_s[P]m, E(K_s[I]n−1, K_s[I]n)) and if, in Process BT 6.3.1, the Usage Pass in the Inceptive Device is found to require recovery, the Primal Device executes the following two processes shown in reference number 27102:

Process BT 6.5.1: Decrypts the received data by using $K_{13}$ s[P]m and $K_{13}$ s[I]n−1. Both sets of key data are as described for Process BT 6.2.3.

Process BT 6.5.2: Checks whether K_s[I]n is included in proper form in the data that was obtained in Process BT 6.5.1. The checking method is the same as that described for Process UT 1.3.3.

While the Primal Device is executing Processes BT 6.5.1 and 6.5.2, the host module estimates completion timing of processing and issues an ENCRYPT USAGE PASS RECOVER instruction 27110 in appropriate timing. The Primal Device, after receiving the instruction, executes the following two processes shown in reference number 27111:

Process BT 6.6.1: Concatenates the UPID and UR_s recorded in the Transaction Log which was detected during Process BT 6.2.1, and transmits the concatenated data to the Usage Pass transmitting module 1301.

Process BT 6.6.2: Calculates a Checksum associated with the UPID‖UR_s set up in the Usage Pass transmitting module 1301 during Process BT 6.6.1, then concatenates the Checksum to the received data, and encrypts obtained data using K_s[I]n and *KP_d[I]. That is, double encryption with the symmetric keys is conducted. The data obtained is E(*KP_d[I], E(K_s[I]n, UPID‖UR_s‖Checksum)). The calculation of the Checksum is as described for Process UT 2.4.2.

While the Primal Device is executing Processes BT 6.6.1 and 6.6.2, the host module estimates completion timing of processing and issues a GET RECOVER USAGE PASS instruction 27120 in appropriate timing. The Primal Device, after receiving the instruction, transmits E(*KP_d[I], E($K_{13}$ s[I]n, UPID‖UR_s‖Checksum)) to the host module (see reference number 27121).

The host module 110, after receiving E(*KP_d[I], E(K_s[I]n, UPID‖UR_s‖Checksum)), issues a RECOVER USAGE PASS instruction 27130 to the Inceptive Device and then transmits E(*KP_d[I], E(K_s[I]n, UPID‖UR_s‖Checksum)) and a data-writing destination Usage Pass Location (see reference number 27131).

The Inceptive Device, after receiving the above instruction and data, executes the following four processes shown in reference number 23062:

Process BT 6.7.1: Decrypts the received data E(*KP_d[I], E(K_s[I]n, UPID‖UR_s‖Checksum)) with *K_d[I] and $K_{13}$ s[I]n, where *K_d[I] is a symmetric key that was obtained during Reconnection stage 27021, and $K_{13}$ s[I]n is the session key that the Device itself created during Process BT 6.4.1.

Process BT 6.7.2: Checks whether the UPID‖UR_s‖Checksum is included in proper form in the data that was obtained in Process BT 6.7.1. The check is conducted by verifying the Checksum and using the method described for Process UT 1.3.3. The verification method using the Checksum is as described for Process UT 2.4.2.

Process BT 6.7.3: Reads the Usage Pass out from the qualified storage's Usage Pass storage region specified by the received Usage Pass Location, into the Usage Pass buffer, and checks whether the UPID of the Usage Pass agrees with the UPID obtained by the decryption in Process BT 6.7.2. If both UPIDs disagree, processing is aborted.

Process BT 6.7.4: Records the received Usage Pass in the qualified storage. During recording of the Usage Pass, the validity indicator flag is set to "Valid."

After the above, the host module may issue a CHECK EXECUTION STATUS instruction 27140 to the Inceptive Device in order to confirm whether the Inceptive Device has properly completed recording the Usage Pass in the qualified storage. Execution status is transmitted as a response 27141 from the Inceptive Device to the host module. When Process BT 6.7.2 is completed, the Usage Pass existing before it was transmitted will exist in the Inceptive Device.

While an exemplary embodiment has been described above, the present invention is not limited to the preferred embodiment. In addition, the invention may be susceptible to various modes of embodiment and applicable to other devices and systems as well.

For instance, the designations of instructions, modules, and others that have been used in the description of the preferred embodiment are just one example and are not limited to the above embodiment. For example, the Usage Pass in the above embodiment may be called license information or confidential information.

Furthermore, while security management of content data in the system which includes a recorder/player and magnetic disk drives has been described in the above embodiment, such security management can also be applied to systems and system constituent devices based on other embodiments, such as devices other than recorder/players or magnetic disk drives. That is, the kinds of devices which can be applied are not limited to recorder/players or magnetic disk drives, provided that the device actually used has the characteristic processing function of the present invention that handles content data decryption management control information. Only if this characteristic processing function is provided, can the magnetic disk drives be storage devices each including a semiconductor memory, and can the recorder/player be a host computer having a storage device(s) connected thereto.

Moreover, in other modifications, protected information storage regions for storage of data such as the key data in the above embodiment do not always need to be physically tamper resistant memory locations, only if logical tampering resistance is ensured.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A content data management system which handles control information intended to manage decryption of content data, the system comprising:
   a first device that encrypts the content data to store the content data in a second device and decrypts the content data stored in the second device to reproduce the content data; and
   a second device that stores the content data encrypted by the first device; wherein:
   the first device has a host processor that inquires the first and second devices as to data transfer functions included in the devices and sets either one of a first transfer mode or a second transfer mode based on the results of the inquiries, the first transfer mode being adapted to unidirectionally transfer the control information from either one of the first and second devices to the other device, the second transfer mode being adapted to bidirectionally transfer the control information between the first and second devices;
   the validity of the first and second devices is mutually authenticated, and if authentication results indicate that the first and second devices are valid, key data (symmetric key data) is shared between the first and second devices;
   the control information is subjected to encryption processing by the first or second device using the symmetric key data and
   the control information that has been encrypted is transferred from either one of the first or second device to the other device in accordance with the first or second transfer mode that has been set the first device, if it has received the control information, decrypts the control information by using the symmetric key data, and decrypts the content data by using the decrypted control information, wherein, if the second transfer mode is set, during the validity authentication:
   the second device transmits a certificate including the second device's own public key, to the first device;
   the first device verifies validity of the received certificate, generates a first challenge key that is a key for temporary symmetric key encryption, encrypts the first challenge key with the received public key, concatenates the certificate including the first device's own public key, to the generated encryption data, and transmits the concatenated data to the second device;
   the second device acquires the first challenge key by decrypting the received data with the second device's own private key, generates a second challenge key that is a key for temporary symmetric key encryption, concatenates the second challenge key and a public key embedded in the second device's own information region, conducts encryption with the received public key, encrypts the concatenated data with the received public key, concatenates the list of revoked certificates recorded in the second device to the encrypted data, encrypts the concatenated data with the received first challenge key, and transmits the encrypted data to the first device;
   the first device decrypts the received data with the first challenge key, compares the issue dates contained in the lists of revoked certificates, and consequently, if the issue date of the received list of revoked certificates of the second device is newer than the issue date of the list of revoked certificates recorded in the first device, updates the list of revoked certificates recorded in the first device with the received list of revoked certificates;
   the first device uses the first device's own private key to decrypt all decrypted data, except for the list of revoked certificates, further generating a zeroth-order first session key that is a key for temporary symmetric key encryption, then conducting encryption with the previously received public key and second challenge key of the second device, and transmitting the encrypted data to the second device; and
   the second device decrypts the received encryption data with the second challenge key, then if the decrypted data includes the list of revoked certificates of the first device, updates the list of revoked certificates recorded in the second device with the received list of revoked certificates, decrypts all decrypted data, except for the list of revoked certificates, with the private key embedded in the second device, and acquires the zeroth-order first session key.

2. The system according to claim 1, wherein:
   the first device is a recorder/player having a function that enables digital content to be viewed and listened to;
   the second device is a magnetic disk drive mountable and dismountable with respect to the first device; and
   the content storage section is a magnetic disk medium.

3. The system according to claim 1, wherein the control information includes:
   a format which indicates to what kind of module the control information itself can be output;
   an identifier uniquely assigned to the particular data; conditions for qualifying the content data usage;
   key data for decrypting encrypted content data; and
   an identifier for identifying associated content data.

4. The system according to claim 1, wherein:
   during the transfer of the control information in the first transfer mode, the first and second devices generate respective transaction logs associated with processing of the control information and store the transaction logs into the first and second write-protected storage regions, respectively; and
   if the validity authentication is not correctly performed, the first or second device refers to the transaction log stored within the first or second write-protected storage region, then generates symmetric key data, and sends the symmetric key data to the other device.

5. The system according to claim 1, wherein:
   during the transfer of the control information in the second transfer mode, the first device generates a transaction log associated with processing of the control information and stores the transaction log into the first write-protected storage region; and
   if the validity authentication is not correctly performed, the first device refers to the transaction log stored within the first write-protected storage region, then generates symmetric key data, and sends the symmetric key data to the second device.

6. The system according to claim 1, wherein:
   the first transfer mode is adapted to unidirectionally transfer the control information from either one of the first or second device to the other device that has previously transmitted authentication information for performing authentication of the validity.

7. A content data management system which includes a first device and a second device and manages security of the content data handled by the first device and the second device, the first device being adapted to encrypt acquired content data to store the content data in the second device and decrypt the encrypted content data that has been transmitted from the second device to reproduce the decrypted content data, the second device being connected to the first device to store the content data that has been encrypted by the first device, wherein:

the first device comprises:
an interface which connects with the second device;
a recording module which performs a process for recording the acquired content data;
a playback module which performs a process for reproducing the content data sent from outside or from the second device via the interface;
a first write-protected storage region which holds at least key data which is used to encrypt the content data
a host security manager which generates, in addition to key data for decrypting the encrypted content data control information inclusive of conditions for decrypting the content data and
a host processor which controls data transfer to/from the second device; and the second device comprises:
a content storage section for storing at least the content data sent from the first device;
a second write-protected storage region which holds at least the control information; and
a transfer module which performs transfer control of information that is exchanged with the first device via the interface; and wherein:

the host processor inquires of the recording module or the playback module and the second device as to a transfer function included in the device, and sets, depending on particular inquiry results, either one of a first transfer mode or a second transfer mode, the first transfer mode being adapted to unidirectionally transfer the control information from the first or second device to the other device, the second transfer mode under that bidirectionally transfer of the control information between the first and second devices is possible;

the host security manager authenticates validity of the second device by verifying information on characteristics of the second device, the transfer module of the second device authenticates validity of the recording module or playback module of the first device by verifying information on characteristics of the recording or playback module, and if the validity is confirmed as a result of the authentication, symmetric key data is shared between the first device and the second device;

if the first transfer mode is set, the host security manager encrypts the generated control information with the symmetric key data and transfers the encrypted control information to the second device via the interface, or the transfer module encrypts the control information stored in the second write-protected storage region using the symmetric key data and transfers the encrypted control information to the first device via the interface;

if the second transfer mode is set, the host security manager encrypts the generated control information with the symmetric key data and transfers the encrypted control information to the second device via the interface, or the transfer module encrypts the held control information within the second write-protected storage region by using the symmetric key data and transfers the encrypted control information to the first device via the interface; and the playback module of the first device decrypts the received control information by using the symmetric key data and decrypts the content data by using the decrypted control information wherein, if the second transfer mode is set, during the validity authentication:

the second device transmits a certificate including second device's own public key, to the first device;

the first device verifies validity of the received certificate, generates a first challenge key that is a key for temporary symmetric key encryption, encrypts the first challenge key with the received public key, concatenates the certificate including the first device's own public key, to the generated encryption data, and transmits the concatenated data to the second device;

the second device acquires the first challenge key by decrypting the received data with the second device's own private key, generates a second challenge key that is a key for temporary symmetric key encryption, concatenates the second challenge key and a public key embedded in the second device's own information region, encrypts the concatenated data with the received public key, concatenates the second device's own list of revoked certificates to the encrypted data, encrypts the concatenated data with the received first challenge key, and transmits the encrypted data to the first device;

the first device decrypts the received data with the first challenge key, compares the issue dates contained in the lists of revoked certificates, and consequently, if the issue date of the received list of revoked certificates of the second device is newer than the issue date of the list of revoked certificates recorded in the first device, updates the list of revoked certificates recorded in the first device with the received list of revoked certificates;

the first device uses the first device's own private key to decrypt all decrypted data, except for the list of revoked certificates, further generating a zeroth-order first session key that is a key for temporary symmetric key encryption, then conducting encryption with the previously received public key and second challenge key of the second device, and transmitting the encrypted data to the second device; and the second device decrypts the received encrypted data with the second challenge key, then if the decrypted data includes the list of revoked certificates of the first device, updates the list of revoked certificates recorded in the second device with the received list of revoked certificates, decrypts all decrypted data, except for the list of revoked certificates, with the private key embedded in the second device, and acquires the zeroth-order first session key.

8. The system according to claim 7, wherein:
the first device is a recorder/player having a function that enables digital content to be viewed and listened to;
the second device is a magnetic disk drive mountable and dismountable with respect to the first device,
the content storage section is a magnetic disk medium; and
the first and second write-protected storage regions each form a tamper resistant memory.

9. The system according to claim 7, wherein the control information includes:
a format which indicates to what kind of module the data itself can be output;
an identifier uniquely assigned to the particular data;
conditions for qualifying the content data usage;
key data for decrypting encrypted content data; and
an identifier for identifying associated content data.

10. The system according to claim 7, wherein:
during the transfer of the control information in the first transfer mode, the first and second devices generate respective transaction logs associated with processing of the control information and store the transaction logs into the first and second write-protected storage regions, respectively; and
if the validity authentication is not correctly performed, the first or second device refers to the transaction log stored within the first or second write-protected storage region, then generates symmetric key data, and sends the symmetric key data to the other device.

11. The system according to claim 7, wherein:
during the transfer of the control information in the second transfer mode, the first device generates a transaction log associated with processing of the control information and stores the transaction log into the first write-protected storage region; and
if the validity authentication is not correctly performed, the first device refers to the transaction log stored within the first write-protected storage region, then generates symmetric key data, and sends the symmetric key data to the second device.

12. The system according to claim 7, wherein:
the first transfer mode is adapted to unidirectionally transfer the control information from either one of the first or second device to the other device that has previously transmitted authentication information for performing authentication of the validity.

\* \* \* \* \*